US009069208B2

(12) United States Patent
Shinkai et al.

(10) Patent No.: US 9,069,208 B2
(45) Date of Patent: Jun. 30, 2015

(54) EDGE SOURCE ILLUMINATION DEVICE FOR LIQUID CRYSTAL DISPLAY WITH PATTERNED ELECTRODES FOR LIGHT GUIDE MODULATION LAYER

(75) Inventors: Shogo Shinkai, Miyagi (JP); Kentaro Okuyama, Miyagi (JP); Tomoaki Suzuki, Miyagi (JP); Akira Ebisui, Miyagi (JP); Yuji Takahashi, Miyagi (JP); Taizo Nishimura, Miyagi (JP); Shinpei Nagatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 641 days.

(21) Appl. No.: 13/271,805

(22) Filed: Oct. 12, 2011

(65) Prior Publication Data
US 2012/0098875 A1   Apr. 26, 2012

(30) Foreign Application Priority Data

Oct. 20, 2010   (JP) ................. 2010-235925

(51) Int. Cl.
*G02F 1/1335* (2006.01)
*G02F 1/1343* (2006.01)
(Continued)

(52) U.S. Cl.
CPC ........ *G02F 1/133615* (2013.01); *G02B 6/0036* (2013.01); *G02F 2001/134318* (2013.01); *G02B 6/0043* (2013.01); *G02B 6/0033* (2013.01); *G02B 6/0028* (2013.01);
(Continued)

(58) Field of Classification Search
CPC .... G02B 6/0033; G02B 6/002; G02B 6/0028; G02B 6/0031; G02B 6/0011; G02B 6/0013; G02B 6/0035; G02B 6/0036; G02B 6/004;
G02F 1/133615; G02F 1/13361; G02F 1/133553; G02F 1/1343; G02F 1/134309; G09G 3/342; G09G 3/3406; G09F 9/372
USPC ........... 362/23.15, 600–617, 559; 349/62, 63, 349/65, 113, 114, 115; 345/76, 83, 690; 348/41; 385/146, 147; 36/31
See application file for complete search history.

(56) References Cited

U.S. PATENT DOCUMENTS 6,108,059 A * 8/2000 Yang ............................. 349/65
6,415,531 B1 * 7/2002 Ohtsuki et al. ................. 36/31
(Continued)

FOREIGN PATENT DOCUMENTS

JP   HEI 06-347790   12/1994
JP   HEI 11-142843    5/1999
(Continued)

*Primary Examiner* — Ariel Balaoing
*Assistant Examiner* — Darlene M Ritchie
(74) *Attorney, Agent, or Firm* — K&L Gates LLP

(57) ABSTRACT

An illumination device includes a light guide plate, a light source, and a light modulation element. The light guide plate has convex portions extending in a direction parallel to a normal to a face opposed to the light source among side faces of the light guide plate, and the light source is configured of light source blocks. The light modulation element includes a pair of transparent substrates disposed separately and oppositely to each other, a plurality of first electrodes provided on a surface of one of the transparent substrates, and extending in a direction crossing an extending direction of the convex portions, a second electrode provided on a surface of the other transparent substrate, and a light modulation layer provided in a gap between the transparent substrates, and exhibiting a scattering property or a transparent property to light from the light source depending on magnitude of an electric field.

19 Claims, 52 Drawing Sheets

(51) Int. Cl.
  *G02F 1/1334* (2006.01)
  *F21V 8/00* (2006.01)
  *G09G 3/34* (2006.01)

(52) U.S. Cl.
  CPC ....... *G02B 6/0013* (2013.01); *G02F 1/134309* (2013.01); *G09G 3/3406* (2013.01); *G09G 3/342* (2013.01); *G02F 1/1334* (2013.01); *G02B 6/0038* (2013.01); *G02B 6/0041* (2013.01); *G02B 6/0058* (2013.01); *G02F 2001/133601* (2013.01)

(56) References Cited

U.S. PATENT DOCUMENTS

| | | | | |
|---|---|---|---|---|
| 6,727,963 | B1* | 4/2004 | Taniguchi et al. | 349/65 |
| 6,788,358 | B1* | 9/2004 | Kim et al. | 349/62 |
| 7,566,158 | B2* | 7/2009 | Soh et al. | 362/607 |
| 7,766,528 | B2* | 8/2010 | Epstein et al. | 362/609 |
| 8,057,086 | B2* | 11/2011 | Kim et al. | 362/612 |
| 8,167,472 | B2* | 5/2012 | Kim et al. | 362/606 |
| 2003/0025847 | A1* | 2/2003 | Sumi | 349/43 |
| 2004/0008300 | A1* | 1/2004 | Maeda et al. | 349/114 |
| 2004/0130884 | A1* | 7/2004 | Yoo et al. | 362/31 |
| 2004/0145915 | A1* | 7/2004 | Kim et al. | 362/559 |
| 2005/0180719 | A1* | 8/2005 | Hara et al. | 385/146 |
| 2005/0232573 | A1* | 10/2005 | Iwauchi et al. | 385/147 |
| 2005/0286854 | A1* | 12/2005 | Honma et al. | 385/146 |
| 2007/0206137 | A1* | 9/2007 | Akiyama | 349/113 |
| 2008/0259249 | A1* | 10/2008 | Chang | 349/65 |
| 2011/0169877 | A1* | 7/2011 | Ishida | 345/690 |
| 2011/0292096 | A1* | 12/2011 | Ohhara | 345/690 |

FOREIGN PATENT DOCUMENTS

| | | |
|---|---|---|
| JP | 2004-206916 | 7/2004 |
| JP | 2004-253335 | 9/2004 |

* cited by examiner

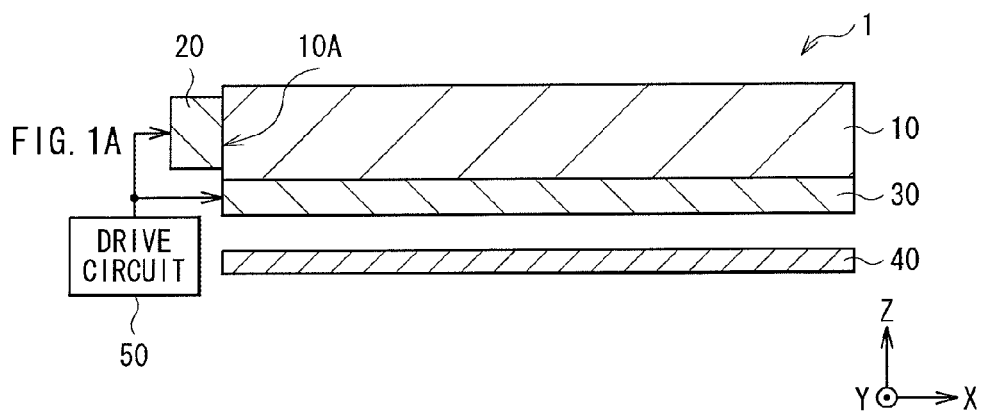
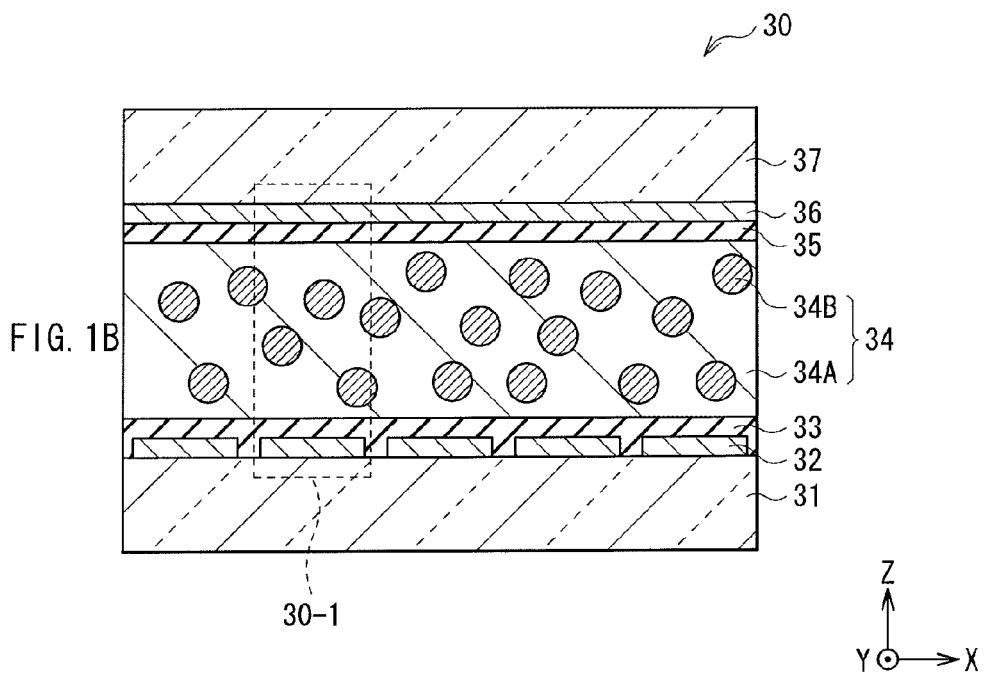

FIG. 8A
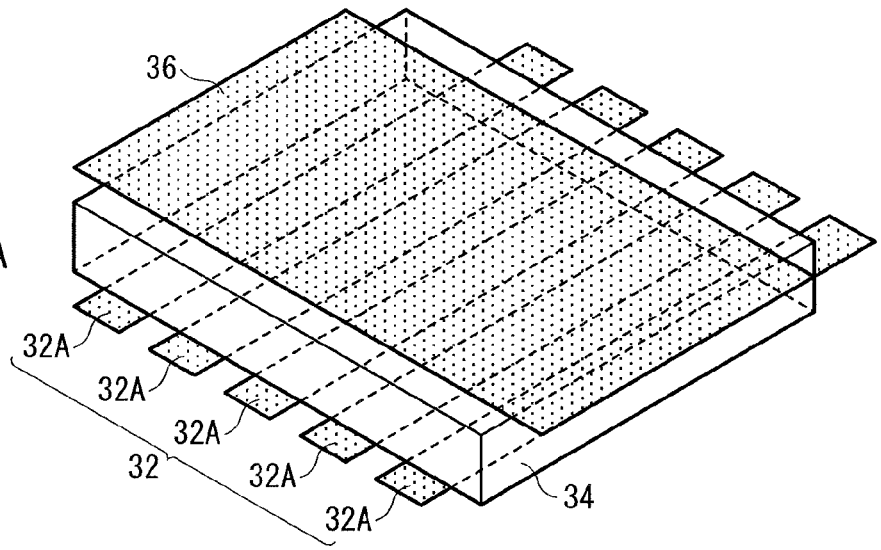
FIG. 8B
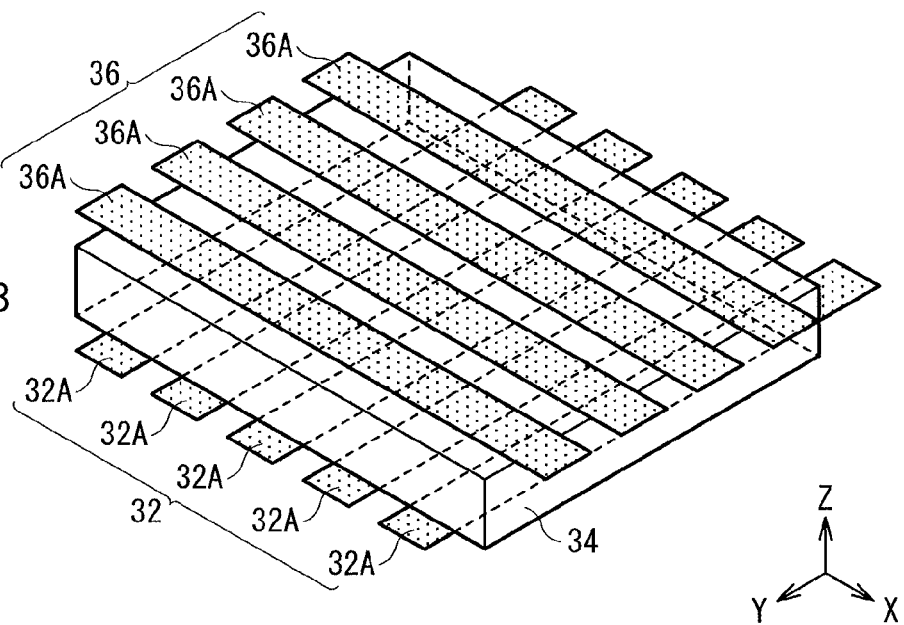
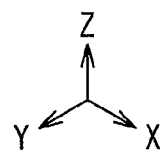

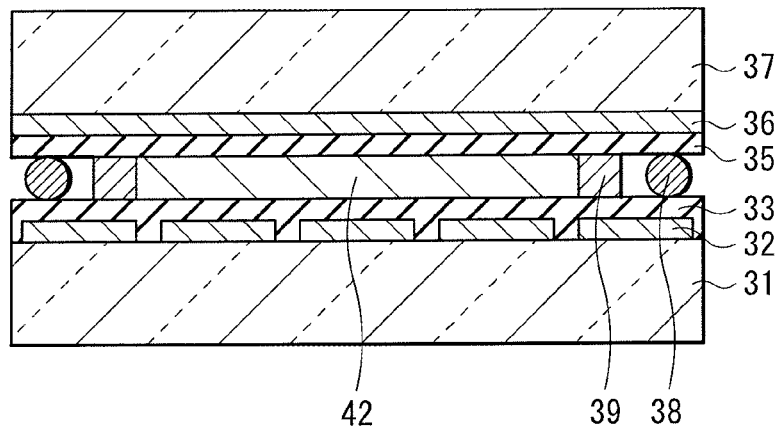
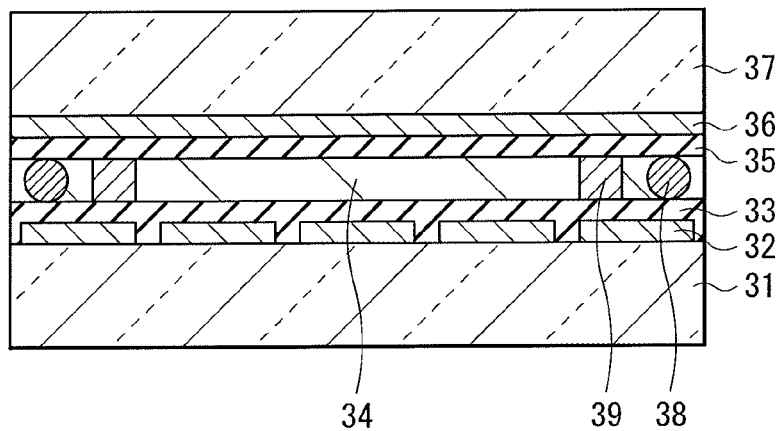
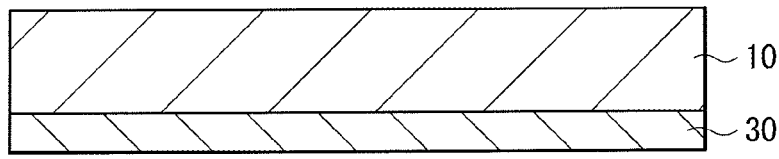

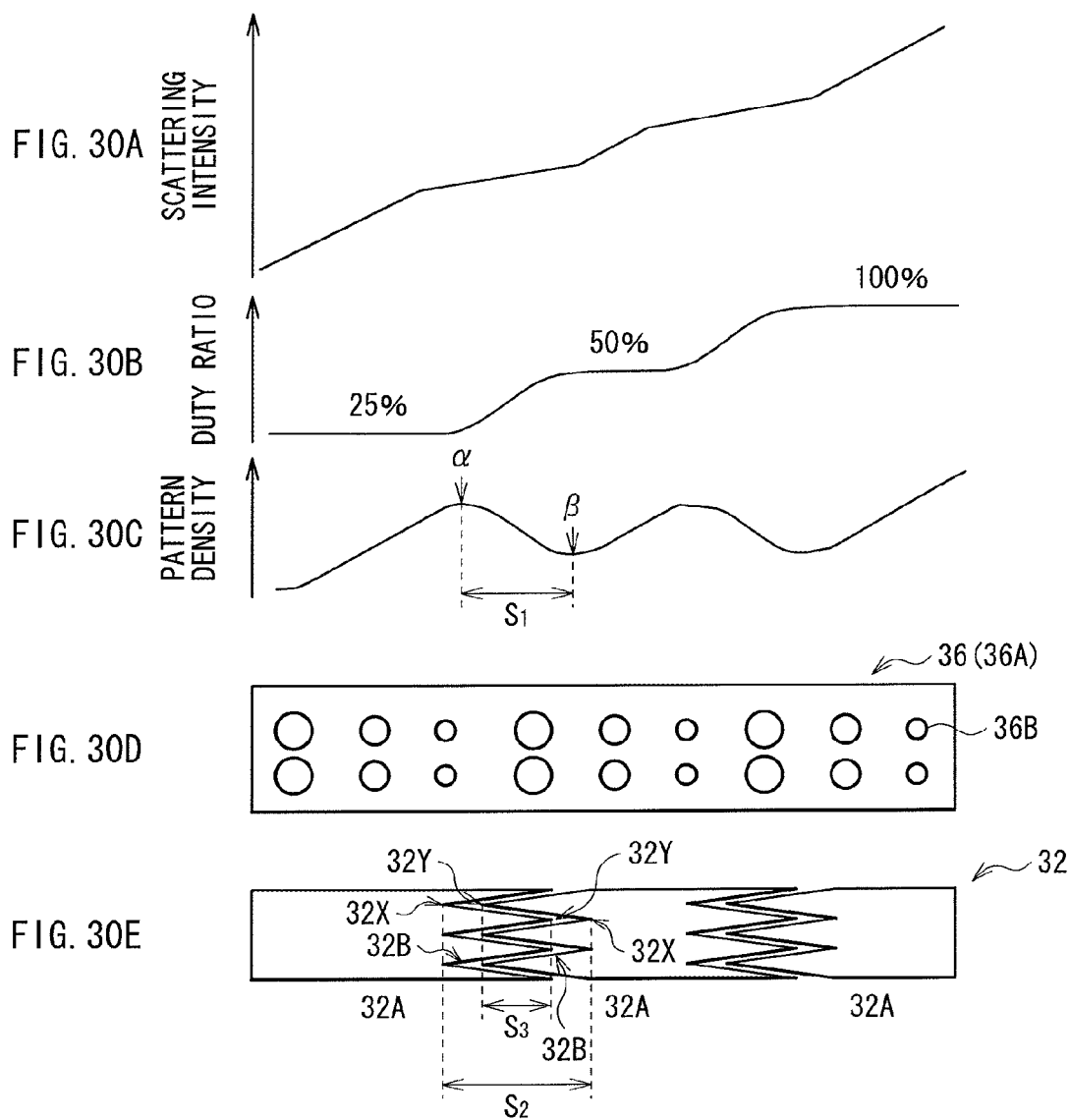

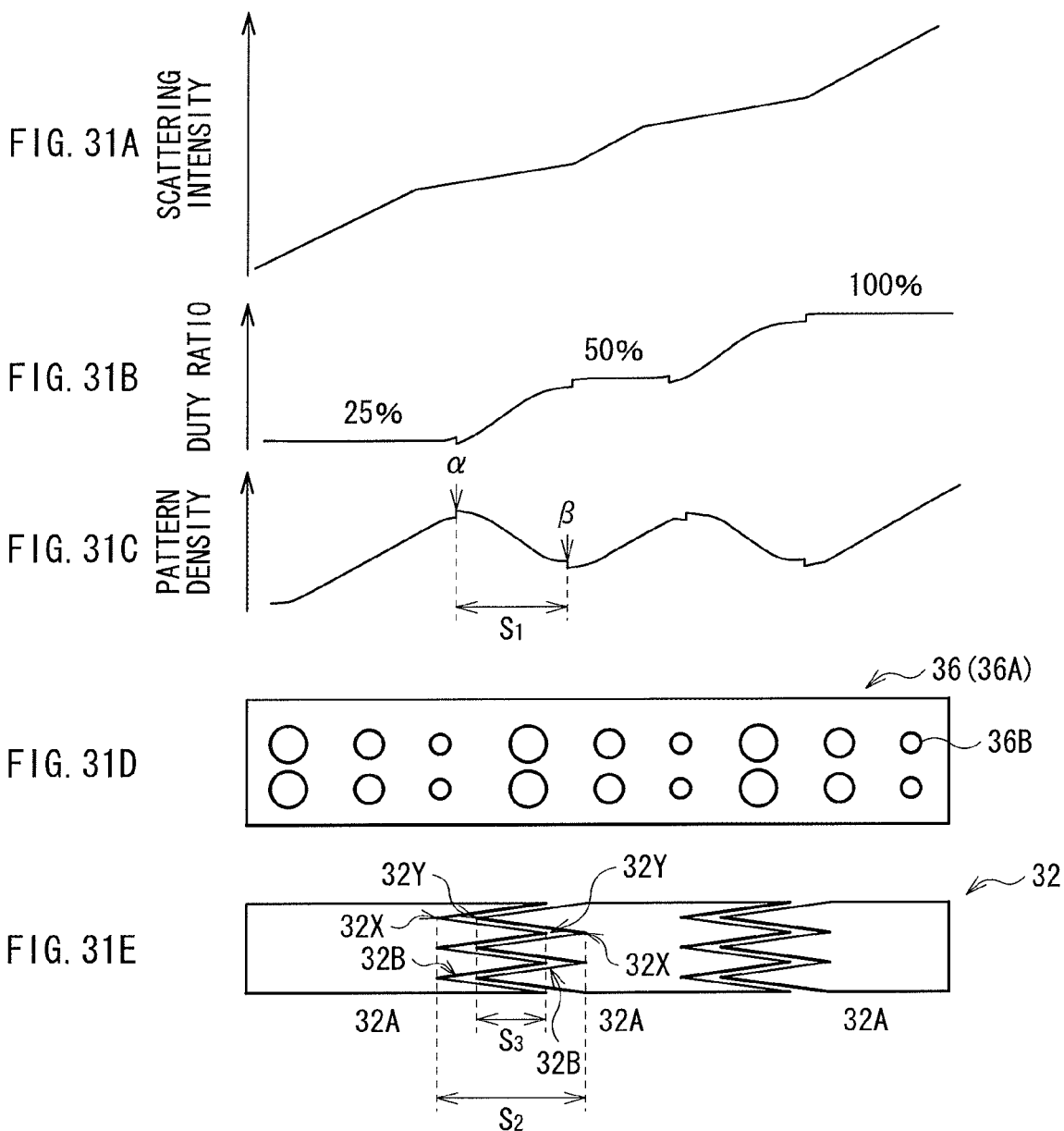

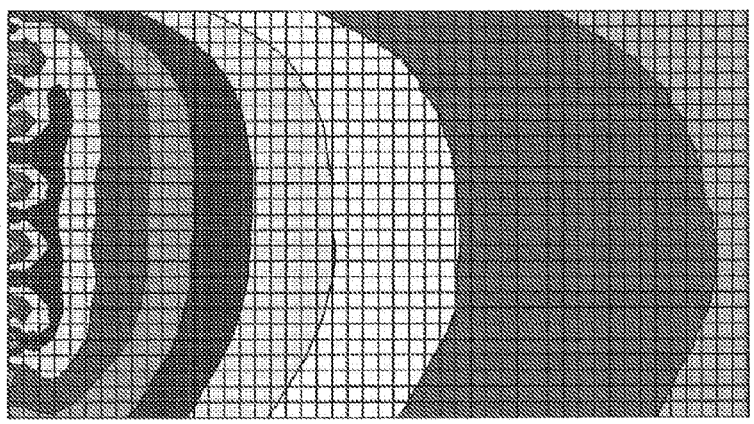
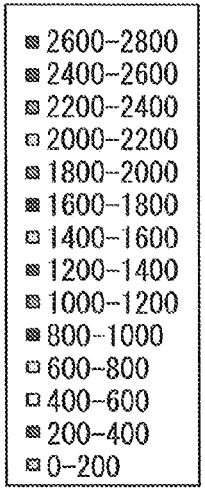
FIG. 56A
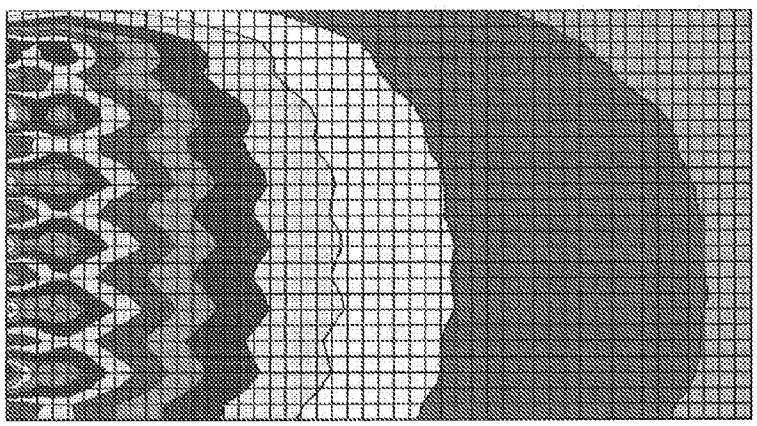
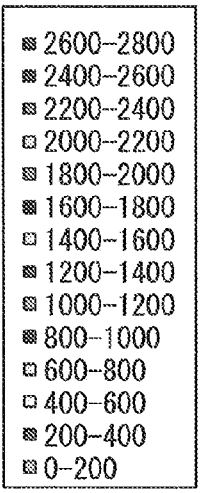
FIG. 56B

|  | LUMINANCE AT THE CENTER OF SCREEN |
|---|---|
| EXAMPLE | 2195 cd/m$^2$ |
| COMPARATIVE EXAMPLE | 1979 cd/m$^2$ |

FIG. 57

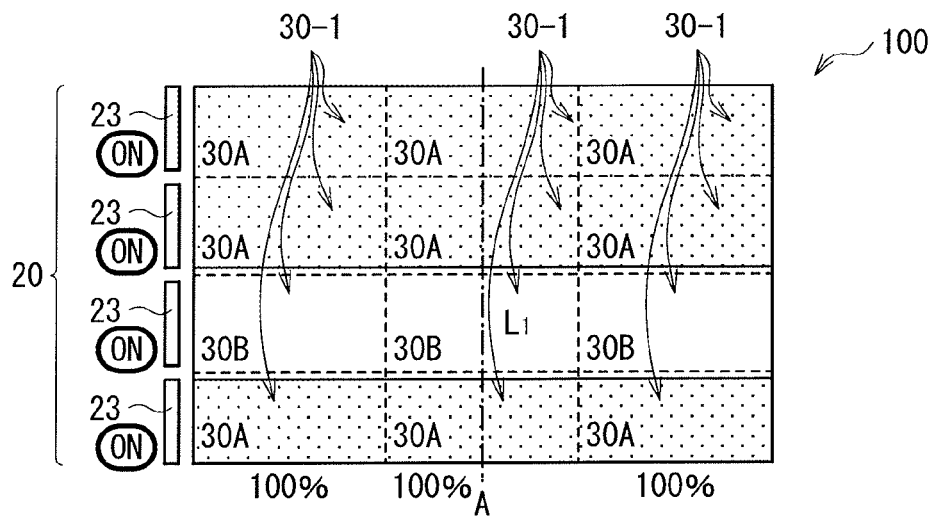
FIG. 64
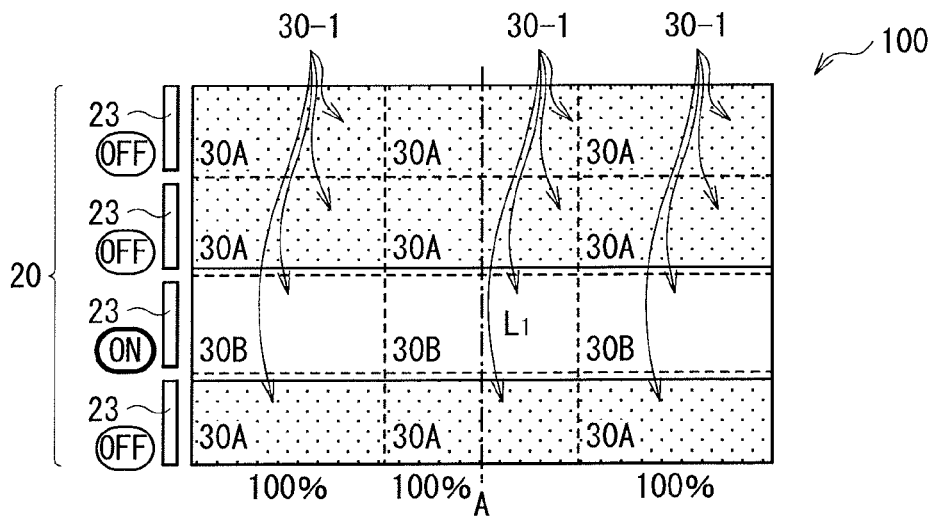
FIG. 65
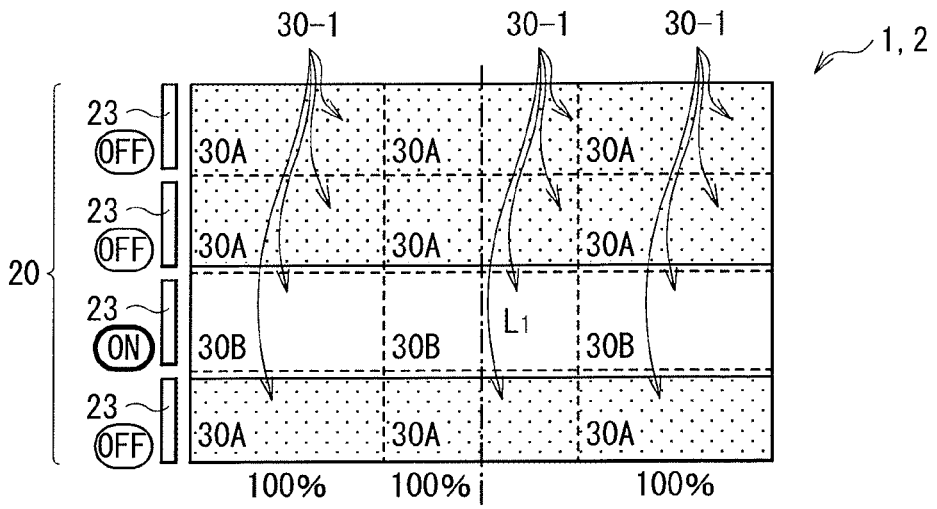
FIG. 66 C, D

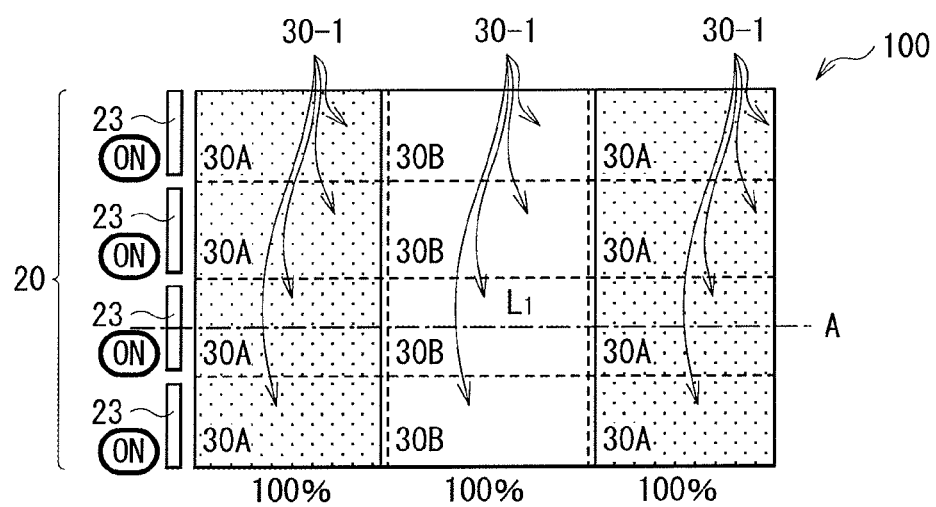
F I G. 73

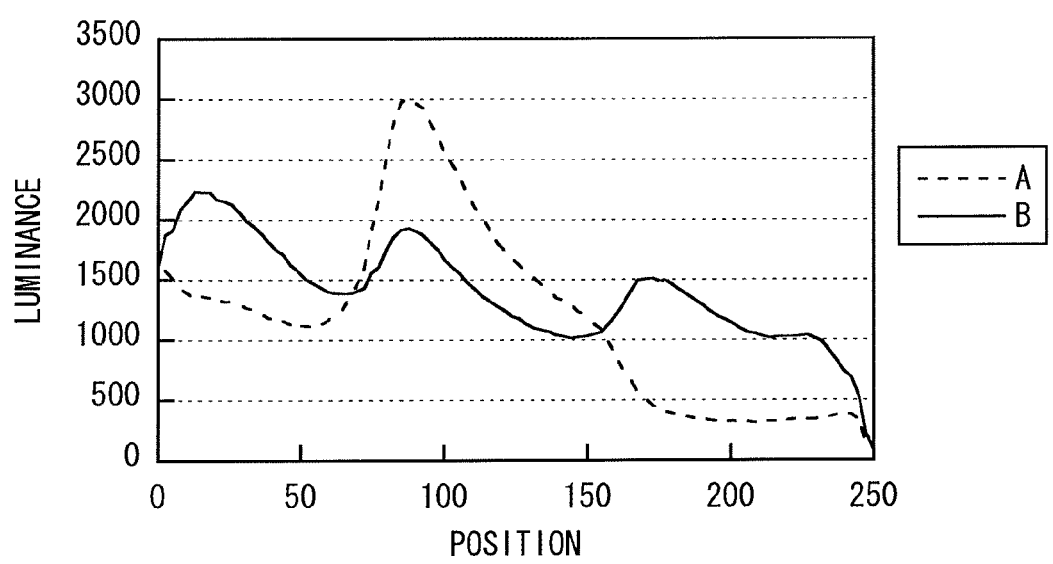
F I G. 74

EDGE SOURCE ILLUMINATION DEVICE FOR LIQUID CRYSTAL DISPLAY WITH PATTERNED ELECTRODES FOR LIGHT GUIDE MODULATION LAYER

CROSS REFERENCES TO RELATED APPLICATIONS

The present application claims priority to Japanese Patent Application No. 2010-235925 filed on Oct. 20, 2010, the disclosure of which is incorporated herein by reference.

BACKGROUND

The present application relates to an illumination device and a display device, each including a light modulation element exhibiting a scattering property or a transparent property to light.

Recently, a liquid crystal display has been rapidly improved in image quality or advanced in energy saving, and a method has been proposed, in which intensity of light from a backlight is partially modulated to improve scotopic contrast. As key technology of the method, light emitting diodes (LEDs), used for a light source of a backlight, are partially driven to modulate light from a backlight according to a display image. In addition, reduction in thickness has been increasingly demanded in a large-size liquid crystal display as in a small-size liquid crystal display. Thus, attention is being focused on an edge light type where a light source is disposed on an edge of a light guide plate, rather than a type where a cold cathode fluorescent lamp (CCFL) or LEDs is/are disposed directly under a liquid crystal panel. However, partial drive in which light intensity of a light source is partially modulated is hardly achieved in the edge light type.

SUMMARY

As a method extract light transmitted through a light guide plate, for example, Japanese Unexamined Patent Application Publication No. 6-347790 proposes a display device using a polymer dispersed liquid crystal (PDLC) switchable between transparent and scattering states. Such a technique is intended to prevent mirroring, where voltage is partially applied to PDLC for switching between transparent and scattering states. However, the technique has had the following difficulty; when light is guided and partially extracted to partially modulate illumination light, if luminance is greatly different at a boundary caused by a pattern of electrodes for driving PDLC, the boundary is observed.

A technique to blur a boundary of light and dark is disclosed in, for example, Japanese Unexamined Patent Application Publication No. 2004-2069116. In the technique, a diffuser plate is used or a spatial distance is increased to blur difference in brightness in the boundary. However, when the technique is applied to an illumination device using PDLC, reduction in thickness is disadvantageously obstructed.

It is desirable to provide an illumination device and a display device, in which a light-and-dark boundary of illumination light may be blurred without obstructing reduction in thickness.

An illumination device according to an embodiment of the disclosure includes a light guide plate, a light source disposed on a side face of the light guide plate, and a light modulation element disposed on a surface or in the inside of the light guide plate and adhered to the light guide plate. The light guide plate has a plurality of convex portions extending in a direction parallel to a normal to a face opposed to the light source among side faces of the light guide plate. The light source is configured of a plurality of light source blocks that may be independently driven. In addition, the light modulation element includes a pair of transparent substrates disposed separately and oppositely to each other, a plurality of first electrodes provided on a surface of one of the pair of transparent substrates, and extending in a direction crossing an extending direction of the convex portions, a second electrode provided on a surface of the other of the pair of transparent substrates, and a light modulation layer provided in a gap between the pair of transparent substrates, and exhibiting a scattering property or a transparent property to light from the light source depending on magnitude of an electric field.

A display device according to an embodiment of the disclosure includes a display panel having a plurality of pixels arranged in a matrix, where the plurality of pixels are driven based on an image signal, and an illumination device lighting the display panel. The illumination device mounted on the display device has the same components as those of the illumination device mentioned above.

In the illumination device and the display device according to the embodiments of the disclosure, the light guide plate has a plurality of belt-like convex portions, and a plurality of first electrodes, extending in a direction crossing the convex portions, are provided. Furthermore, in the disclosure, the light source is configured of a plurality of light source blocks that may be independently driven. Consequently, for example, one light source block is turned on, and one partial electrode is driven, thereby light output from the turned-on light source block is transmitted through the light guide plate along the convex portions, and furthermore the light is extracted from a site (hereinafter, called "crossing site"), at which a portion, where light is transmitted through the light guide plate along the convex portion, crosses the driven first electrode as viewed from a normal direction of the light guide plate. At this time, a portion of the light modulation layer corresponding to the driven first electrode exhibits the scattering property, and a pair of edges, opposed to each other in the extending direction of the first electrodes, of the crossing site have no boundary between scattering and transparency while the boundary has been formed within the light modulation layer. Consequently, luminance distribution of light extracted from the light guide plate gently changes in the extending direction of the first electrodes.

In the illumination device and the display device according to the embodiment of the disclosure, each of the first electrodes may have an irregular shape on an edge thereof adjacent to another first electrode. In such a case, clearness of a boundary of transparency and scattering is reduced between a portion of the light modulation layer corresponding to the driven first electrode and a portion of the layer adjacent to such a portion. Consequently, luminance distribution of light extracted from the light guide plate gently changes not only in the extending direction of the first electrodes but also in a direction crossing the extending direction of the first electrodes.

According to the illumination device and the display device of the embodiments of the disclosure, light output from part of the light source is transmitted along the convex portions of the light guide plate, and the first electrodes extending in a direction crossing a transmission direction of the light are driven, thereby an change of luminance distribution in a plane of light extracted from the light guide plate is made gentle, and therefore a light-and-dark boundary of illumination light may be blurred without obstructing reduction in thickness.

Furthermore, in the illumination device and the display device according to the embodiments of the disclosure, when each of the first electrodes has an irregular shape on an edge thereof adjacent to another first electrode, change of luminance distribution of light extracted from the light guide plate may be made gently not only in the extending direction of the first electrodes but also in a direction crossing the extending direction of the first electrodes. This makes it possible to blur all light-and-dark boundaries of illumination light.

It is to be understood that both the foregoing general description and the following detailed description are exemplary.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification.

FIGS. 1A and 1B are section views illustrating an example of a configuration of a backlight according to a first embodiment of the disclosure.

FIGS. 8A and 8B are perspective diagrams illustrating an example of a configuration of electrodes in FIGS. 1A and 1B.

FIGS. 15A to 15C are section diagrams for explaining the manufacturing process following FIGS. 14A to 14C.

FIGS. 30A to 30E are characteristic diagrams illustrating another example of the relationship between scattering intensity and a duty ratio as well as ITO area.

FIGS. 31A to 31E are characteristic diagrams illustrating still another example of the relationship between scattering intensity and a duty ratio as well as ITO area.

FIGS. 56A and 56B are characteristic diagrams illustrating a specific example of luminance distribution of the backlight according to each of Example and the comparative example.

FIG. 57 is a characteristic chart illustrating another specific example of luminance distribution of the backlight according to each of the Example and the comparative example.

FIG. 64 is a schematic diagram for explaining a ninth example of the operation of the backlight according to the comparative example.

FIG. 65 is a schematic diagram for explaining a tenth example of the operation of the backlight according to the comparative example.

FIG. 66 is a schematic diagram for explaining a second example of the operation of the backlight having the electrodes of FIGS. 25A and 25B or FIGS. 26A and 26B, or the electrodes of FIGS. 27A and 27B or FIGS. 28A and 28B.

FIG. 73 is a schematic diagram for explaining an eleventh example of the operation of the backlight according to the comparative example.

FIG. 74 is a characteristic graph illustrating an example of luminance distribution of the backlight of each of FIGS. 60 and 73.

DETAILED DESCRIPTION

Embodiments of the present application will be described below in detail with reference to the drawings. It is to be noted that description is made in the following order.

1. First Embodiment (FIGS. 1A and 1B to FIGS. 15A to 15C)

Example where a light modulation element including a horizontal alignment film is provided in a backlight 2. Second Embodiment (FIGS. 16A and 16B to FIG. 18)

Figure 19:
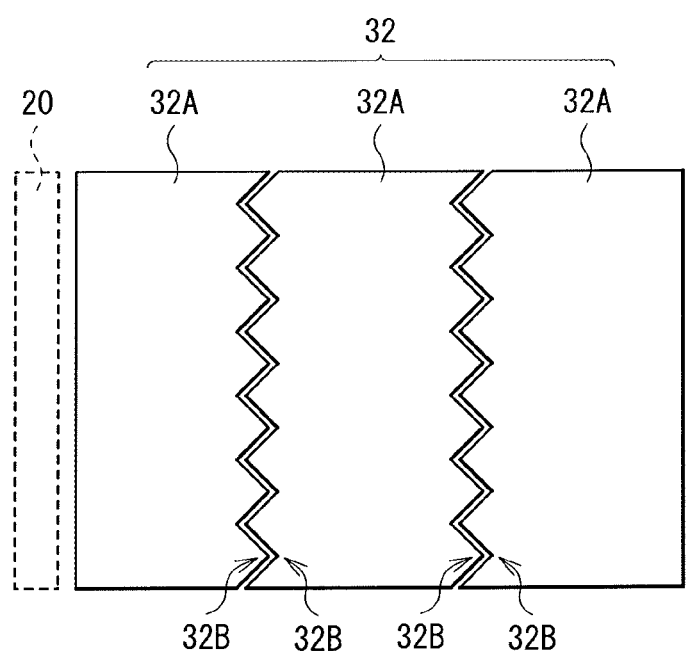
FIG. 19 is a plan view illustrating a first modification of a configuration of a lower electrode in FIGS. 1A and 1B or FIGS. 16A and 16B.
Figure 20D:
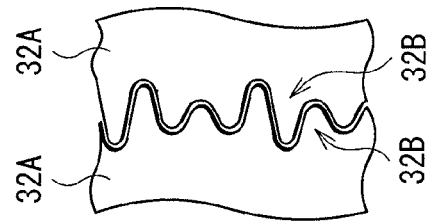
FIGS. 20A to 20D are plan views illustrating a second modification of the configuration of the lower electrode in FIGS. 1A and 1B or FIGS. 16A and 16B.
Figure 20C:
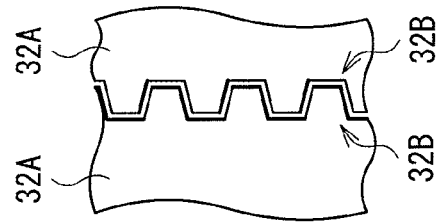
Figure 20B:
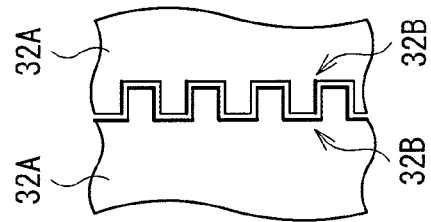
Figure 20A:
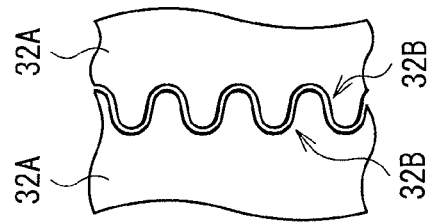
Figure 21:
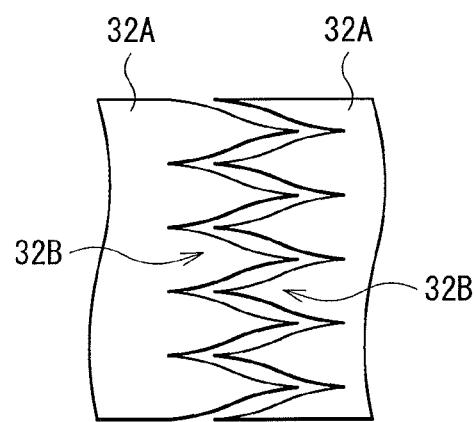
FIG. 21 is a plan view illustrating a third modification of the configuration of the lower electrode in FIGS. 1A and 1B or FIGS. 16A and 16B.

Example where a light modulation element including a vertical alignment film is provided in a backlight 3. Modifications Example where irregularity is formed on an edge of a lower electrode (FIGS. 19 to 21)

Example where Openings are Formed in an Upper Electrode (FIGS. 22a and 22B to FIGS. 26A and 26B)

Example where irregularity is formed on an edge of a lower electrode and openings are formed in an upper electrode (FIGS. 27A and 27B to FIG. 32)

Example where irregularity is formed on an edge of a lower electrode and openings are formed in the lower electrode (FIGS. 33A and 33B and FIGS. 34A and 34B)

Figure 35:
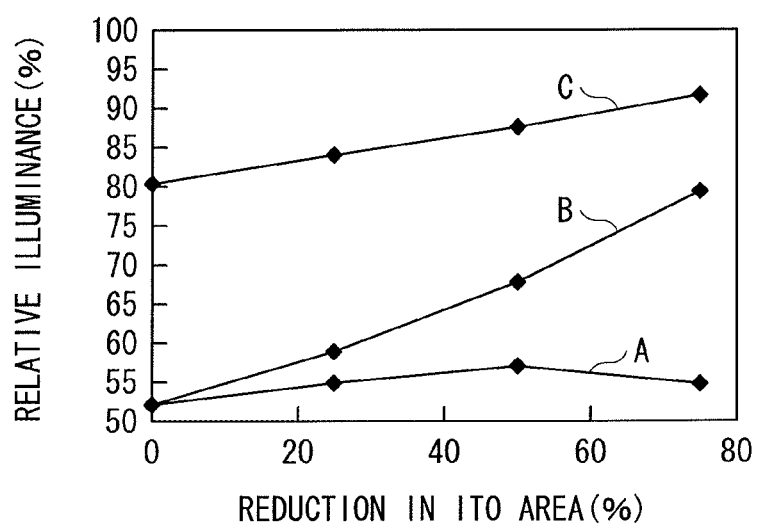
FIG. 35 is a characteristic graph illustrating an example of a relationship between reduction in ITO area and relative illuminance.

Example where each of ITO area and scattering intensity is changed (FIG. 35)

Figure 36A:
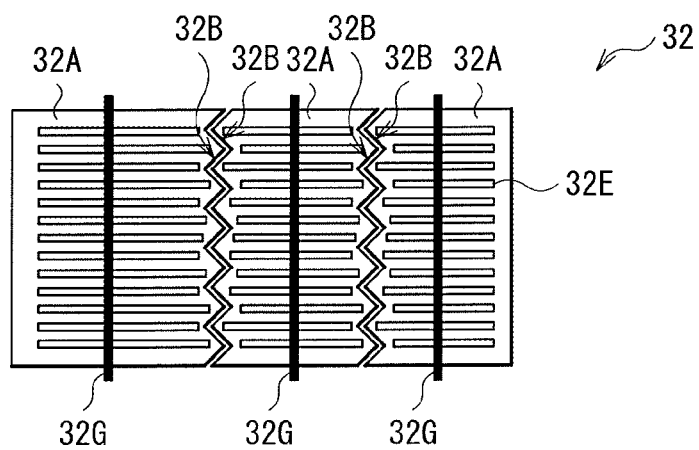
FIGS. 36A and 36B are plan views illustrating a sixth modification of the configuration of the lower electrode in FIGS. 1A and 1B or FIGS. 16A and 16B.
Figure 36B:
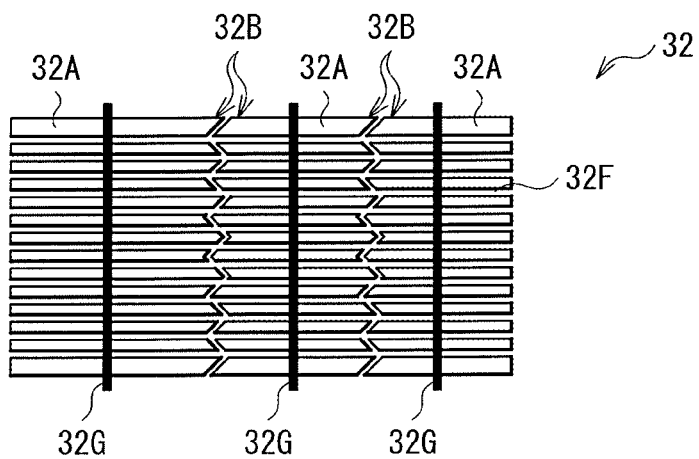

Example where irregularity is formed on an edge of a lower electrode and openings and metal lines are formed in the lower electrode (FIGS. 36A and 36B)

Figure 37:
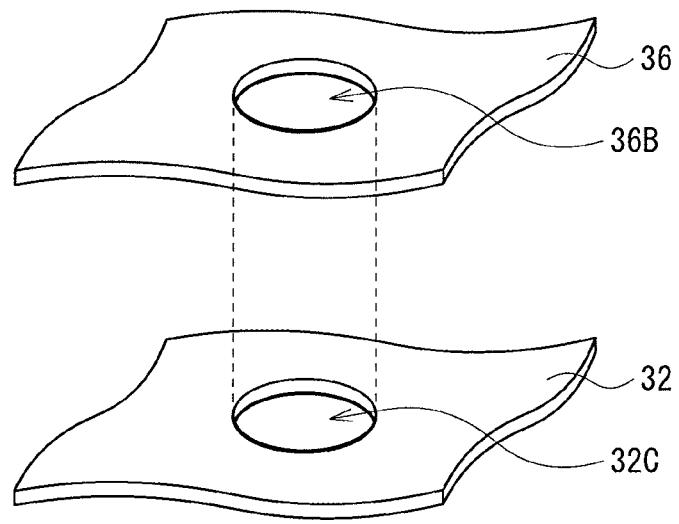
FIG. 37 is a perspective diagram illustrating an example of a combination of the lower and upper electrodes shown in FIG. 19 to FIG. 27B.

Example where openings are formed in each of lower and upper electrodes (FIG. 37)

Figure 38:
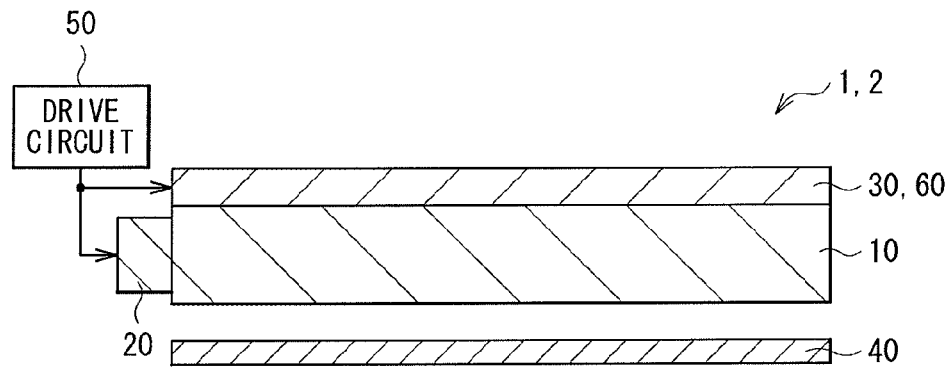
FIG. 38 is a section view illustrating a first modification of the configuration of the backlight of FIGS. 1A and 1B or FIGS. 16A and 16B.
Figure 39:
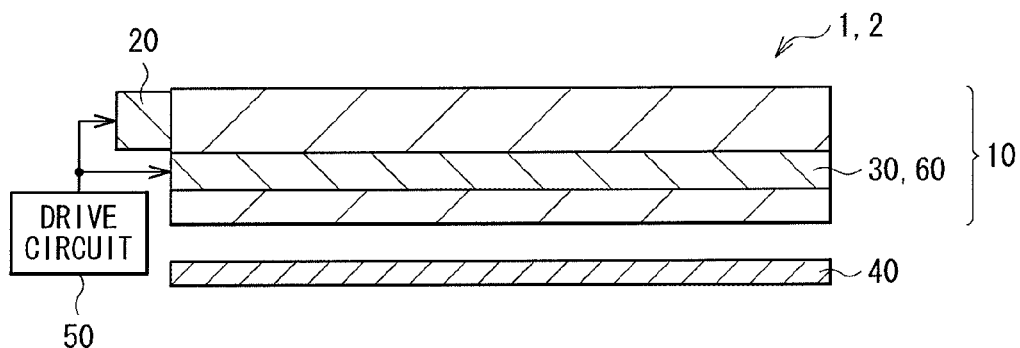
FIG. 39 is a section view illustrating a second modification of the configuration of the backlight of FIGS. 1A and 1B or FIGS. 16A and 16B.
Figure 40:
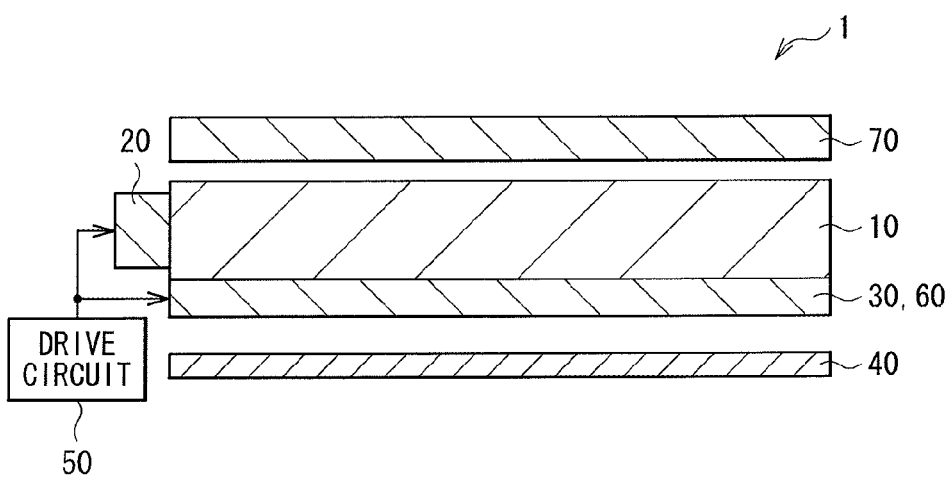
FIG. 40 is a section view illustrating a third modification of the configuration of the backlight of FIGS. 1A and 1B or FIGS. 16A and 16B.

Example where a light modulation element is in a different position (FIGS. 38 to 40)

Figure 45A:
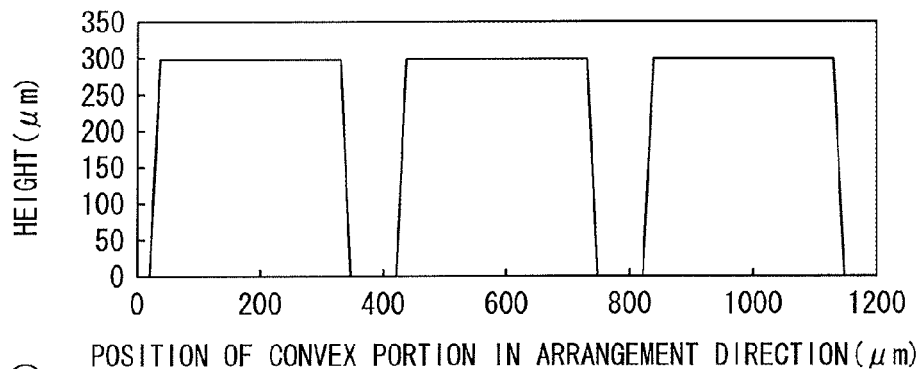
FIGS. 45A and 45B are charts illustrating an example of each of a shape and scale of each convex portion of the light guide plate in the backlight of FIG. 44.
Figure 45B:
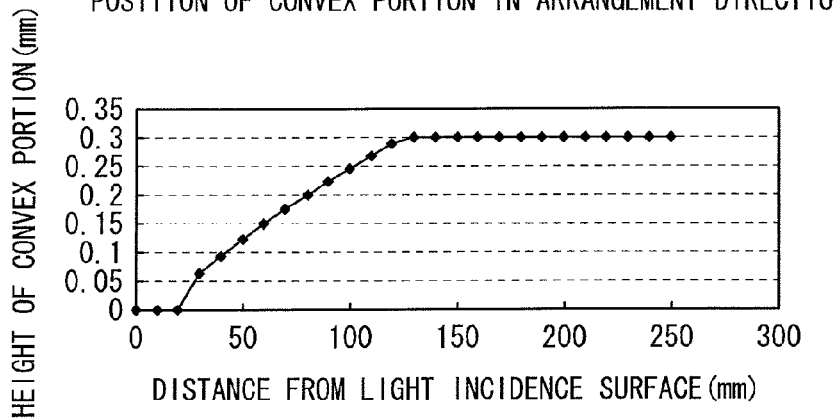
Figure 46:
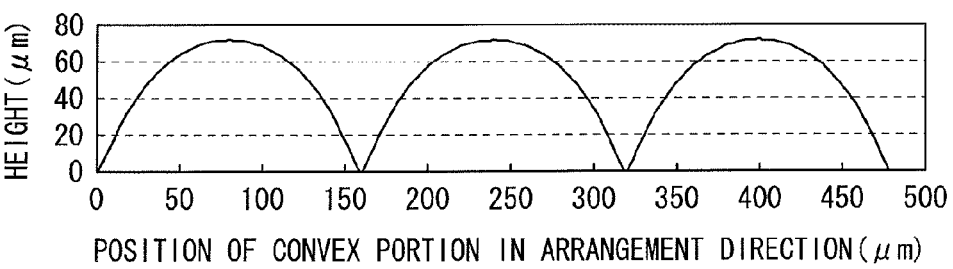
FIG. 46 is a chart illustrating another example of each of the shape and scale of the convex portion of the light guide plate in the backlight of FIG. 44.

4. Example and Comparative Example (FIGS. 41 to 75)
5. Application Example (FIG. 46)

Example where the backlight of each of the embodiments and the like is used for a light source of a display device

1. First Embodiment

FIG. 1A is a section view illustrating an example of a schematic configuration of a backlight 1 (illumination device) according to a first embodiment of the disclosure. FIG. 1B is a section view illustrating an example of a configuration of a light modulation element 30 (described later) mounted in the backlight 1 of FIG. 1A. It is to be noted that FIGS. 1A and 1B are schematic views and therefore dimensions or shapes are not necessarily the same as actual ones. The backlight 1 illuminates, for example, a liquid crystal display panel from the back, and includes a light guide plate 10, a light source 20 disposed on a side face of the light guide plate 10, the light modulation element 30 and a reflective plate 40 disposed in the back of the light guide plate 10, and a drive circuit 50 driving the light source 20 and the light modulation element 30.

Figure 2:
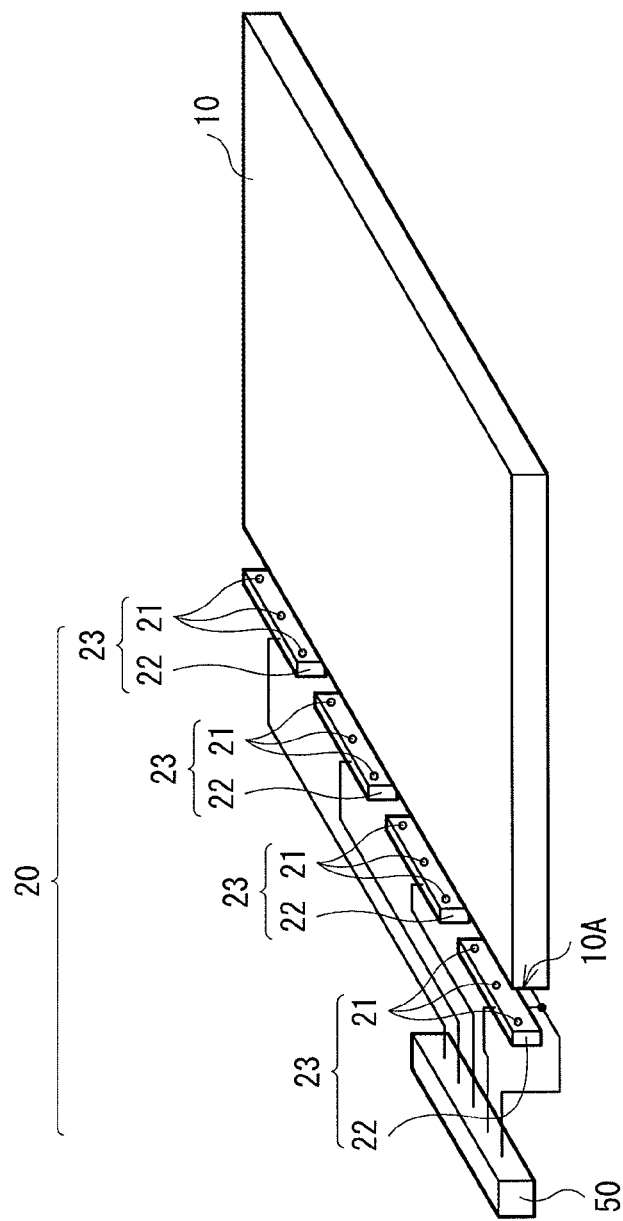
FIG. 2 is a perspective diagram illustrating an example of a configuration of a light source in FIGS. 1A and 1B.

The light source 20 is configured of a plurality of dot-like light sources 21 disposed in one line, for example, as illustrated in FIG. 2. Each of the dot-like light sources 21 emits light to a side face of the light guide plate 10, and, for example, is configured of a light emitting element having emission spots on a surface opposed to the side face of the light guide plate 10. Such a light emitting element includes, for example, LED or a laser diode (LD). Each dot-like light source 21 is preferably white LED from the viewpoint of efficiency, reduction in thickness, and uniformity. It is to be noted that each of the dot-like light sources 21 included in the light source 20 may be configured of, for example, red LED, green LED and blue LED.

Two or more dot-like light sources 21 may be provided on each common substrate 22, for example, as illustrated in FIG. 2. In this case, one substrate 22 and a plurality of dot-like light sources 21 provided on the substrate 22 configure a light source block 23. The substrate 22 includes, for example, a circuit board, on which wiring lines electrically connecting the dot-like light sources 21 to the drive circuit 50 are formed, and each dot-like light source 21 is mounted on the circuit board. The dot-like light sources 21 provided on a common substrate 22 (dot-like light sources 21 in the light source block 23) are collectively (non-independently) driven by the drive circuit 50. For example, while not shown, the light sources 21 are connected parallel to or in series to one another. The respective dot-like light sources 21 provided on different substrates 22 (dot-like light sources 21 in respective light source blocks 23) are independently driven by the drive circuit 50, and connected to different current paths, for example, as illustrated in FIG. 2.

The light source 20 may be provided on only one side face of the light guide plate 10 as illustrated in FIG. 2, or while not shown, may be provided on two, three, or all side faces of the light guide plate 10. When the light sources 20 are provided on three or all side faces, it is acceptable that only light sources 20, provided on two side faces opposed to each other, are turned on only in the case of partial lighting, and all light sources 20 are turned on in the case of full lighting.

Figure 3A:
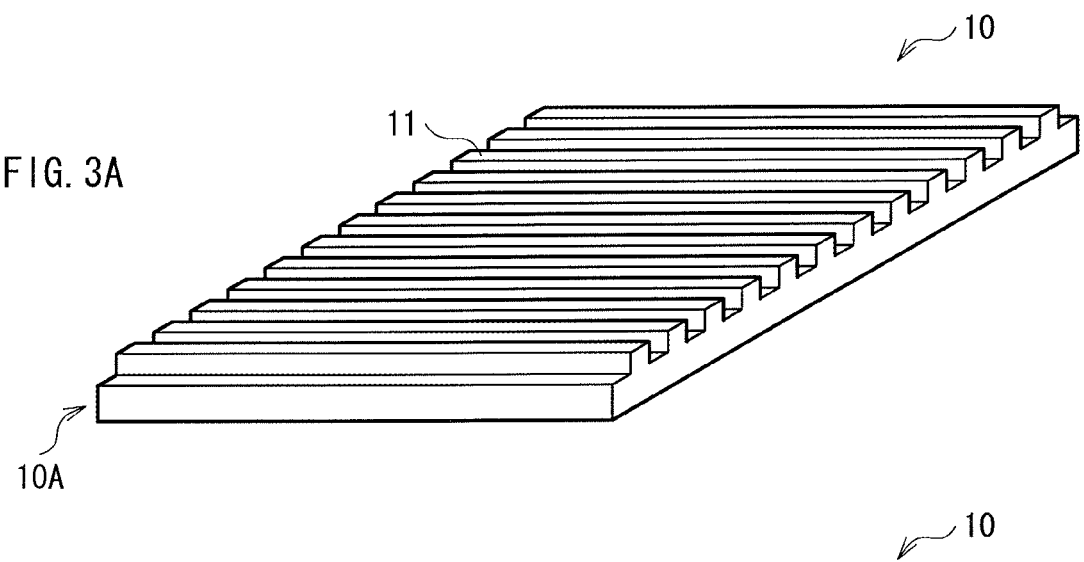
FIGS. 3A and 3B are perspective diagrams illustrating an example of a configuration of a light guide plate in FIGS. 1A and 1B.
Figure 3B:
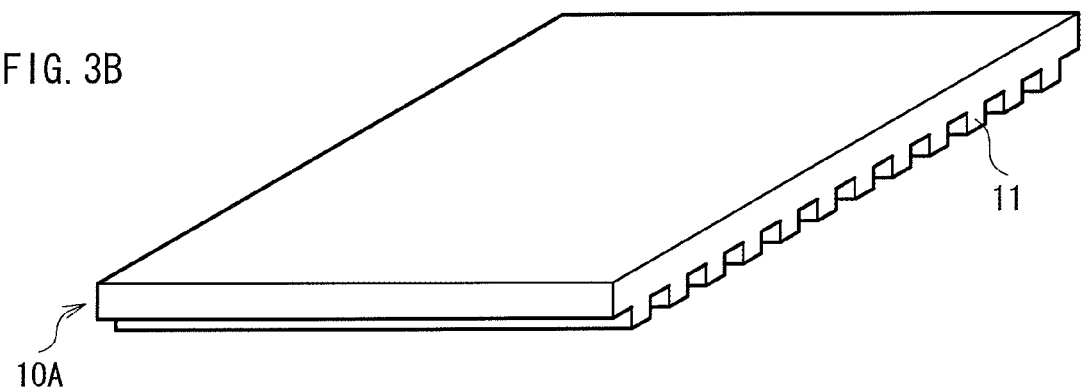
Figure 4A:
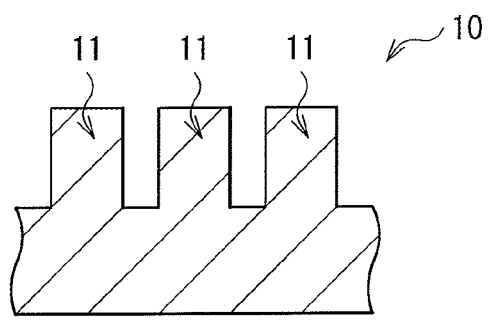
FIGS. 4A to 4D are section views illustrating an example of a configuration of convex portions of the light guide plate of FIGS. 3A and 3B.
Figure 4B:
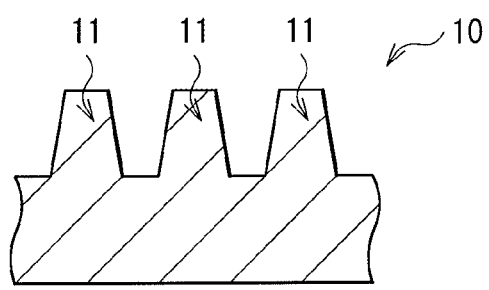
Figure 4C:
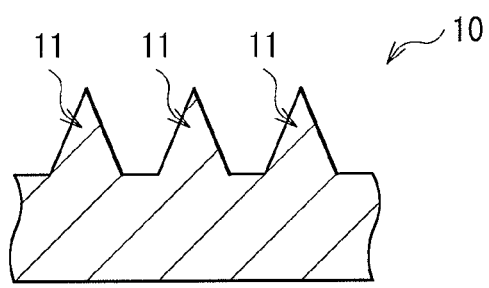
Figure 4D:
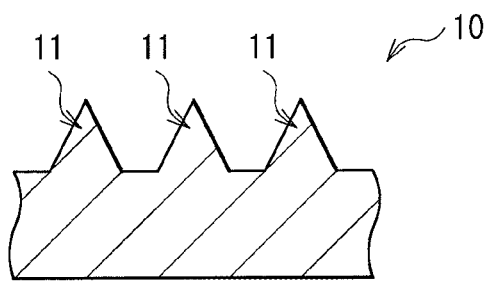

The light guide plate 10 guides light from the light source 20, disposed on one or more of the side faces of the light guide plate 10, to a top of the light guide plate 10. The light guide plate 10 has a shape in correspondence to a display panel (not shown) disposed on the top of the light guide plate 10, for example, a rectangular solid shape enclosed by a top, a bottom and side faces. It is to be noted that, among side faces of the light guide plate 10, a side face, through which light enters from the light source 20, is called light incidence surface 10A hereinafter. The light guide plate 10 has a plurality of belt-like convex portions 11 on the top, for example, as illustrated in FIG. 3A. Incidentally, the light guide plate 10 may have a plurality of belt-like convex portions 11 on the bottom, for example, as illustrated in FIG. 3B. While not shown, for example, the belt-like convex portions 11 may be provided in the inside of the light guide plate 10. The inside of light guide plate 10 may be formed hollowly, or may be closely packed.

Each convex portion 11 extends in a direction parallel to a normal to the light incidence surface 10A, and, for example, continuously formed from one side face of the light guide plate 10 to another side face opposed to the one side face, as illustrated in FIGS. 3A and 3B. A cross section of each convex portion 11 in an arrangement direction has a rectangular shape, a trapezoidal shape, or a triangle shape, for example, as illustrated in FIGS. 4A to 4D. When the cross section in the arrangement direction of each convex portion 11 has the rectangular shape, light goes highly straightly. This is suitable for a large-size backlight. In the case that the cross section in the arrangement direction of each convex portion 11 has the trapezoidal shape, when each convex portion 11 is formed by injection molding, melt extrusion molding, or hot press molding, a die to be used is easily processed, high mold releasability is achieved in molding, and yield and molding speed may be increased due to decrease in number of defects.

Figure 5:
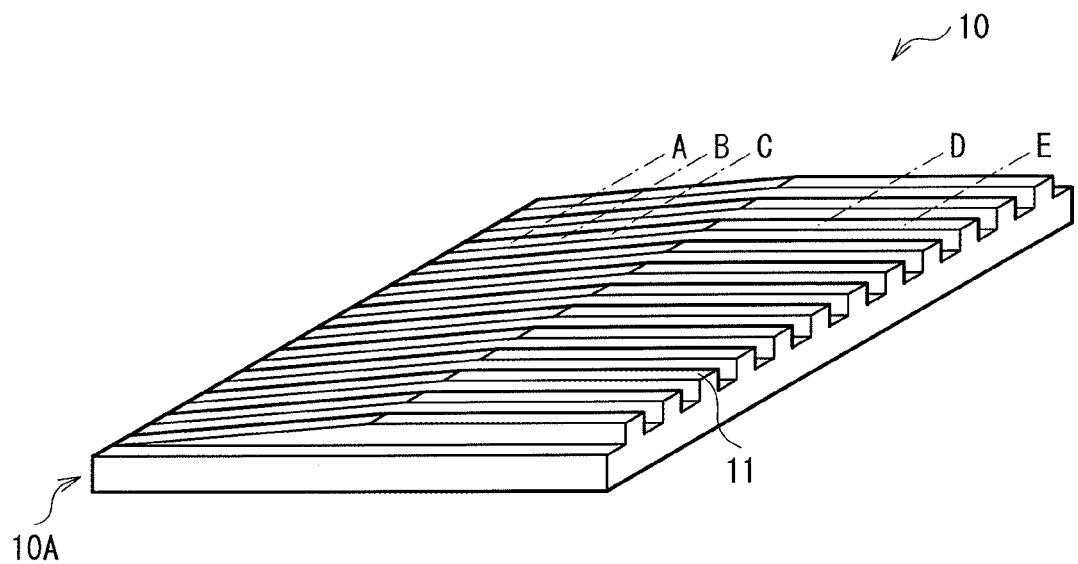
FIG. 5 is a perspective diagram illustrating another example of a configuration of the light guide plate in FIGS. 1A and 1B.
Figure 6:
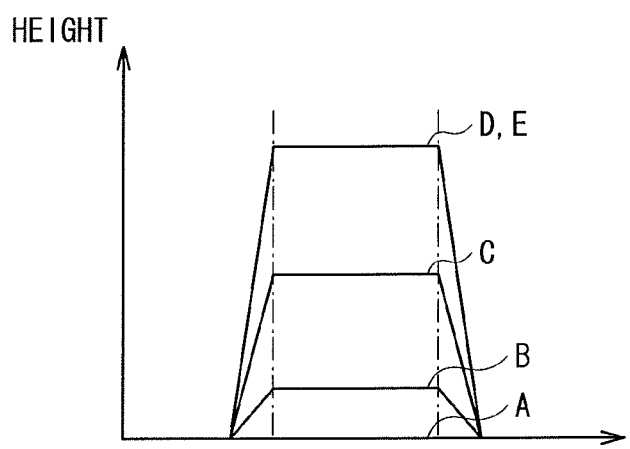
FIG. 6 is a section view illustrating an example of a configuration of each of convex portions of the light guide plate of FIG. 5.

A planar surface may be or may not be provided in a region between convex portions 11 adjacent to each other. A height of each convex portion 11 may be uniform or nonuniform in a plane. For example, when one side face of the light guide plate 10 corresponds to the light incidence surface 10A as illustrated in FIG. 5, the height of each convex portion 11 may be relatively low near the light incidence surface 10A, and relatively high near a side face opposed to the light incidence surface 10A. Alternatively, for example, when a pair of side faces opposed to each other, among side faces of the light guide plate 10, corresponds to light incidence surfaces 10A, the height of each convex portion 11 may be relatively low at either of the light incidence surfaces 10A and in the neighborhood thereof, and may be relatively high in other portions. The height of each convex portion 11 may be zero or substantially zero at the light incidence surface 10A and in the neighborhood thereof. For example, the height of each convex portion 11 may be increased as approaching a side face opposed to the light incidence surface 10A from the light incidence surface 10A, as illustrated in FIG. 6. Here, the height of each convex portion 11 may become constant on the way to the side face opposed to the light incidence surface 10A from the light incidence surface 10A. It is to be noted that the plurality of convex portions 11 nonuniform in height as illustrated in FIG. 5 may be provided in a portion other than the top of the light guide plate 10, for example, on a bottom of the light guide plate 10 or in the inside thereof.

Figure 7A:
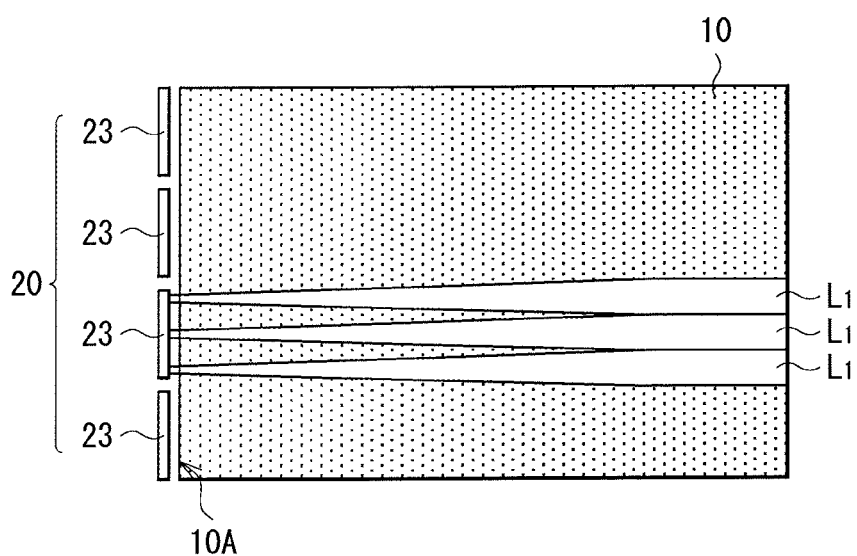
FIGS. 7A and 7B are schematic diagrams for explaining light guide in respective cases where convex portions are provided on a top of the light guide plate, and where the convex portions are not provided thereon.
Figure 7B:
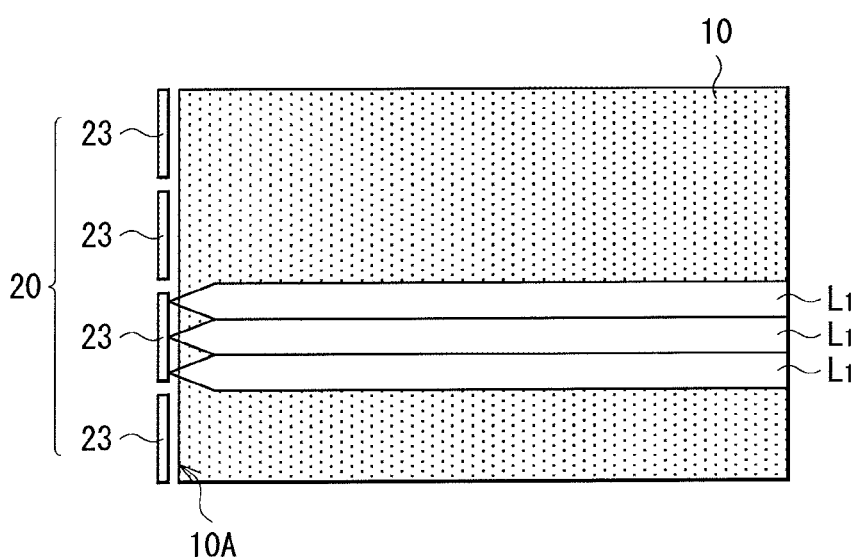

As described above, the height of the convex portion 11 (in other words, a depth of a groove formed between the convex portions 11) is changed, making it possible to change straight advance of light. For example, in the case that each convex portion 11 is provided on the light incidence surface 10A and in the neighborhood thereof as illustrated in FIGS. 3A and 3B, when one light source block 23 is turned on, light L1 output from the light source block 23 is transmitted through light guide plate 10 without significantly spreading in a lateral direction (width direction), for example, as exemplified in FIG. 7A. In this case, a dark portion may be formed between the dot-like light sources 21 in the neighborhood of the light incidence surface 10A. In such a case, image quality may be reduced. Thus, in such a case, it is preferable that the height of each convex portion 11 be made relatively low or made zero at the light incidence surface 10A and in the neighborhood thereof, for example, as illustrated in FIG. 5. This enables the light L1 output from the light source block 23 to be spread in a lateral direction (width direction) with a divergence angle of the dot-like light source 21 at the light incidence surface 10A and in the neighborhood thereof, and to be transmitted with an approximately constant width in a region away from the light incidence surface 10A, for example, as illustrated in FIG. 7B.

For example, the light guide plate 10 also acts as a support of an optical sheet (for example, a diffuser plate, a diffuser sheet, a lens film, or a polarization separation sheet) disposed between the display panel and the backlight 1 when applied to a display device. The light guide plate 10 mainly includes, for example, transparent thermoplastic resin such as polycarbonate (PC) resin or acrylic (polymethyl methacrylate (PMMA)) resin.

The reflective plate 40 returns light, leaking from the back of the light guide plate 10 through the light modulation element 30, to the light guide plate 10, and, for example, has functions of reflection, diffusion, and scattering of light. This enables light emitted from the light source 20 to be efficiently used, and helps front luminance be increased. The reflective plate 40 includes, for example, PET (polyethylene terephthalate) foam, a silver-deposited film, a multilayer reflected-film, or white PET.

In the embodiment, the light modulation element 30 is adhered to the back (bottom) of the light guide plate 10 with no air layer in between, and, for example, attached to the back of the light guide plate 10 via an adhesive (not shown). The light modulation element 30 includes, for example, a transparent substrate 31, a lower electrode 32, an alignment film 33, a light modulation layer 34, an alignment film 35, an upper electrode 36, and a transparent substrate 37 disposed in this order from a reflective plate 40 side, as illustrated in FIG. 1B.

The transparent substrate 31 or 37 supports the light modulation layer 34, and typically includes a substrate transparent to visible light, for example, a glass plate or a plastic film. The lower electrode 32 is provided on a surface of the transparent substrate 31 opposed to the transparent substrate 37, and includes a plurality of belt-like partial electrodes 32A extending in one direction in a surface, which are arranged in parallel, for example, as illustrated in FIGS. 8A and 8B showing part of the light modulation element 30. The upper electrode 36 is provided on a surface of the transparent substrate 37 opposed to the transparent substrate 31, and includes, for example, a single sheet-like electrode formed over the whole surface as illustrated in FIG. 8A. It is to be noted that the upper electrode 36 may include a plurality of belt-like partial electrodes 36A, arranged in parallel, extending in one direction in a surface corresponding to a direction crossing (or orthogonal to) the extending direction of the lower electrode 32. In this case, the partial electrodes 36A may be electrically connected to one another, or may be electrically separated from one another.

Respective patterns of the lower and upper electrodes 32 and 36 have a dependence on a drive method. For example, when the lower electrode 32 includes a plurality of belt-like partial electrodes 32A arranged in parallel, and the upper electrode 36 includes a plurality of belt-like partial electrodes 36A arranged in parallel, the partial electrodes 32A and 36A may be driven by simple matrix drive. When the upper electrode 36 is configured of a solid film (film formed on the whole surface), and the lower electrode 32 includes a plurality of belt-like partial electrodes 32A arranged in parallel, the partial electrodes 32A may be line-sequentially driven, for example. When the upper electrode 36 is configured of a solid film (film formed on the whole surface), and the lower electrode 32 includes a plurality of small electrodes arranged in a matrix, the small electrodes may be driven by, for example, active matrix drive. When the upper electrode 36 is configured of a solid film, and the lower electrode 32 is configured of a plurality of block-like electrodes with thin lead lines each, for example, segment type drive may be used, where each block-like electrode may be independently driven.

Each of the lower and upper electrodes 32 and 36 includes a transparent conductive material, for example, indium-tin oxide (ITO). The transparent conductive material is preferably small in absorption of visible light as much as possible. When light is guided through the light guide plate 10, the light passes through each of the upper and lower electrodes 36 and 32 of the light modulation element 30 many times. In the case of a large backlight 1, therefore, even if only several percent of light is absorbed when light is perpendicularly incident to a surface, luminance at the center of a screen may decrease by about several tens percent compared with luminance near the light incidence surface. In addition, the transparent conductive material is preferably small in wavelength dependence of absorption. When the material greatly absorbs a particular wavelength, chromaticity gradually changes as light is guided through the light guide plate 10, and consequently colors may become different between a screen center and a screen end.

The transparent conductive film including indium tin oxide is preferably crystallized to reduce absorption of light in a short wavelength range. The film is crystallized from an amorphous state, and therefore a bandgap of the film is widened, which shifts a light absorption range to an ultraviolet range, leading to decrease in absorption of light in a short wavelength range. When the film is crystallized, the transparent conductive film is preferably deposited while the transparent substrate 31 or 37 is heated, or a transparent conductive film is preferably annealed after depositing the film. In the case of indium tin oxide, the content of tin is preferably reduced because tin may cause lattice defects. However, since an extremely small content of tin makes it difficult to secure certain conductivity, the content of tin oxide is preferably 3 to 5%.

Figure 9:
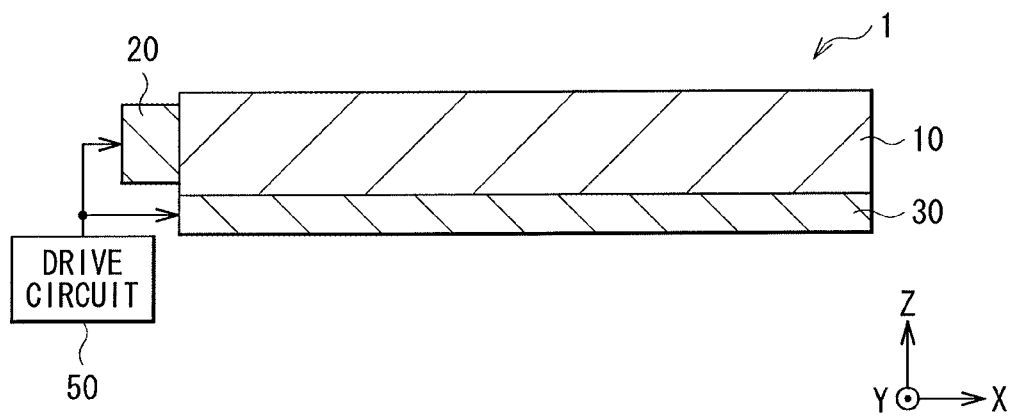
FIG. 9 is a section view illustrating another example of the configuration of the backlight of FIGS. 1A and 1B.

However, the lower electrode 32 need not necessarily include a transparent material, and, for example, may be configured of metal. It is to be noted that in the case that the lower electrode 32 is configured of metal, the lower electrode 32 also has a function of reflecting light, which enters the light modulation element 30 from the back of the light guide plate 10, like the reflective plate 40. In this case, therefore, the reflective plate 40 may be omitted, for example, as illustrated in FIG. 9.

In the case that the upper electrode 36 is configured of a solid film (film formed over the whole surface), when the light modulation element 30 is viewed from a normal direction of the element 30, each of portions of the light modulation element 30 opposed to the partial electrodes 32A configures a light modulation cell 30-1. For example, a portion illustrated by a broken line in FIG. 1B corresponds to the light modulation cell 30-1. In the case that the upper electrode 36 is configured of a plurality of the partial electrodes 36A, when the light modulation element 30 is viewed from a normal direction of the element 30, each of portions of the light modulation element 30 opposed to crossing portions between the partial electrodes 32A and 36A configures the light modulation cell 30-1. Each light modulation cell 30-1 may be independently driven by applying a predetermined voltage between the lower and upper electrodes 32 and 36, and exhibits a transparent property or a scattering property to light from the light source 20 depending on magnitude of a voltage value applied between the lower and upper electrodes 32 and 36. It is to be noted that the transparent property and the scattering property will be described in detail in description of the light modulation layer 34.

For example, the alignment film 33 or 35 aligns a liquid crystal or a monomer used for the light modulation layer 34. A type of the alignment film includes, for example, a vertical alignment film and a horizontal alignment film, and the horizontal alignment film is used for the alignment film 33 or 35 in the embodiment. The horizontal alignment film includes, for example, an alignment film formed through rubbing treatment of polyimide, polyamideimide, polyvinyl alcohol, or an alignment film with grooves added by transfer or etching. Moreover, the horizontal alignment film includes, for example, an alignment film formed by obliquely evaporating an inorganic material such as silicon oxide, an alignment film of diamond-like carbon formed by ion beam irradiation, and an alignment film with electrode pattern slits formed thereon. When a plastic film is used for the transparent substrate 31 or 37, since baking temperature is preferably low after coating of the alignment film 33 or 35 on a surface of the transparent substrate 31 or 37 in a manufacturing process, polyamideimide capable of being formed at a temperature of 100° C. or lower is preferably used for the alignment film 33 or 35.

It is to be noted that the horizontal alignment film may have a function of adding pre-tilt to liquid crystal molecules in contact with the relevant horizontal alignment film. For example, rubbing is listed as a method to allow the horizontal alignment film to exhibit a pre-tilt function. Pre-tilt means that a major axis of the liquid crystal molecules adjacent to an alignment film crosses, at a small angle, "a particular direction in a plane of the alignment film" or "a normal to the alignment film", for example. For example, the horizontal alignment film may have a function to allow the major axis of the liquid crystal molecules adjacent to the relevant horizontal alignment film to cross, at a small angle, a surface of the light incidence surface 10A in a direction parallel to a surface of the relevant horizontal alignment film.

Either of the vertical and horizontal alignment films only needs to have a function of aligning a liquid crystal and a monomer, and need not have reliability against repeated voltage application, which is typically demanded for a liquid crystal display. This is because reliability of a produced device against applied voltage is determined by an interface between a polymerized product of the monomer and the liquid crystal. Even if the alignment film is not used, the liquid crystal and the monomer used for the light modulation layer 34 may be aligned, for example, by applying an electric field or a magnetic field between the lower and upper electrodes 32 and 36. In other words, an alignment state of the liquid crystal or the monomer under voltage application may be fixed by performing ultraviolet irradiation while an electric field or a magnetic field is applied between the lower and electrodes 32 and 36. When voltage is used to form the alignment film, electrodes are separately formed for each of alignment and drive. Alternatively, a two-frequency liquid crystal, reversed in sign of dielectric anisotropy depending on frequencies, may be used as a liquid crystal material. When a magnetic field is used to form the alignment film, a material having a large magnetic-susceptibility anisotropy, for example, a material having many benzene rings is preferably used for the alignment film.

The light modulation layer 34 exhibits a scattering property or a transparent property to light from the light source 20 depending on magnitude of an electric field. Specifically, the light modulation layer 34 exhibits the transparent property to light from the light source 20 when no voltage is applied between the lower and upper electrodes 32 and 36, and exhibits the scattering property to the light from the light source 20 when a voltage is applied between the electrodes 32 and 36. The light modulation layer 34 is configured of a composite layer including a bulk 34A and a plurality of fine particles 34B dispersed in the bulk 34A, for example, as illustrated in FIG. 1B. The bulk 34A and the fine particles 34B each have optical anisotropy.

Figure 10:
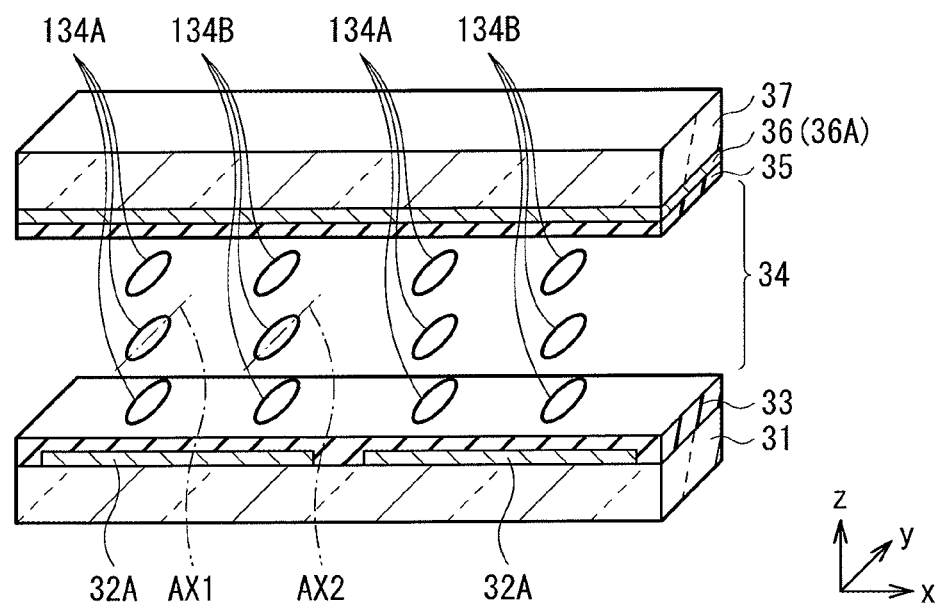
FIG. 10 is a schematic diagram for explaining alignment when a voltage is not applied to a light modulation element in FIGS. 1A and 1B.

FIG. 10 schematically illustrates an example of an alignment state in each of the bulk 34A and the fine particles 34B when no voltage is applied between the lower and upper electrodes 32 and 36. An ellipsoid 134A in FIG. 10 illustrates an example of an optical indicatrix showing refractive-index anisotropy of the bulk 34A when no voltage is applied between the lower and upper electrodes 32 and 36. An ellipsoid 134B in FIG. 10 illustrates an example of an optical indicatrix showing refractive-index anisotropy of the fine particles 34B when no voltage is applied between the lower and upper electrodes 32 and 36. Each optical indicatrix shows, with a tensor ellipsoid, refractive indices of linearly polarized light entering from various directions, where a refractive index may be geometrically known through observation of a section of the ellipsoid from a light incidence direction.

Figure 11:
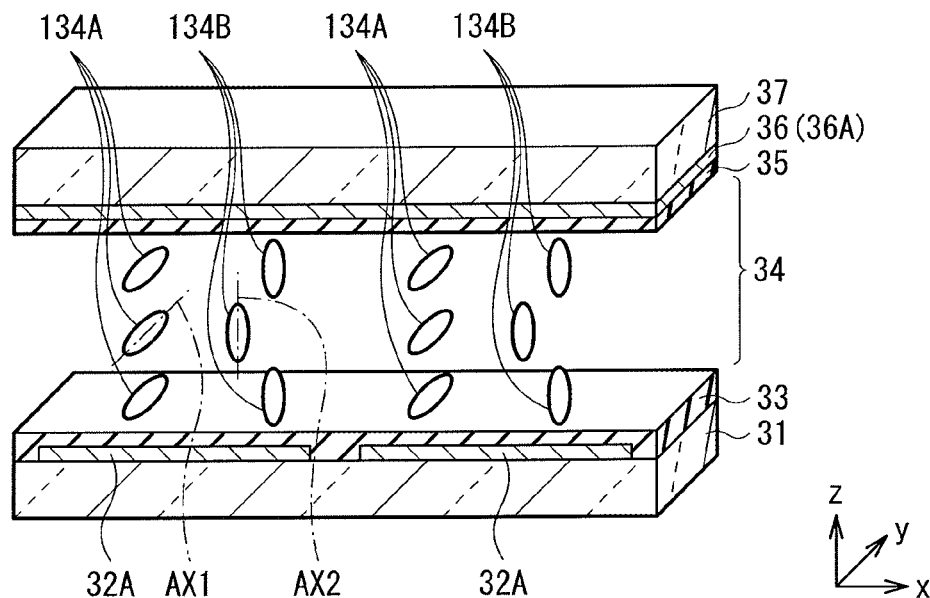
FIG. 11 is a schematic diagram for explaining alignment when a voltage is applied to the light modulation element in FIGS. 1A and 1B.

FIG. 11 schematically shows an example of an alignment state in each of the bulk 34A and the fine particles 34B when a voltage is applied between the lower and upper electrodes 32 and 36. An ellipsoid 134A in FIG. 11 illustrates an example of an optical indicatrix showing refractive-index anisotropy of the bulk 34A when a voltage is applied between the lower and upper electrodes 32 and 36. An ellipsoid 134B in FIG. 11 illustrates an example of an optical indicatrix showing refractive-index anisotropy of the fine particles 34B when a voltage is applied between the lower and upper electrodes 32 and 36.

The bulk 34A and each fine particle 34B are configured such that when no voltage is applied between the lower and upper electrodes 32 and 36, a direction of a light axis AX1 of the bulk 34A (major axis of the ellipsoid 134A) is equal (parallel) to a direction of a light axis AX2 of the fine particle 34B (major axis of the ellipsoid 134B), for example, as illustrated in FIG. 10. It is to be noted that the light axes AX1 and AX2 refer to lines parallel to a forward direction of a beam, where a refractive index has one value regardless of a polarization direction. When no voltage is applied between the lower and upper electrodes 32 and 36, the direction of the light axis AX1 and the direction of the light axis AX2 need not accurately correspond to each other, and may be somewhat different due to, for example, manufacturing errors.

When no voltage is applied between the lower and upper electrodes 32 and 36, the light axis AX2 is parallel (or substantially parallel) to the light incidence surface 10A of the light guide plate 10, and parallel (or substantially parallel) to a surface of the transparent substrate 31. In other words, when no voltage is applied between the lower and upper electrodes 32 and 36, the light axis AX2 is parallel (or substantially parallel) to a surface including the lower or upper electrode 32 or 36, and is parallel (or substantially parallel) to an extending direction of the partial electrodes 32A.

On the other hand, the bulk 34A is configured such that the light axis AX1 is fixed regardless of presence of voltage application between the lower and upper electrodes 32 and 36. Specifically, the light axis AX1 is parallel (or substantially parallel) to the light incidence surface 10A of the light guide plate 10, and parallel (or substantially parallel) to the surface of the transparent substrate 31. In other words, when no voltage is applied between the lower and upper electrodes 32 and 36, the light axis AX1 is parallel (or substantially parallel) to the light axis AX2.

It is to be noted that the light axis AX2 need not be necessarily parallel to the light incidence surface 10A of the light guide plate 10 and to the surface of the transparent substrate 31, and may be oriented in a direction crossing, at a small angle, one or both of the light incidence surface 10A and the surface of the transparent substrate 31 due to, for example, manufacturing errors.

Figure 12:
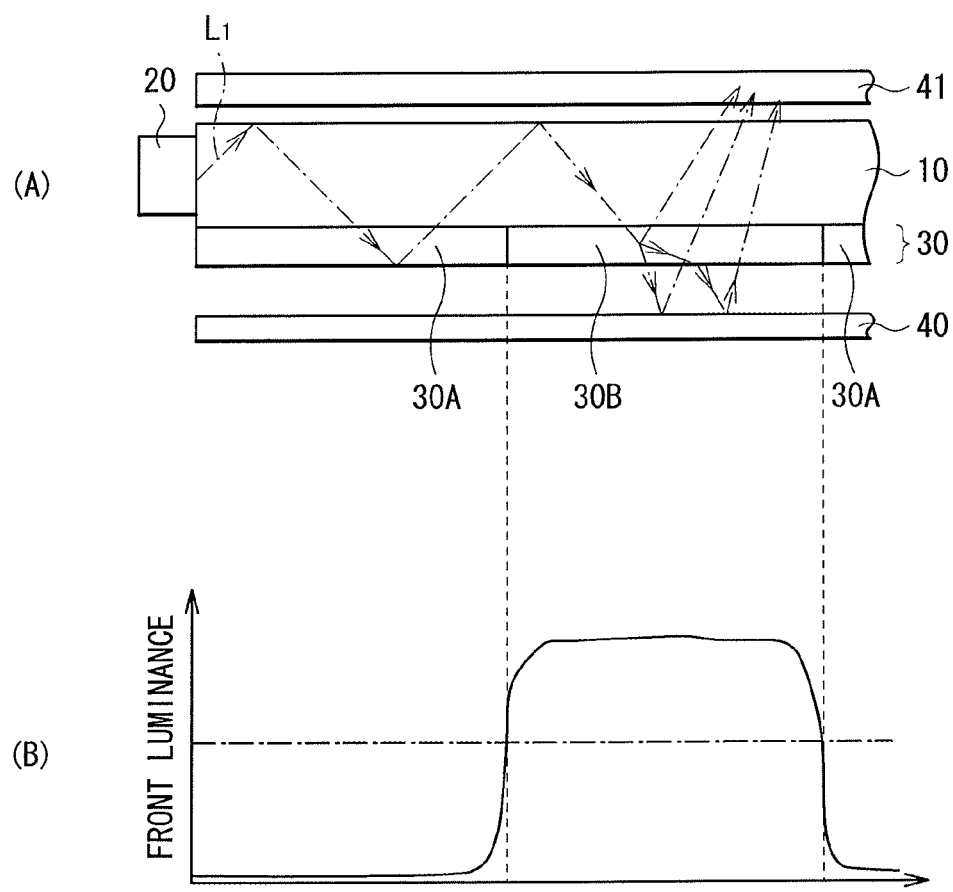
FIG. 12 is a schematic diagram for explaining operation of the backlight of FIGS. 1A and 1B.

Preferably, an ordinary refractive index of the bulk 34A is equal to that of the fine particle 34B, and an extraordinary refractive index of the bulk 34A is also equal to that of the fine particle 34B. In such a case, for example, when no voltage is applied between the lower and upper electrodes 32 and 36, substantially no difference in refractive index exists in all directions including front and oblique directions, leading to a high transparent property. Accordingly, for example, light going in a front or oblique direction is hardly scattered within the light modulation layer 34 and thus transmitted through the layer 34. As a result, for example, as illustrated in (A) and (B) of FIG. 12, light L from the light source 20 (light in an oblique direction) is totally reflected at a boundary of a transparent region (transmitting region 30A) in the light modulation element 30 (boundary between the transparent substrate 31 or the light guide plate 10 and air), and therefore luminance in the transmitting region 30A (luminance of black display) decreases compared with a case where the light modulation element 30 is not provided (alternate long and short dash line in (B) of FIG. 12). It is to be noted that a graph of (B) of FIG. 12 is obtained when front luminance is measured in a condition that a diffuser sheet 41 is disposed on the light guide plate 10 as illustrated in (A) of FIG. 12.

The bulk 34A and the fine particle 34B are configured such that, for example, when a voltage is applied between the lower and upper electrodes 32 and 36, a direction of the light axis AX1 is different from (crosses or is orthogonal to) a direction of the light axis AX2 as illustrated in FIG. 11. For example, when a voltage is applied between the lower and upper electrodes 32 and 36, the light axis AX2 of the fine particle 34B is parallel (or substantially parallel) to the light incidence surface 10A of the light guide plate 10, and parallel (or substantially parallel) to a normal to the transparent substrate 31. In other words, when a voltage is applied between the lower and upper electrodes 32 and 36, the light axis AX2 is orthogonal (or substantially orthogonal) to a surface including the lower or upper electrode 32 or 36.

Accordingly, when a voltage is applied between the lower and upper electrodes 32 and 36, difference in refractive index of the light modulation layer 34 is large in all directions in a plane parallel to the light incidence surface 10A, leading to a high scattering property. Consequently, for example, light going in a front or oblique direction is scattered within the light modulation layer 34. As a result, light L (light in an oblique direction) from the light source 20 is transmitted through a boundary (boundary between the transparent substrate 31 or the light guide plate 10 and air) of a scattering region in the light modulation element 30 (scattering region 30B), and light transmitted to a reflective plate 40 side is reflected by the reflective plate 40 and then transmitted through the light modulation element 30, for example, as illustrated in (A) and (B) of FIG. 12. Luminance is therefore extremely high in the scattering region 30B compared with a case where the light modulation element 30 is not provided (alternate long and short dash line in (B) of FIG. 12), and luminance of partial white display (luminance enhancement) increases in correspondence to decrease in luminance in the transmitting region 30A.

It is to be noted that the ordinary refractive index of the bulk 34A may be somewhat different from that of the fine particle 34B due to, for example, manufacturing errors. For example, such difference is preferably 0.1 or less, and more preferably 0.05 or less. Similarly, the extraordinary refractive index of the bulk 34A may be somewhat different from that of the fine particle 34B due to, for example, manufacturing errors. For example, such difference is preferably 0.1 or less, and more preferably 0.05 or less.

Refractive-index difference of the bulk 34A (=extraordinary refractive index-ordinary refractive index) or refractive-index difference of the fine particle 34B (=extraordinary refractive index-ordinary refractive index) is preferably large, 0.05 or more, more preferably 0.1 or more, and still more preferably 0.15 or more. When refractive-index difference of each of the bulk 34A and the fine particle 34B is large, light-scattering ability of the light modulation layer 34 is improved, so that a light guide condition may be easily broken, and consequently light is easily extracted from the light guide plate 10.

The bulk 34A and the fine particle 34B are different from each other in response speed to an electric field. The bulk 34A has, for example, a striped or porous structure that is hardly responsive to an electric field, or a rod-like structure having a response speed slower than the fine particle 34B. The bulk 34A is formed of, for example, a polymer material obtained by polymerizing a low-molecular monomer. The bulk 34A is, for example, formed by polymerizing an alignable and polymerizable material (for example, monomer), which has been aligned along an alignment direction of the fine particle 34B or along an alignment direction of the alignment film 33 or 35, by one or both of heat and light.

On the other hand, the fine particle 34B mainly includes, for example, a liquid crystal material, and thus has a response speed faster than the bulk 34A. The liquid crystal material (liquid crystal molecules) in the fine particle 34B includes, for example, rod-like molecules. Liquid crystal molecules having positive dielectric constant anisotropy (so-called positive liquid crystal) are preferably used as the liquid crystal molecules in the fine particle 34B.

When no voltage is applied between the lower and upper electrodes 32 and 36, a major axis direction of each liquid crystal molecule is parallel to the light axis AX1 in the fine particle 34B. At this time, the major axis of the liquid crystal molecule in the fine particle 34B is parallel (or substantially parallel) to the light incidence surface 10A of the light guide plate 10 and parallel (or substantially parallel) to the surface of the transparent substrate 31. When a voltage is applied between the lower and upper electrodes 32 and 36, the major axis direction of the liquid crystal molecule crosses (or is orthogonal to) the light axis AX1 in the fine particle 34B. At this time, the major axis of the liquid crystal molecule in the fine particle 34B is parallel (or substantially parallel) to the light incidence surface 10A of the light guide plate 10 and parallel (or substantially parallel) to the normal to the transparent substrate 31.

While any monomer can be used as the alignable and polymerizable monomer as long as the monomer is optically anisotropic and mixable with the liquid crystal, a UV-curable low-molecular monomer is particularly preferable in the embodiment. When no voltage is applied, a direction of optical anisotropy of the liquid crystal preferably corresponds to that of a polymerization product (polymer material) of the low-molecular monomer. It is therefore preferable that the liquid crystal and the low-molecular monomer are aligned in the same direction before UV curing. In the case that a liquid crystal is used for the fine particle 34B, when the liquid crystal includes rod-like molecules, a monomer material having a rod-like shape is preferably used. According to the above, a polymerizable and liquid-crystalline material is preferably used as the monomer material, and, for example, the material preferably has, as a polymerizable functional group, one or more functional group selected from functional groups including an acrylate group, a methacrylate group, an acryloyloxy group, a methacryloyloxy group, a vinyl ether group, and an epoxy group. Each of the functional groups may be polymerized through irradiation of ultraviolet rays, infrared rays, or an electron beam, or through heating. A liquid crystalline material having a multifunctional group may be added to the material to suppress reduction in alignment during UV irradiation. When the bulk 34A has the striped structure mentioned above, a bifunctional liquid-crystalline monomer is preferably used as a material of the bulk 34A. A monofunctional monomer may be added to a material of the bulk 34A in order to adjust liquid-crystallinity-exhibiting temperature, or a tri- or more-functional monomer may be added to the material in order to increase crosslink density.

For example, the drive circuit 50 controls magnitude of voltage applied to a partial electrode 32A such that the light axis AX2 of the fine particle 34B is parallel or substantially parallel to the light axis AX1 of the bulk 34A in a light modulation cell 30-1, and the light axis AX2 crosses or is orthogonal to the light axis AX1 in another light modulation cell 30-1. In other words, the drive circuit 50 may control directions of the light axis AX1 of the bulk 34A and the light axis AX2 of the fine particle 34B to be equal (or substantially equal) to each other or different from (or orthogonal to) each other.

For example, the drive circuit 50 applies to the partial electrode 32A a voltage modulated with a crest value, a duty ratio, and frequency depending on a distance from the light source 20 to the partial electrode 32A. For example, voltage is modulated in such a manner that a scattering property of the light modulation cell 30-1 is intensified with increase in distance from the light source 20. Furthermore, for example, the drive circuit 50 may apply to the partial electrode 32A a voltage modulated with a crest value, a duty ratio, and frequency not only depending on a distance from the light source 20 to the partial electrode 32A but also in consideration of a video signal input from the outside.

In addition, for example, the drive circuit 50 may apply, to each light source block 23, power modulated with a crest value, a duty ratio, and frequency depending on a distance from the light source 20 to a partial electrode 32A as a voltage application object, and based on a video signal input from the outside. In addition, for example, the drive circuit 50 may sequentially supply power to the light source blocks 23 to scan each of the light source blocks 23.

Hereinafter, a method of manufacturing the backlight 1 of the embodiment is described with reference to FIGS. 13A to 13C to FIGS. 15A to 15C.

Figure 13A:
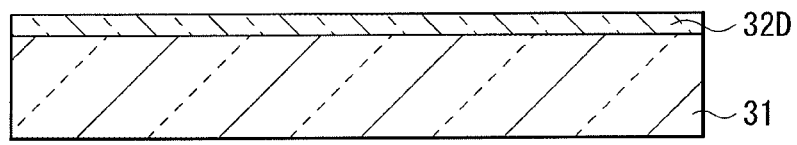
FIGS. 13A to 13C are section diagrams for explaining a manufacturing process of the backlight of FIGS. 1A and 1B.
Figure 13B:
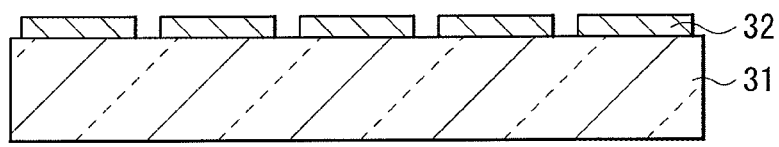

First, transparent conductive film 32D such as ITO is formed on the transparent substrate 31 including glass or a plastic film, (FIG. 13A). Next, a patterned resist layer (not shown) is formed on the transparent conductive film 32D, and then the transparent conductive film 32D is selectively etched with the resist layer as a mask. As a result, the lower electrode 32 is formed (FIG. 13B).

Figure 13C:
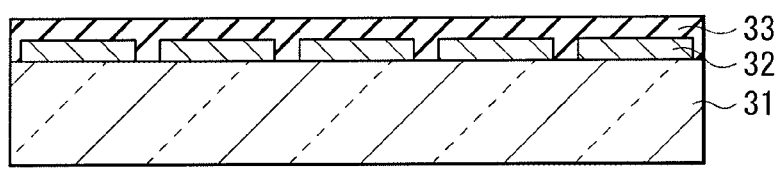

Next, the alignment film 33 is coated on the whole surface, and then the coated film is dried and baked (FIG. 13C). When a polyimide-series material is used for the alignment film 33, NMP (N-methyl-2-pylorydon) is often used as a solvent. In such a case, approximately 200° C. is necessary for baking in atmosphere. It is to be noted that when a plastic substrate is used for the transparent substrate 31 or 37 in this case, the alignment film 33 may be vacuum-dried and baked at 100° C. Then, rubbing treatment is performed on the alignment film 33. Consequently, the alignment film 33 may function as an alignment film for horizontal alignment.

Figure 14A:
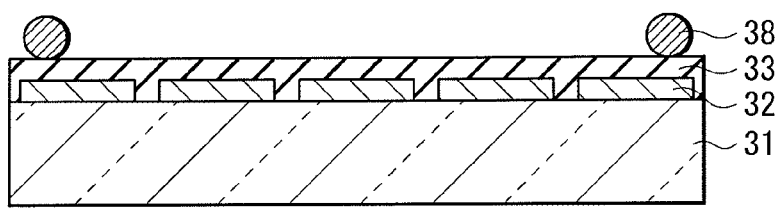
FIGS. 14A to 14C are section diagrams for explaining the manufacturing process following FIGS. 13A to 13C.

Next, spacers 38 are sprayed on the alignment film 33 by a dry or wet process to form a cell gap (FIG. 14A). It is to be noted that when the light modulation cell 30-1 is formed by a vacuum bonding method, the spacers 38 may be mixed in a mixture to be dropped. Columnar spacers may be formed by a photolithography method in place of the spacers 38.

Figure 14B:
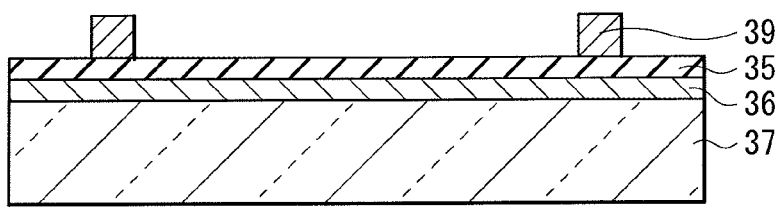

Next, a sealing agent 39 is coated on the alignment film 35, which has been prepared in the same way as above, for example, in a frame pattern in order to perform bonding and prevent leakage of a liquid crystal (FIG. 14B). Such a sealing agent pattern 39 may be formed by a dispenser method or a screen printing method.

While a vacuum bonding method (One Drop Fill method, or ODF method) is described below, the light modulation cell 30-1 may be formed by a vacuum injection method or a roll bonding method.

Figure 14C:
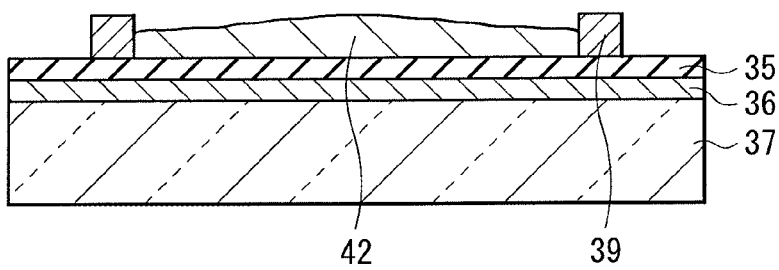

First, a mixture 42 of a liquid crystal and a monomer, corresponding to a volume determined by a cell gap and cell area, is uniformly dropped in a plane (FIG. 14C). While the mixture 42 is preferably dropped by a linear-guide-type precision dispenser, a die coater may be used with the sealing agent pattern 39 as a bank.

While the aforementioned materials may be used as the liquid crystal and the monomer, a weight ratio of the liquid crystal to the monomer is 98/2 to 50/50, preferably 95/5 to 75/25, and more preferably 92/8 to 85/15. While drive voltage may be reduced by increasing a percentage of the liquid crystal, if the percentage of the liquid crystal is extremely large, whiteness tends to be reduced during voltage application, or the mixture tends to hardly return to a transparent state after turning off a voltage due to reduction in response speed.

A polymerization initiator is added to the mixture 42 in addition to the liquid crystal and the monomer. A ratio between the polymerization initiator to be added and the monomer is adjusted within a range of 0.1 to 10 percent by weight depending on a UV wavelength to be used. In addition, a polymerization inhibitor, a plasticizer, a viscosity modifier may be added to the mixture 42 as necessary. When the monomer is in a solid or gel state at room temperature, a cap, a syringe, and a substrate are preferably warmed.

The transparent substrates 31 and 36 are set in a vacuum bonder (not shown), and then the vacuum bonder is evacuated for bonding (FIG. 15A). Then, the bonded cell is released to the atmosphere and then uniformly pressurized at atmospheric pressure to make a cell gap uniform. The cell gap, which may be appropriately selected based on a relationship between white luminance (whiteness) and drive voltage, is 5 to 40 μm, preferably 6 to 20 μm, and more preferably 7 to 10 μm.

After bonding, alignment treatment is preferably performed as necessary (not shown). When the bonded cell is inserted between crossed nicol polarizers, if light leakage occurs, the cell is heated for a certain time or left to stand at room temperature for alignment. Then, the cell is irradiated with ultraviolet rays L3 to polymerize the monomer (FIG. 15B). In this way, the light modulation element 30 is manufactured.

When ultraviolet rays are irradiated, cell temperature is preferably controlled to be hardly changed. Preferably, an infrared cut filter is used, or UV-LED is used as a light source. Since ultraviolet irradiation affects a structure of a composite material, ultraviolet irradiance is preferably appropriately adjusted depending on the liquid crystal material or monomer material to be used or a composition of each material, and preferably within a range of 0.1 to 500 mW/cm$^2$, and more preferably 0.5 to 30 mW/cm$^2$. Since drive voltage tends to be lower with decrease in ultraviolet irradiance, preferable ultraviolet irradiance may be selected in the light of both productivity and properties.

Then, the light modulation element 30 is attached to the light guide plate 10 (FIG. 15C). While the light modulation element 30 may be attached to the light guide plate 10 by either adhesion or bonding, the element 30 is preferably adhered or bonded to the plate 10 with a material having a refractive index similar to that of the light guide plate 10 and to that of a substrate material of the light modulation element 30. Finally, lead lines (not shown) are attached to the lower electrode 32 and the upper electrode 36. In this way, the backlight 1 of the embodiment is manufactured.

While description has been made on a process where the light modulation element 30 is formed and then attached to the light guide plate 10, a transparent substrate 36, having the alignment film 35 formed thereon, may be beforehand attached to a surface of the light guide plate 10 to produce the backlight 1. Moreover, the backlight 1 may be produced by either of a sheet-feed method and a roll-to-roll method.

Next, operation and effects of the backlight 1 of the embodiment are described.

In the backlight 1 of the embodiment, for example, a voltage is applied between the lower and upper electrodes 32 and 36 of each light modulation cell 30-1 such that the light axis AX2 of the fine particle 34B is parallel or substantially parallel to the light axis AX1 of the bulk 34A in a light modulation cell 30-1, and the light axis AX2 crosses or is orthogonal to the light axis AX1 in another light modulation cell 30-1. According to this, light, which is emitted from the light source 20 and then enters the light guide plate 10, is transmitted through the transmitting region 30A, where the light axis AX1 is parallel or substantially parallel to the light axis AX2, of the light modulation element 30. On the other hand, light, which is emitted from the light source 20 and then enters the light guide plate 10, is scattered by the scattering region 30B, where the light axis AX1 crosses or is orthogonal to the light axis AX2, of the light modulation element 30. Some light of the scattered light passes through a bottom of the scattering region 30B, and is reflected by the reflective plate 40 and returned to the light guide plate 10, and then output from a top of the backlight 1. Moreover, some light of the scattered light goes to a top of the scattering region 30B, and is transmitted through the light guide plate 10, and is then output from the top of the backlight 1. In this way, in the embodiment, light is hardly output from a top of the transmitting region 30A, and is largely output from the top of the scattering region 30B. In this way, a modulation ratio is increased in a front direction.

PDLC is typically formed by mixing a liquid crystal material and an isotropic low-molecular material, and then inducing phase separation by ultraviolet irradiation or solvent drying, and includes a composite layer, in which fine particles of the liquid crystal material are dispersed in a polymer material. The liquid crystal material in the composite layer is randomly directed and therefore exhibits a light-scattering property during no voltage application, but is aligned in an electric-field direction during voltage application, and therefore when an ordinary refractive index of the liquid crystal material is equal to a refractive index of the polymer material, the liquid crystal material exhibits a high transparent property in a front direction (normal direction of PDLC). However, in the liquid crystal material, an extraordinary refractive index of the liquid crystal material is significantly different from the refractive index of the polymer material in an oblique direction, and therefore the PDLC exhibits a scattering property in the oblique direction despite exhibiting high transparent property in the front direction.

Typically, a light modulation element using PDLC often has a structure where PDLC is sandwiched between two glass plates each having a transparent conductive film formed thereon. When light obliquely enters, from the air, the light modulation element having the above structure, the obliquely incident light is refracted due to difference in refractive index between air and the glass plate, and thus enters the PDLC at a relatively small angle. Significant scattering therefore hardly occurs in such a light modulation element. For example, when light enters the element at a degree of 80° from the air, an incident angle of the light to PDLC is reduced to approximately 40° due to refraction at a glass boundary.

However, in an edge light type PDLC using a light guide plate, since light enters through the light guide plate, the light traverses the PDLC at a large angle of approximately 80°. An extraordinary refractive index of a liquid crystal material is therefore greatly different from a refractive index of a polymer material, and furthermore, light traverses the PDLC at the large angle, which increases length of a light path in which light is scattered. For example, when fine particles of a liquid crystal material having an ordinary refractive index of 1.5 and an extraordinary refractive index of 1.65 are dispersed in a polymer material having a refractive index of 1.5, no difference in refractive index exists in a front direction (normal direction of PDLC), but the difference in refractive index is large in an oblique direction. This makes it difficult to reduce light-scattering in the oblique direction, leading to an inferior view angle characteristic. Furthermore, when an optical film such as a diffuser film is provided on the light guide plate, since oblique leakage light is diffused even in a front direction by the diffuser film, light leakage in the front direction increases, thereby leading to a low modulation ratio in the front direction.

On the other hand, in the embodiment, since each of the bulk 34A and the fine particle 34B mainly includes an optically anisotropic material, light-scattering is reduced in an oblique direction and thus transparency may be improved in the direction. For example, when the bulk 34A and the fine particle 34B mainly include optically anisotropic materials being equal in ordinary refractive index and in extraordinary refractive index, directions of respective light axes of the bulk 34A and the particle 34B are equal or substantially equal to each other in a region where no voltage is applied between the lower and upper electrodes 32 and 36. Consequently, refractive-index difference is reduced or eliminated in all directions including a front direction (normal direction of the light modulation element 30) and an oblique direction, leading to high transparency. As a result, light leakage may be reduced or substantially eliminated over a wide view-angle range, leading to improvement in view angle characteristic.

For example, when a liquid crystal having an ordinary refractive index of 1.5 and an extraordinary refractive index of 1.65 and a liquid-crystalline monomer having an ordinary refractive index of 1.5 and an extraordinary refractive index of 1.65 are mixed, and the liquid-crystalline monomer is polymerized while the liquid crystal and the liquid-crystalline monomer are aligned by an alignment film or by an electric field, a light axis of the liquid crystal corresponds to a light axis of a polymer as a product of polymerization of the liquid-crystalline monomer. Consequently, refractive indices may be made equal in all directions. In such a case, a high transparent state may be achieved, leading to further improvement in view angle characteristic.

Moreover, in the embodiment, luminance in the transmitting region 30A (luminance of black display) decreases compared with a case where the light modulation element 30 is not provided (the alternate long and short dash line in (B) of FIG. 12), for example, as illustrated in (A) and (B) of FIG. 12. On the other hand, luminance in the scattering region 30B is extremely high compared with the case where the light modulation element 30 is not provided (the alternate long and short dash line in (B) of FIG. 12), and luminance of partial white display (luminance enhancement) is increased in correspondence to decrease in luminance in the transmitting region 30A.

The luminance enhancement refers to a technique to increase luminance in the case of partial white display compared with in the case of full-screen white display. The technique is generally used for CRT or PDP. However, in a liquid crystal display, since a backlight uniformly emits light over the whole area regardless of an image, luminance may not be partially increased. When an LED backlight including a plurality of LEDs arranged two-dimensionally is used as the backlight, the LEDs may be partially turned off. In such a case, however, light is hardly diffused from a dark region where LEDs are turned off, resulting in reduction in luminance compared with a case where all LEDs are turned on. While luminance may be increased by increasing current applied to LEDs being partially turned on, large current flows within an extremely short time in such a case, thereby leading to a difficulty in a circuit load or reliability.

On the other hand, in the embodiment, since each of the bulk 34A and the fine particle 34B mainly includes the optically anisotropic material, scattering is suppressed in an oblique direction, and therefore light leakage from the light guide plate is reduced in a dark state. Consequently, light is guided from a partially dark portion to a partially light portion, making it possible to achieve luminance enhancement without increasing input power to the backlight 1.

Moreover, in the embodiment, the light guide plate 10 has the plurality of belt-like convex portions 11, and a plurality of partial electrodes 32A, extending in a direction crossing the convex portions 11, are provided. Furthermore, in the embodiment, the light source 20 is configured of a plurality of light source blocks 23 that may be independently driven. Consequently, for example, one light source block 23 is turned on, and one partial electrode 32A is driven, thereby light output from the turned-on light source block 23 is transmitted through the light guide plate 10 along the convex portions 11, and furthermore the light is extracted from a site (hereinafter, called "crossing site"), at which a portion, where light is transmitted through the light guide plate 10 along the convex portion 11, crosses the driven partial-electrode 32A as viewed from a normal direction of the light guide plate 10. At this time, a portion of the light modulation layer 34 corresponding to the driven partial electrode 32A exhibits the scattering property, and a pair of edges, opposed to each other in the extending direction of the partial electrodes 32A, of the crossing site have no boundary between scattering and transparency while the boundary has been formed within the light modulation layer 34. Consequently, luminance distribution of light extracted from the light guide plate 10 gently changes in the extending direction of the partial electrodes 32A. According to the above, in the embodiment, a light-and-dark boundary of illumination light may be blurred without obstructing reduction in thickness. In addition, in the embodiment, one or more partial electrodes 32A are driven while the light source blocks 23 are sequentially turned on, making it possible to achieve simple matrix drive.

2. Second Embodiment

Figure 16A:
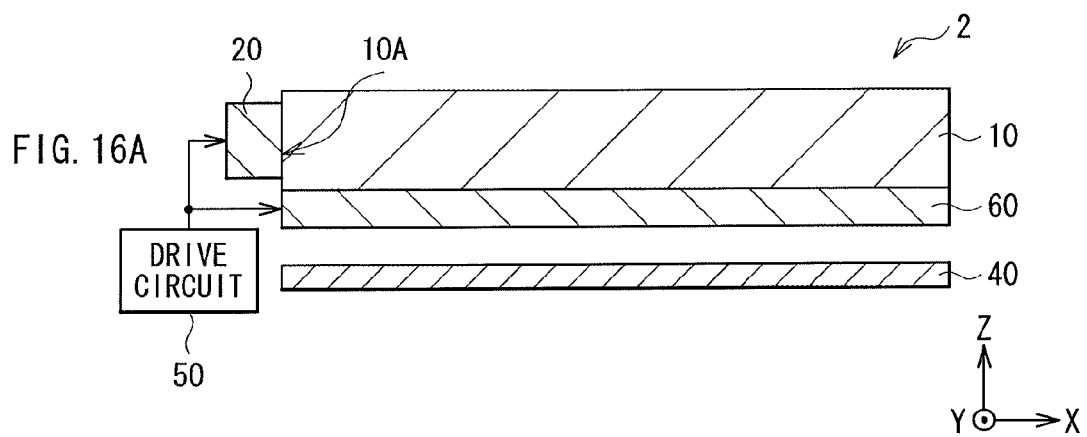
FIGS. 16A and 16B are section views illustrating an example of a configuration of a backlight according to a second embodiment of the disclosure.
Figure 16B:
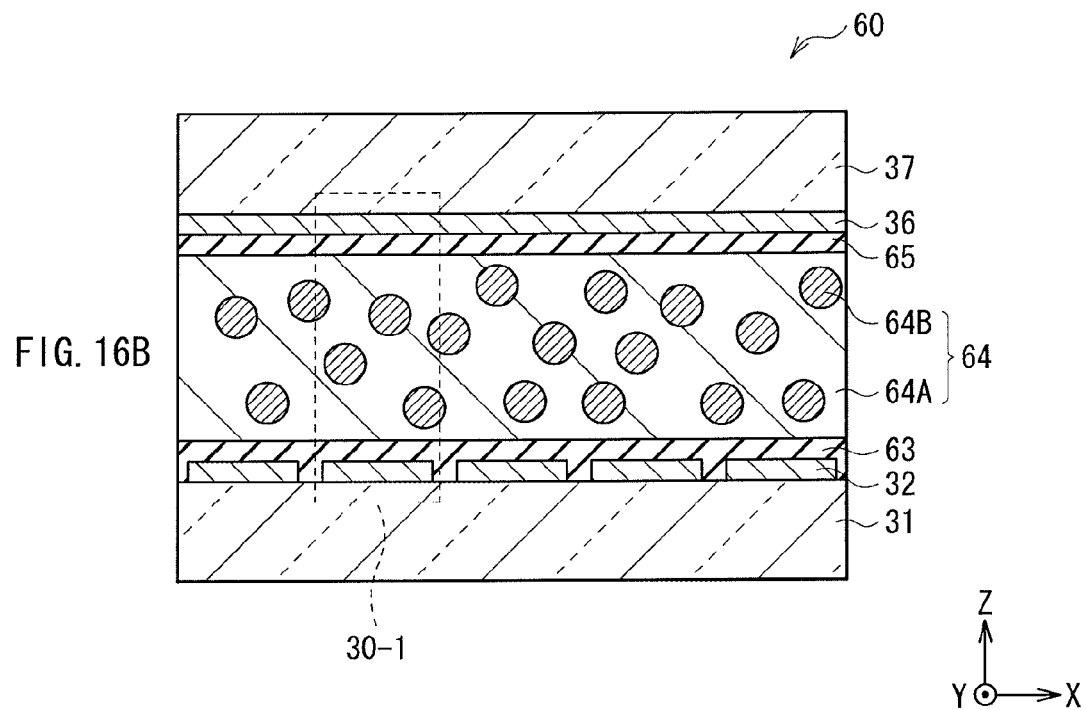

FIG. 16A is a section view illustrating an example of a schematic configuration of a backlight 2 (illumination device) according to a second embodiment of the disclosure. FIG. 16B is a section view illustrating an example of a detailed configuration of the backlight 2 of FIG. 16A. It is to be noted that FIGS. 16A and 16B are schematic views and therefore dimensions or shapes are not necessarily the same as actual ones.

The backlight 2 of the embodiment is different from configuration of the backlight 1 according to the first embodiment and the modification thereof in that a light modulation element 60 is provided in place of the light modulation element 30. Thus, hereinafter, differences from the first embodiment are mainly described, and description of points common to the first embodiment is appropriately omitted.

In the embodiment, the light modulation element 60 is adhered to the back (bottom) of the light guide plate 10 with no air layer in between, and for example, attached to the back of the light guide plate 10 via an adhesive (not shown). The light modulation element 60 includes, for example, a transparent substrate 31, a lower electrode 32, an alignment film 63, a light modulation layer 64, an alignment film 65, an upper electrode 36, and a transparent substrate 37 disposed in this order from a reflective plate 40 side, as illustrated in FIG. 16B.

For example, the alignment film 63 or 65 aligns a liquid crystal or a monomer used for the light modulation layer 64. Types of the alignment film include, for example, a vertical alignment film and a horizontal alignment film, and the vertical alignment film is used for the alignment film 63 or 65 in the embodiment. For the vertical alignment film, a silane coupling agent, polyvinyl alcohol (PVA), a polyimide-series material, or a surfactant may be used. When a plastic film is used for the transparent substrate 31 or 37, since baking temperature is preferably low as much as possible after the alignment film 63 or 65 is coated on the transparent substrate 31 or 37 in a manufacturing process, the silane coupling agent capable if using alcohol-based solvents is preferably used for the alignment film 63 or 65.

It is to be noted that the vertical alignment film may have a function of adding pre-tilt to liquid crystal molecules in contact with the relevant vertical alignment film. For example, rubbing is listed as a method to allow the vertical alignment film to exhibit a pre-tilt function. For example, the vertical alignment film may have a function to allow the major axis of liquid crystal molecules adjacent to the relevant vertical alignment film to cross, at a small angle, a normal to the relevant vertical alignment film.

However, when the vertical alignment film is used for the alignment film 63 or 65, liquid crystal molecules having negative dielectric constant anisotropy (so-called negative liquid crystal) are preferably used as the liquid crystal molecules included in the fine particle 64B described later.

Next, the light modulation layer 64 in the embodiment is described. The light modulation layer 64 is configured of a composite layer including a bulk 64A and a plurality of fine particles 64B dispersed in the bulk 64A, for example, as illustrated in FIG. 16B. The bulk 64A and the fine particles 64B have optical anisotropy each.

Figure 17:
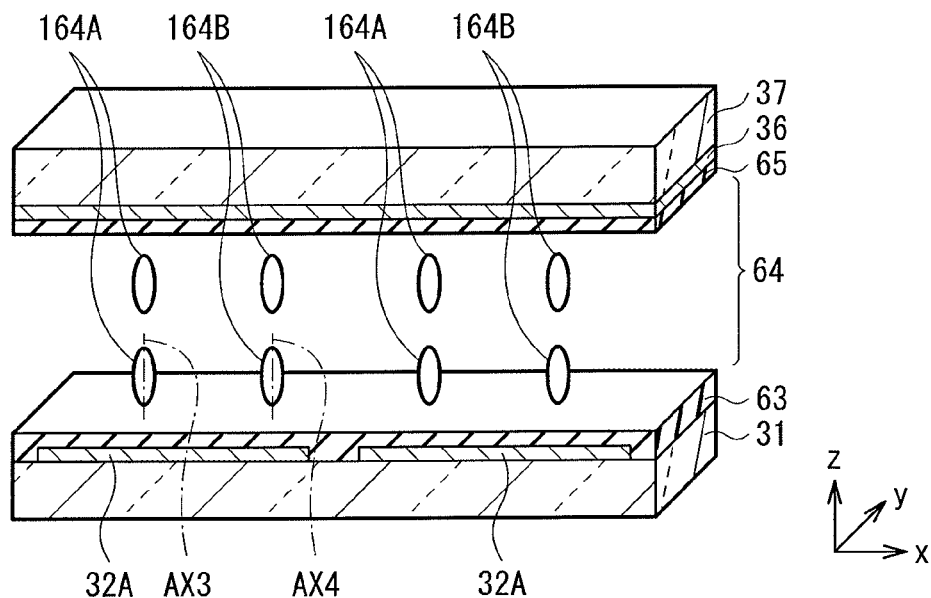
FIG. 17 is a schematic diagram for explaining alignment when a voltage is not applied to a light modulation element in FIGS. 16A and 16B.

FIG. 17 schematically illustrates an example of an alignment state in each of the bulk 64A and the fine particles 64B when no voltage is applied between lower and upper electrodes 32 and 36. An ellipsoid 164A in FIG. 17 illustrates an example of an optical indicatrix showing refractive-index anisotropy of the bulk 64A when no voltage is applied between the lower and upper electrodes 32 and 36. An ellipsoid 164B in FIG. 17 illustrates an example of an optical indicatrix showing refractive-index anisotropy of the fine particles 64B when no voltage is applied between the lower and upper electrodes 32 and 36.

Figure 18:
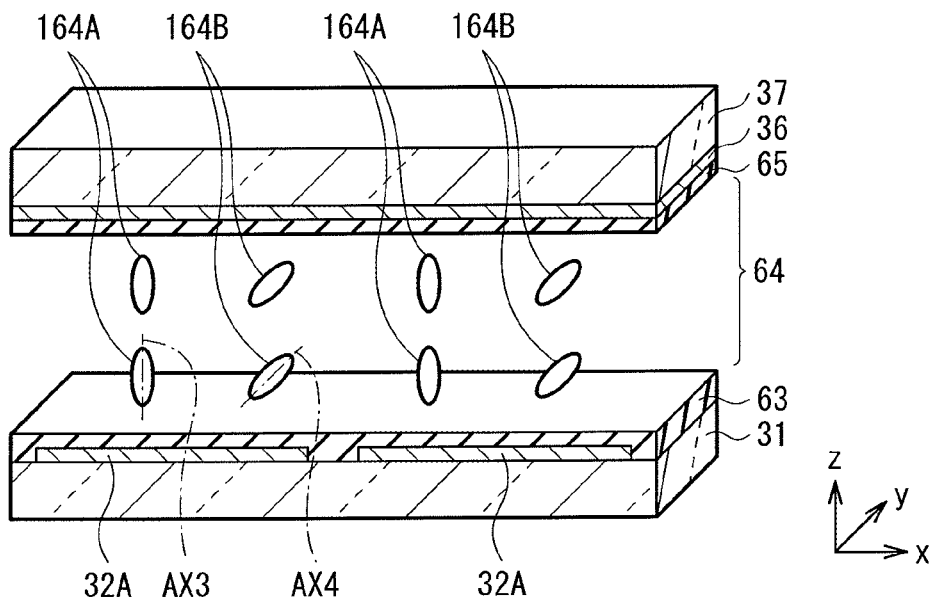
FIG. 18 is a schematic diagram for explaining alignment when a voltage is applied to the light modulation element in FIGS. 16A and 16B.

FIG. 18 schematically shows an example of an alignment state in each of the bulk 64A and the fine particles 64B when a voltage is applied between the lower and upper electrodes 32 and 36. An ellipsoid 164A in FIG. 18 illustrates an example of an optical indicatrix showing refractive-index anisotropy of the bulk 64A when a voltage is applied between the lower and upper electrodes 32 and 36. An ellipsoid 164B in FIG. 18 illustrates an example of an optical indicatrix showing refractive-index anisotropy of the fine particles 64B when a voltage is applied between the lower and upper electrodes 32 and 36.

The bulk 64A and each fine particle 64B are configured such that when no voltage is applied between the lower and upper electrodes 32 and 36, a direction of a light axis AX3 of the bulk 64A (major axis of the ellipsoid 164A) is equal (parallel) to a direction of a light axis AX4 of the fine particle 64B (major axis of the ellipsoid 164B), for example, as illustrated in FIG. 17. It is to be noted that the light axes AX3 and AX4 refer to lines parallel to a forward direction of a beam, where a refractive index has one value regardless of a polarization direction. When no voltage is applied between the lower and upper electrodes 32 and 36, the direction of the light axis AX3 and the direction of the light axis AX4 need not accurately correspond to each other, and may be somewhat different due to, for example, manufacturing errors.

When no voltage is applied between the lower and upper electrodes 32 and 36, the light axis AX4 is parallel (or substantially parallel) to a light incidence surface 10A of the light guide plate 10, and parallel (or substantially parallel) to a normal to a surface of the transparent substrate 31. In other words, when no voltage is applied between the lower and upper electrodes 32 and 36, the light axis AX4 is orthogonal (or substantially orthogonal) to a surface including the lower or upper electrode 32 or 36.

On the other hand, in the bulk 64A, the light axis AX3 is fixed regardless of presence of voltage application between the lower and upper electrodes 32 and 36. Specifically, the light axis AX3 is parallel (or substantially parallel) to the light incidence surface 10A of the light guide plate 10, and parallel (or substantially parallel) to the normal to the transparent substrate 31. In other words, when no voltage is applied between the lower and upper electrodes 32 and 36, the light axis AX3 is parallel (or substantially parallel) to the light axis AX4.

It is to be noted that the light axis AX4 need not be necessarily parallel to the light incidence surface 10A of the light guide plate 10 and to the normal to the surface of the transparent substrate 31, and may be oriented in a direction crossing, at a small angle, one or both of the light incidence surface 10A and the normal to the surface of the transparent substrate 31 due to, for example, manufacturing errors.

Preferably, an ordinary refractive index of the bulk 64A is equal to that of the fine particle 64B, and an extraordinary refractive index of the bulk 64A is also equal to that of the fine particle 64B. In such a case, for example, when no voltage is applied between the lower and upper electrodes 32 and 36, substantially no difference in refractive index exists in all directions including front and oblique directions, thereby leading to a high transparent property. Accordingly, for example, light going in a front or oblique direction is hardly scattered within the light modulation layer 64 and thus transmitted through the layer 64. As a result, for example, as illustrated in (A) and (B) of FIG. 12, light L from the light source 20 (light in an oblique direction) is totally reflected at a boundary of a transparent region (transmitting region 30A) in the light modulation element 60 (boundary between the transparent substrate 31 or the light guide plate 10 and air), and therefore luminance in the transmitting region 30A (luminance of black display) decreases compared with a case where the light modulation element 60 is not provided (alternate long and short dash line in (B) of FIG. 12).

In the bulk 64A and the fine particle 64B, for example, when a voltage is applied between the lower and upper electrodes 32 and 36, a direction of the light axis AX3 is different from (crosses or is orthogonal to) a direction of the light axis AX4 as illustrated in FIG. 18. For example, when a voltage is applied between the lower and upper electrodes 32 and 36, the light axis AX4 of the fine particle 64B is parallel (or substantially parallel) to the light incidence surface 10A of the light guide plate 10, and parallel (or substantially parallel) to the surface of the transparent substrate 31. In other words, when a voltage is applied between the lower and upper electrodes 32 and 36, the light axis AX4 is parallel (or substantially parallel) to a surface including the lower or upper electrode 32 or 36, and is parallel (or substantially parallel) to an extending direction of the partial electrodes 32A.

Accordingly, when a voltage is applied between the lower and upper electrodes 32 and 36, difference in refractive index of the light modulation layer 64 is large in all directions in a plane parallel to the light incidence surface 10A and orthogonal to the surface of the transparent substrate 31, leading to a high scattering property. Consequently, for example, light going in the front or oblique direction is scattered within the light modulation layer 64. As a result, light L (light in the oblique direction) from the light source 20 is transmitted through a boundary of the scattering region 30B (boundary between the transparent substrate 31 or the light guide plate 10 and air), and light transmitted to a reflective plate 40 side is reflected by the reflective plate 40 and then transmitted through the light modulation element 60, for example, as illustrated in (A) and (B) of FIG. 12. Luminance is therefore extremely high in the scattering region 30B compared with a case where the light modulation element 60 is not provided (alternate long and short dash line in (B) of FIG. 12), and luminance of partial white display (luminance enhancement) increases in correspondence to decrease in luminance in the transmitting region 30A.

It is to be noted that the ordinary refractive index of the bulk 64A may be somewhat different from that of the fine particle 64B due to, for example, manufacturing errors. For example, such difference is preferably 0.1 or less, and more preferably 0.05 or less. Similarly, the extraordinary refractive index of the bulk 64A may be somewhat different from that of the fine particle 64B due to, for example, manufacturing errors. For example, such difference is preferably 0.1 or less, and more preferably 0.05 or less.

Refractive-index difference of the bulk 64A (=extraordinary refractive index-ordinary refractive index) or refractive-index difference of the fine particle 64B (=extraordinary refractive index-ordinary refractive index) is preferably large, 0.05 or more, more preferably 0.1 or more, and still more preferably 0.15 or more. When refractive-index difference of each of the bulk 64A and the fine particle 64B is large, light-scattering ability of the light modulation layer 64 is improved, so that a light guide condition may be easily broken, and consequently light is easily extracted from the light guide plate 10.

The bulk 64A and the fine particle 64B are different from each other in response speed to an electric field. The bulk 64A has, for example, a striped or porous structure that is hardly responsive to an electric field, or a rod-like structure having a response speed slower than that of the fine particle 64B. The bulk 64A is formed of, for example, a polymer material obtained by polymerizing a low-molecular monomer. The bulk 64A is, for example, formed by polymerizing an alignable and polymerizable material (for example, monomer), which has been aligned along an alignment direction of the fine particle 64B or along an alignment direction of the alignment film 63 or 65, by one or both of heat and light. On the other hand, the fine particle 64B mainly includes, for example, a liquid crystal material, and thus has a response speed faster than that of the bulk 64A. The liquid crystal material (liquid crystal molecules) in the fine particle 64B includes, for example, rod-like molecules.

When no voltage is applied between the lower and upper electrodes 32 and 36, a major axis direction of each liquid crystal molecule is parallel to the light axis AX3 in the fine particle 64B. At this time, the major axis of the liquid crystal molecule in the fine particle 64B is parallel (or substantially parallel) to the light incidence surface 10A of the light guide plate 10 and parallel (or substantially parallel) to the surface of the transparent substrate 31. When a voltage is applied between the lower and upper electrodes 32 and 36, the major axis direction of the liquid crystal molecule crosses (or is orthogonal to) the light axis AX3 in the fine particle 64B. At this time, the major axis of the liquid crystal molecule in the fine particle 64B is parallel (or substantially parallel) to the light incidence surface 10A of the light guide plate 10 and parallel (or substantially parallel) to the surface to the transparent substrate 31.

While any monomer can be used as the alignable and polymerizable monomer as long as the monomer is optically anisotropic and mixable with the liquid crystal, a UV-curable low-molecular monomer is particularly preferable in the embodiment. When no voltage is applied, a direction of optical anisotropy of the liquid crystal preferably corresponds to that of a polymerization product (polymer material) of the low-molecular monomer. It is therefore preferable that the liquid crystal and the low-molecular monomer are aligned in the same direction before UV curing. In the case that a liquid crystal is used for the fine particle 64B, when the liquid crystal includes rod-like molecules, a monomer material having a rod-like shape is preferably used. According to the above, a polymerizable and liquid-crystalline material is preferably used as the monomer material, and, for example, the material preferably has, as a polymerizable functional group, one or more functional group selected from functional groups including an acrylate group, a methacrylate group, an acryloyloxy group, a methacryloyloxy group, a vinyl ether group, and an epoxy group. Each of the functional groups may be polymerized through irradiation of ultraviolet rays, infrared rays, or an electron beam, or through heating. A liquid crystalline material having a multifunctional group may be added to the material to suppress reduction in alignment during UV irradiation. When the bulk 64A has the striped structure, a bifunctional liquid-crystalline monomer is preferably used as a material of the bulk 64A. In addition, a monofunctional monomer may be added to a material of the bulk 64A in order to adjust liquid-crystallinity-exhibiting temperature, or a tri- or more-functional monomer may be added to the material in order to increase crosslink density.

Next, operation and effects of the backlight 2 of the embodiment are described.

In the backlight 2 of the embodiment, for example, a voltage is applied between the lower and upper electrodes 32 and 36 of each light modulation cell 30-1 such that the light axis AX4 of the fine particle 64B is parallel or substantially parallel to the light axis AX3 of the bulk 64A in a light modulation cell 30-1, and the light axis AX4 crosses or is orthogonal to the light axis AX3 in another light modulation cell 30-1. According to this, light, which is emitted from the light source 20 and then enters the light guide plate 10, is transmitted through the transmitting region 30A, where the light axis AX3 is parallel or substantially parallel to the light axis AX4, of the light modulation element 60. On the other hand, light, which is emitted from the light source 20 and then enters the light guide plate 10, is scattered by the scattering region 30B, where the light axis AX3 crosses or is orthogonal to the light axis AX4, of the light modulation element 60. Some light of the scattered light passes through a bottom of the scattering region 30B, and is reflected by the reflective plate 40 and returned to the light guide plate 10, and is then output from a top of the backlight 2. Moreover, some light of the scattered light goes to a top of the scattering region 30B, and is transmitted through the light guide plate 10, and is then output from the top of the backlight 2. In this way, in the embodiment, light is hardly output from a top of the transmitting region 30A, and is largely output from the top of the scattering region 30B. In this way, a modulation ratio is increased in a front direction.

In the embodiment, since each of the bulk 64A and the fine particle 64B mainly includes an optically anisotropic material, light-scattering is reduced in an oblique direction and thus transparency may be improved in the direction. For example, when the bulk 64A and the fine particle 64B mainly include optically anisotropic materials being equal in ordinary refractive index and in extraordinary refractive index, directions of respective light axes of the bulk 64A and the particle 64B are equal or substantially equal to each other in a region where no voltage is applied between the lower and upper electrodes 32 and 36. Consequently, refractive-index difference is reduced or eliminated in all directions including a front direction (normal direction of the light modulation element 60) and an oblique direction, leading to high transparency. As a result, light leakage may be reduced or substantially eliminated over a wide view-angle range, leading to improvement in view angle characteristic.

For example, when a liquid crystal having an ordinary refractive index of 1.5 and an extraordinary refractive index of 1.65 and a liquid-crystalline monomer having an ordinary refractive index of 1.5 and an extraordinary refractive index of 1.65 are mixed, and the liquid-crystalline monomer is polymerized while the liquid crystal and the liquid-crystalline monomer are aligned by an alignment film or by an electric field, a light axis of the liquid crystal corresponds to a light axis of a polymer as a product of polymerization of the liquid-crystalline monomer. Consequently, refractive indices may be made equal in all directions. In such a case, a high transparent state may be achieved, leading to further improvement in view angle characteristic.

In the embodiment, for example, as illustrated in (A) and (B) of FIG. 12, luminance in the transmitting region 30A (luminance of black display) decreases compared with a case where the light modulation element 60 is not provided (alternate long and short dash line in (B) of FIG. 12). On the other hand, luminance in the scattering region 30B is extremely high compared with the case where the light modulation element 60 is not provided (alternate long and short dash line in (B) of FIG. 12), and luminance of partial white display (luminance enhancement) is increased in correspondence to decrease in luminance in the transmitting region 30A. This is because each of the bulk 64A and the fine particle 64B mainly includes the optically anisotropic material, scattering is suppressed in an oblique direction, and therefore light leakage from the light guide plate is reduced in a dark state. Consequently, light is guided from a partially dark portion to a partially light portion, making it possible to achieve luminance enhancement without increasing input power to the backlight 2.

Moreover, in the embodiment, the light guide plate 10 has the plurality of belt-like convex portions 11, and a plurality of partial electrode 32A, extending in a direction crossing the convex portions 11, are provided, as in the first embodiment. Furthermore, in the embodiment, the light source 20 is configured of a plurality of light source blocks 23 that may be independently driven, as in the first embodiment. Consequently, a light-and-dark boundary of illumination light may be blurred without obstructing reduction in thickness, as in the first embodiment. In addition, in the embodiment, one or more partial electrodes 32A are driven while the light source blocks 23 are sequentially turned on, making it possible to achieve simple matrix drive, as in the first embodiment.

3. Modification

First Modification

While each partial electrode 32A has a rectangular shape in each of the embodiments, an edge of the partial electrode 32A may have a nonlinear shape. For example, each of the partial electrodes 32A may have an irregular shape (irregular portion 32B) on an edge thereof adjacent to another partial electrode 32A. The irregular portion 32B may have a zigzag shape, for example, as illustrated in FIG. 19, or may have a curved shape, a ramp shape, a trapezoidal shape, or a random shape, for example, as illustrated in FIGS. 20A to 20D.

The irregular portion 32B is configured of a plurality of convex portions arranged along the edge. The convex portions in the irregular portions 32B of the partial electrodes 32A adjacent to each other are alternately disposed, for example, as illustrated in FIG. 19 and FIGS. 20A to 20D. Respective ends of convex portions in an irregular portion 32B are disposed in concave portions formed by adjacent, another irregular portion 32B, for example, as illustrated in FIG. 19 and FIGS. 20A to 20D. While width of a slit portion formed between irregular portions 32B adjacent to each other is preferably narrow, extremely narrow width is useless in the light of a blurring characteristic described later. Consequently, for example, in the case that a 42-inch display is divided into 12*6, when width of the partial electrode 32A is approximately 80 mm, width of the slit portion is preferably approximately 10 to 500 μm.

When the edge of the partial electrode 32A has a nonlinear shape in this way, electrode area per unit area of the lower electrode 32 gently changes in the edge of the partial electrode 32A. This eliminates a boundary between scattering and transparency, which has been formed in the light modulation layer 34, in all edges of the crossing site. Consequently, luminance distribution of light extracted from the light guide plate 10 gently changes in each of an extending direction of the partial electrode 32A and a direction crossing the extending direction of the partial electrode 32A. According to these, in the modification, a light-and-dark boundary of illumination light may be further blurred without obstructing reduction in thickness. In addition, in the modification, one or more partial electrodes 32A are driven while the light source blocks 23 are sequentially turned on, making it possible to achieve simple matrix drive.

For example, the irregular portion 32B may have a zigzag shape with a plurality of convex portions being arranged, each convex portion having an acute end, where one or more of profiles of each convex portion may correspond to a substantial function of the power of m of the sine (m is an even number) with an end as an origin, for example, as illustrated in FIG. 21. Here, the profile of one or more edge of each convex portion corresponds to part of a curve drawn by the function of the power of m of the sine. It is to be noted that the profile of the edge need not accurately trace the function of the power of m of the sine, and may roughly trace the function. In this way, when one or more profile of each convex portion in the irregular portion 32B corresponds to the substantial function of the power of m of the sine with an end as an origin, electrode area of the lower electrode 32 further gently changes near an end of the convex portion compared with the above case. Consequently, since clearness of a boundary between transparency and scattering is further reduced compared with the above case, when light is partially extracted from the light guide plate 10, clearness between a dark region and a light region may be further reduced. As a result, a light-and-dark boundary of illumination light may be further blurred compared with the above case.

It is to be noted that each of edges of all the partial electrodes 32A need not have a nonlinear shape. For example, while not shown, it is acceptable that only one of edges of the partial electrodes 32A adjacent to each other has the irregular shape, and the other edge has a linear shape.

While each of the partial electrodes 32A has a rectangular shape in each of the embodiments, each partial electrode 32A may have an irregular shape on an edge thereof adjacent to another partial electrode 32A.

Second Modification

In each of the embodiments, the upper electrode 36 or each partial electrode 36A may be patterned. This enables in-plane luminance of illumination light to be uniform. Furthermore, electrode area is reduced, making it possible to reduce absorption of visible light by the electrode when the upper electrode 36 or the partial electrode 36A includes ITO.

Figure 22A:
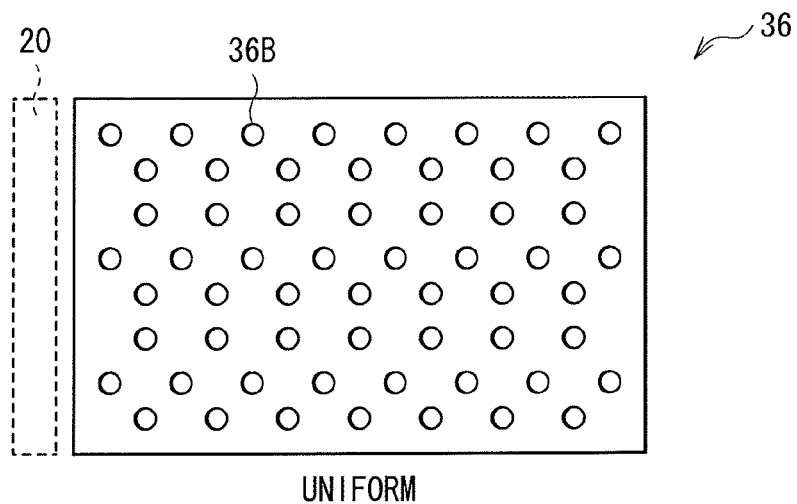
FIGS. 22A and 22B are plan views illustrating a first modification of a configuration of an upper electrode in FIGS. 1A and 1B or FIGS. 16A and 16B.
Figure 22B:
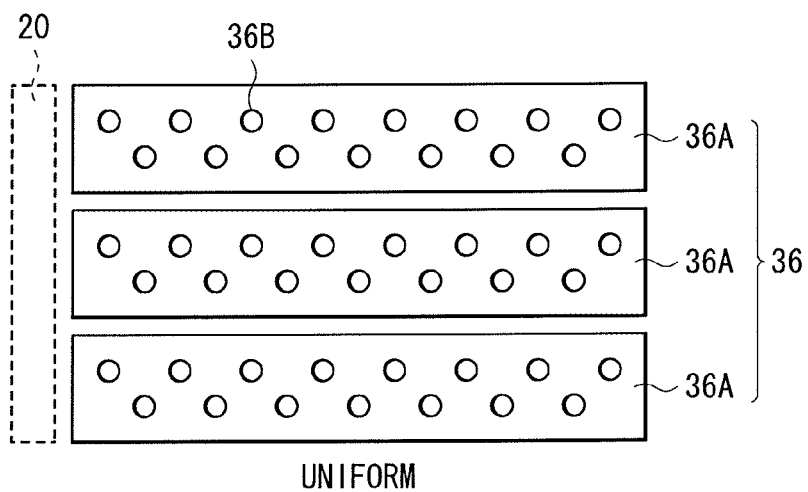
Figure 23A:
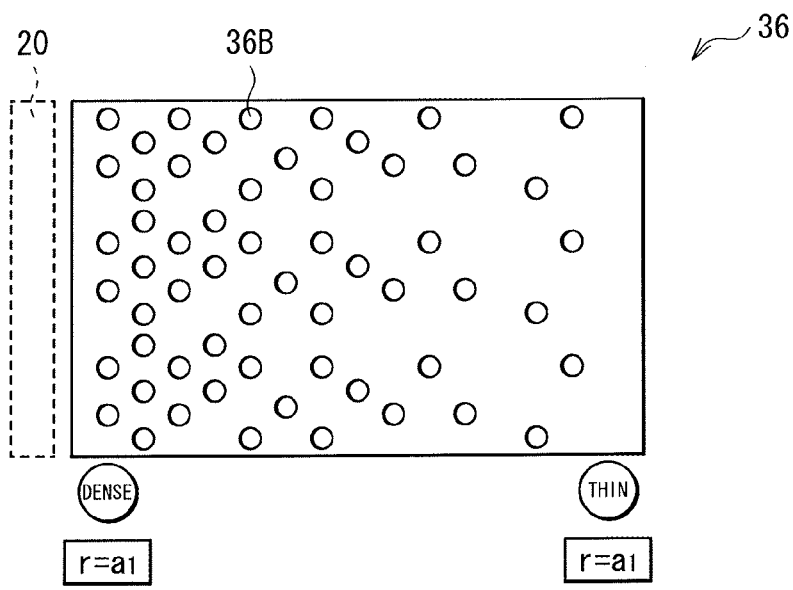
FIGS. 23A and 23B are plan views illustrating a second modification of the configuration of the upper electrode in FIGS. 1A and 1B or FIGS. 16A and 16B.
Figure 23B:
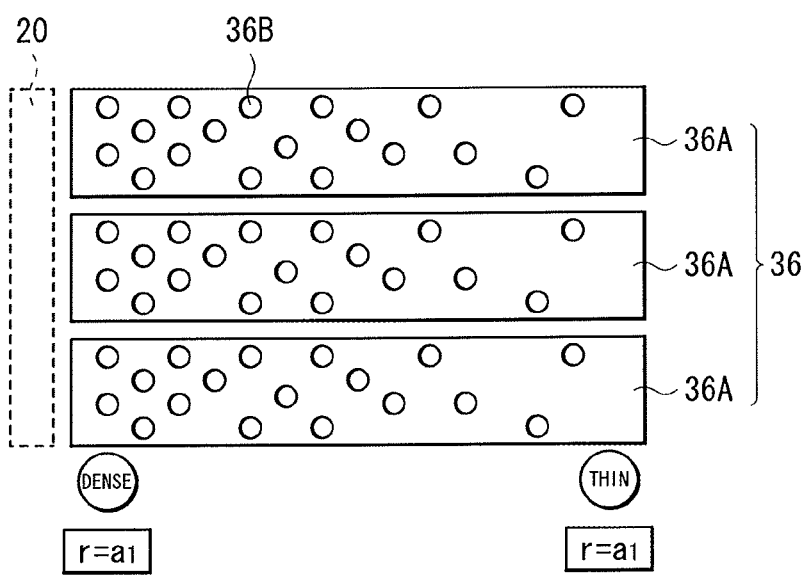

The upper electrode 36 or the partial electrode 36A may have a plurality of openings 36B, for example, as illustrated in FIGS. 22A and 22B. At this time, density of the openings 36B is uniform over the entire upper electrode 36 or the entire partial electrode 36A, for example, as illustrated in FIGS. 22A and 22B. Each opening 36B has a circular shape, for example, as illustrated in FIGS. 22A and 22B. It is to be noted that the opening 36B may have another shape, for example, an ellipsoidal shape or a polygonal shape. In the example illustrated in FIGS. 22A and 22B, diameter r of the opening 36B is constant ($r=a_1$) regardless of a distance from the light source 20, and the number of the openings 36B per unit area is constant regardless of the distance from the light source 20.

Figure 24A:
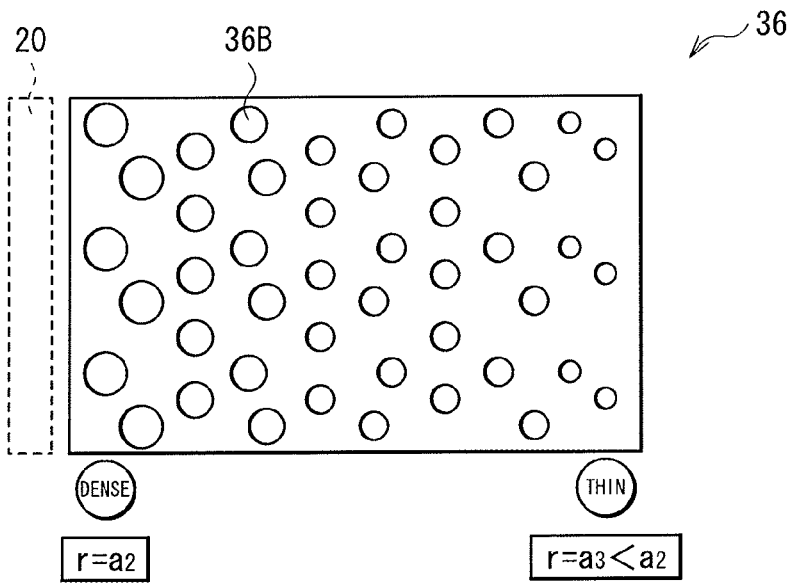
FIGS. 24A and 24B are plan views illustrating a third modification of the configuration of the upper electrode in FIGS. 1A and 1B or FIGS. 16A and 16B.
Figure 24B:
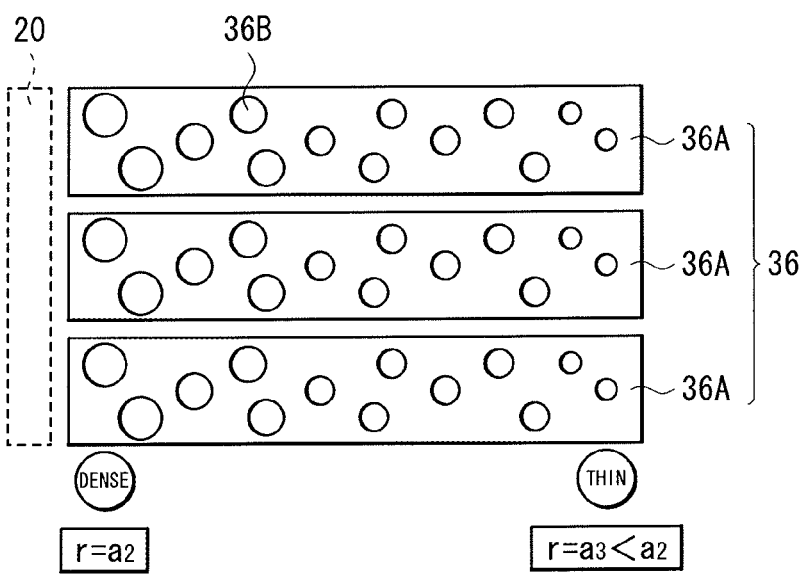

It is to be noted that pattern density of the upper electrode 36 or the partial electrode 36A (occupancy per unit area of portions of the upper electrode 36 or the partial electrode 36A other than the openings 36B) may be different depending on the distance from the light source 20 over the entire upper electrode 36. For example, density of the openings 36B (occupancy per unit area of the openings 36B) may be different depending on the distance from the light source 20 over the entire upper electrode 36 as illustrated in FIGS. 23A and 23B and FIGS. 24A and 24B. In the example illustrated in FIGS. 23A and 23B, diameter r of the opening 36B is constant (r=$a_1$) regardless of the distance from the light source 20, and the number of the openings 36B per unit area is reduced with increase in distance from the light source 20. In the example illustrated in FIGS. 24A and 24B, the number of the openings 36B per unit area is constant regardless of a distance from the light source 20, and diameter r of the opening 36B is reduced with increase in distance from the light source 20. FIGS. 24A and 24B exemplify a case where diameter r near the light source 20 is $a_2$, and diameter r most away from the light source 20 is $a_3$ (<$a_2$). Consequently, density of the openings 36B becomes thinner (is reduced) with increase in distance from the light source 20 in either of the examples of FIGS. 23A and 23B and FIGS. 24A and 24B. In other words, pattern density of the upper electrode 36 or the partial electrode 36A becomes denser (is increased) with increase in distance from the light source 20. This allows luminance of illumination light to be even at all points in a plane.

Figure 25A:
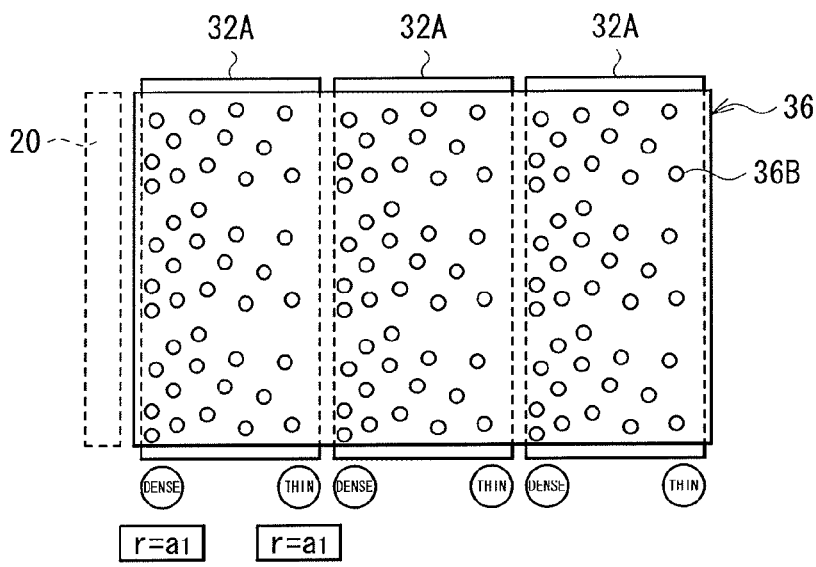
FIGS. 25A and 25B are plan views illustrating a fourth modification of the configuration of the upper electrode in FIGS. 1A and 1B or FIGS. 16A and 16B.
Figure 25B:
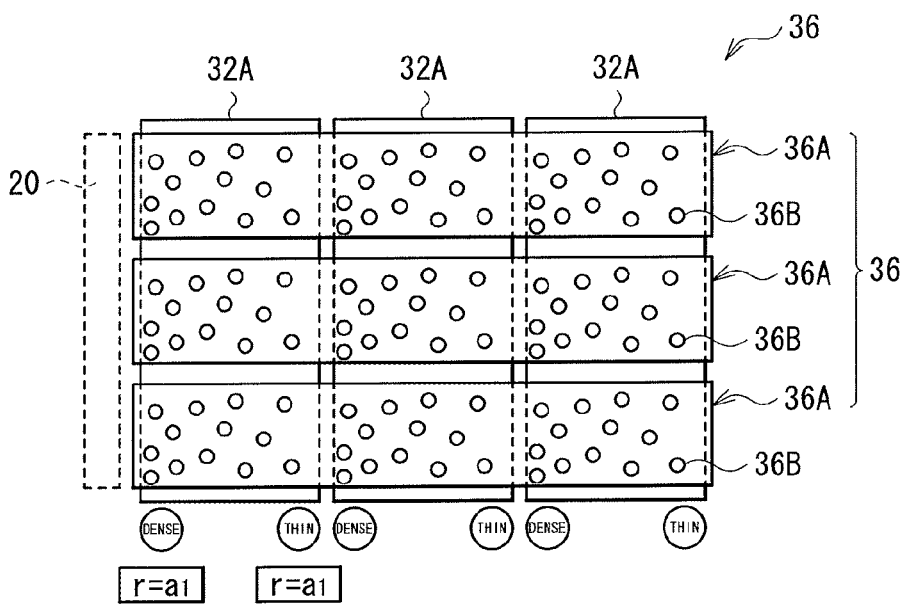
Figure 26A:
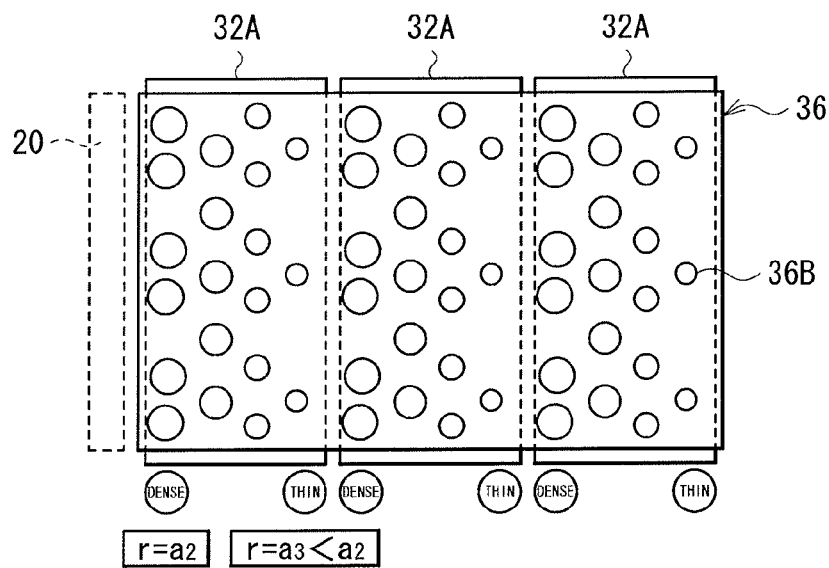
FIGS. 26A and 26B are plan views illustrating a fifth modification of the configuration of the upper electrode in FIGS. 1A and 1B or FIGS. 16A and 16B.
Figure 26B:
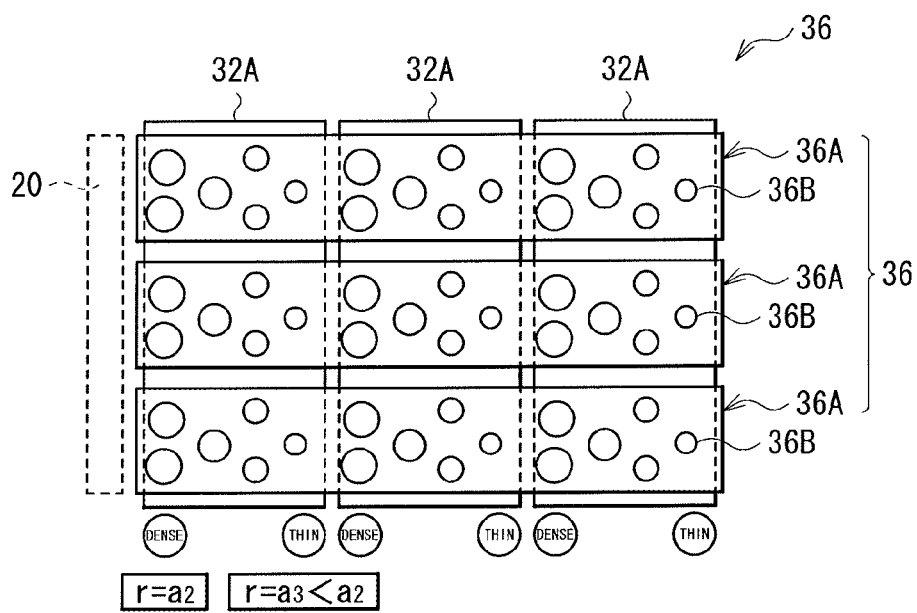
Figure 27A:
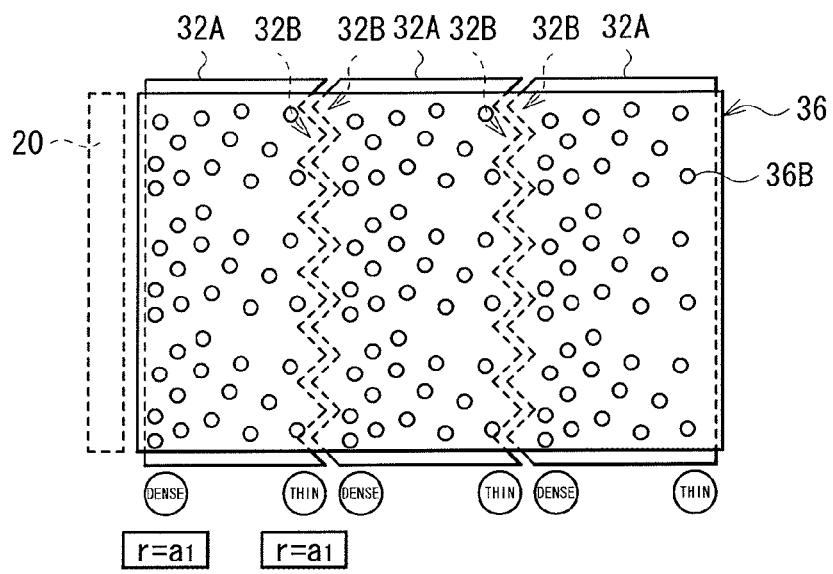
FIGS. 27A and 27B are plan views illustrating a sixth modification of the configuration of the upper electrode in FIGS. 1A and 1B or FIGS. 16A and 16B.
Figure 27B:
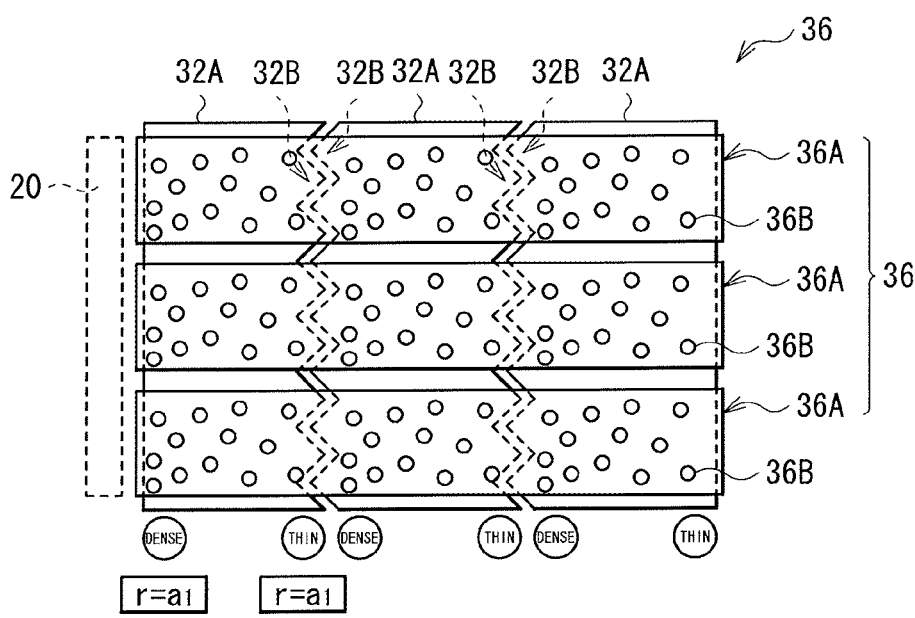
Figure 28A:
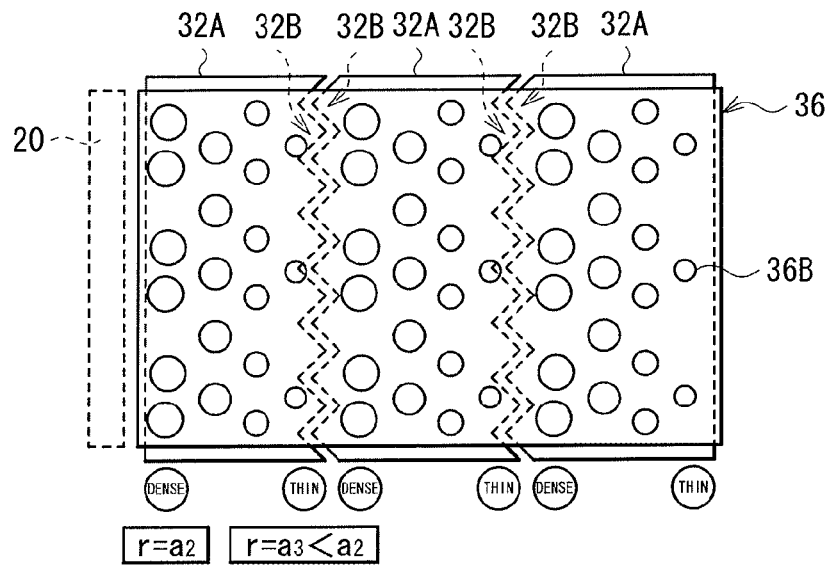
FIGS. 28A and 28B are plan views illustrating a seventh modification of the configuration of the upper electrode in FIGS. 1A and 1B or FIGS. 16A and 16B.
Figure 28B:
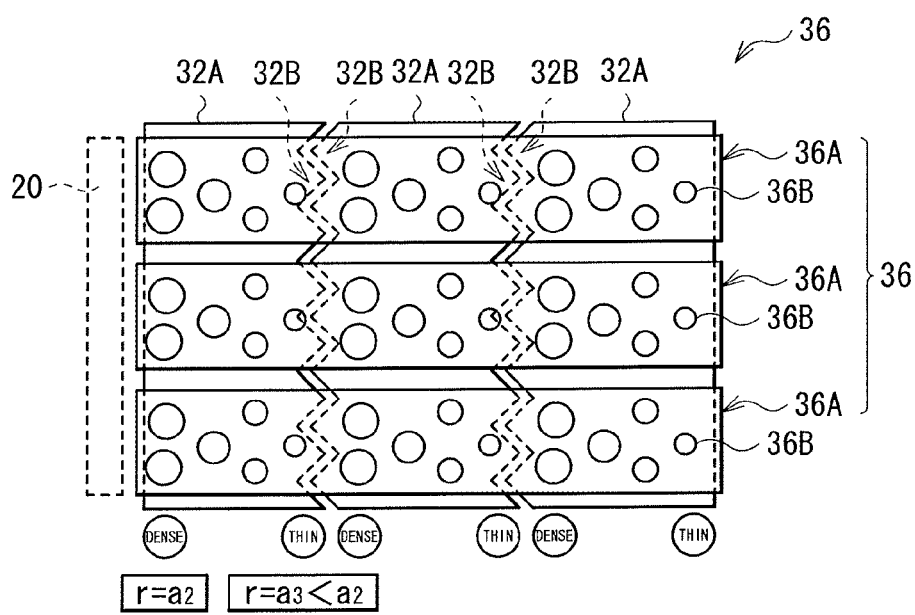

It is to be noted that the pattern density of the upper electrode 36 or the partial electrode 36A need not be necessarily different depending on the distance from the light source 20 over the entire upper electrode 36. For example, the pattern density of the upper electrode 36 or the partial electrode 36A may be different for each of portions opposed to the partial electrodes 32A depending on the distance from the light source 20. For example, it is acceptable that while the diameter r of the opening 36B is constant (r=$a_1$) regardless of the distance from the light source 20, the number of the openings 36B per unit area is reduced with increase in distance from the light source 20 for each of portions opposed to the partial electrodes 32A, as illustrated in FIGS. 25A and 25B. Alternatively, for example, it is also acceptable that while the number of the openings 36B per unit area is constant regardless of the distance from the light source 20, the diameter r of the opening 36B is reduced with increase in distance from the light source 20 for each of portions opposed to the partial electrodes 32A, as illustrated in FIGS. 26A and 26B.

In the modification, a duty ratio of voltage applied to each partial electrode 32A may be changed depending on a distance from the light source 20. For example, the duty ratio of voltage applied to the partial electrode 32A may be increased with increase in distance from the light source 20. In such a case, when white display is performed over the whole surface of the backlight 1, luminance may be made uniform over the whole surface. In addition, when the backlight 1 is partially turned on (partially driven), the luminance enhancement mentioned above may be performed.

In addition, in the modification, each of the partial electrodes 32A may have an irregular shape (irregular portion 32B) on an edge thereof adjacent to another partial electrode 32A. In this case, the pattern density of the upper electrode 36 or the partial electrode 36A may be different for each of portions opposed to the partial electrodes 32A depending on the distance from the light source 20, for example, as illustrated in FIGS. 27A and 27B and FIGS. 28A and 28B. At this time, in the upper electrode 36 or the partial electrode 36A, a portion, at which the pattern density of the upper electrode 36 or the partial electrode 36A is changed from a thin state to a dense state, is provided at a position opposed to the irregular portion 32B.

Figure 29A:
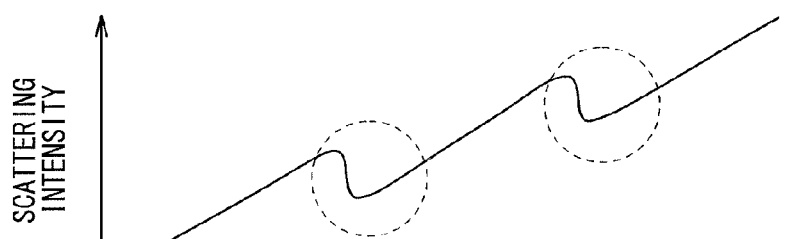
FIGS. 29A to 29E are characteristic diagrams illustrating an example of a relationship between scattering intensity and a duty ratio as well as ITO area.
Figure 29B:
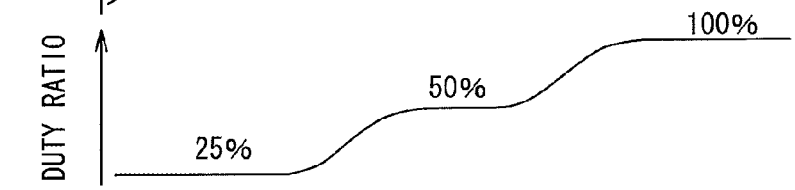
Figure 29C:
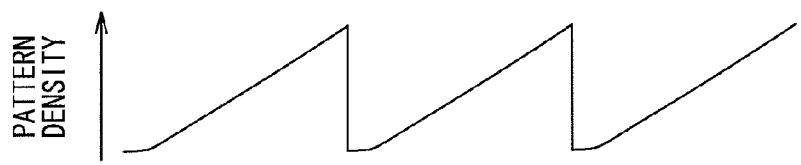

Each of FIG. 29A and FIG. 30A illustrates an example of scattering intensity in the case that the lower electrode 32 includes a plurality of partial electrodes 32A each having an irregular shape on an edge thereof, and the upper electrode 36 or each partial electrode 36A is patterned such that pattern density thereof is increased with increase in distance from the light source 20 for each of portions opposed to the partial electrodes 32A, and voltage applied to each partial electrode 32A is changed depending on the distance from the light source 20. Each of FIG. 29B and FIG. 30B illustrates an example of a duty ratio of the voltage applied to each partial electrode 32A, and each of FIG. 29C and FIG. 30C illustrates an example of pattern density of the upper electrode 36 or the partial electrode 36A when the electrode 36 or the partial electrode 36A includes ITO. It is to be noted that each of FIG. 29B and FIG. 30B illustrates an aspect where the duty ratio gently changes. The reason for this is as follows. In a portion of the lower electrode 32 corresponding to the irregular portion 32B, density of a partial electrode 32A disposed on a side relatively near the light source 20 (occupancy per unit area of the partial electrode 32A) and density of a partial electrode 32A disposed at a position relatively away from the light source 20 (occupancy per unit area of the partial electrode 32A) are gently changed according to the distance from the light source 20, and an effective duty ratio of the applied voltage changes according to a ratio of occupancy per unit area between two irregular portions 32B adjacent to each other.

Figure 29D:
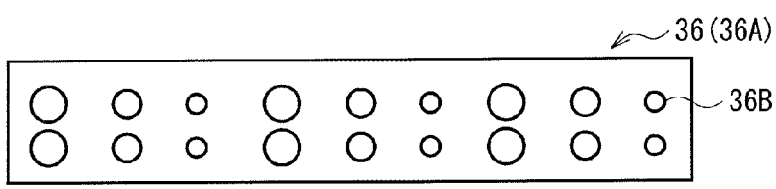
Figure 29E:
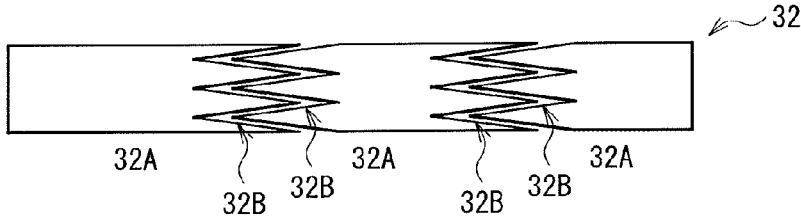
Figure 32:
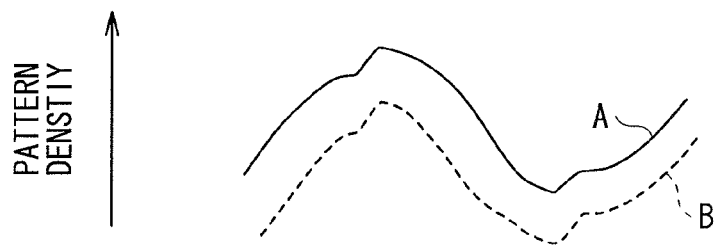
FIG. 32 is a chart illustrating various modifications of pattern density of FIG. 31C.

Each of FIG. 29D and FIG. 30D illustrates an example of a configuration of the upper electrode 36 or the partial electrode 36A, and each of FIG. 29E and FIG. 30E illustrates an example of a configuration of each partial electrode 32A. The scattering intensity of FIG. 29A is obtained by multiplexing the duty ratio of FIG. 29B by the pattern density of the upper electrode 36 or the partial electrode 36A of FIG. 29C, and the scattering intensity of FIG. 30A is obtained by multiplexing the duty ratio of FIG. 30B by the pattern density of the upper electrode 36 or the partial electrode 36A of FIG. 30C.

In the backlight 1 or 2 shown in FIGS. 29A to 29E and FIGS. 30A to 30E, each of partial electrodes 32A has an irregular shape on an edge thereof adjacent to another partial electrode 32A, and the upper electrode 36 or the partial electrode 36A has a plurality of openings 36B. Furthermore, the number of openings 36B is constant regardless of the distance from the light source 20, and diameter of the opening 36B is reduced with increase in distance from the light source 20 for each of portions opposed to the partial electrodes 32A. In the upper electrode 36 or the partial electrode 36A, a boundary between a portion of thin pattern density and a portion of dense pattern density is disposed within a region opposed to the irregular portion 32B.

In the backlight 1 or 2 shown in FIGS. 29A to 29E, pattern density drastically changes at the boundary between the portion of thin pattern density and the portion of dense pattern density, and scattering intensity locally decreases at a portion where pattern density drastically changes (each portion enclosed by a broken line in the figure). Such local reduction in scattering intensity may cause light and dark stripes in illumination light output from the backlight 1 or 2 depending on a level of the reduction.

On the other hand, in the backlight 1 or 2 shown in FIGS. 30A to 30E, pattern density gently changes at the boundary between the portion of thin pattern density and the portion of dense pattern density, and scattering intensity also gently changes according to change in pattern density. Here, a section $S_1$ from a point at which pattern density starts to decrease gently (point at which pattern density is locally maximized (a in the figure)) to a point at which pattern density starts to increase gently (point at which pattern density is locally minimized (β in the figure)) is within a range opposed to a section $S_2$ enclosed by bottoms 32X of concave portions included in two irregular portions 32B adjacent to each other. The section $S_1$ is preferably within a range opposed to a section $S_3$ enclosed by tops 32Y of convex portions included in the two irregular portions 32B adjacent to each other.

In the backlight 1 or 2 shown in FIGS. 29A to 29E and FIGS. 30A to 30E, when each of partial electrodes 32A has an irregular shape on an edge thereof adjacent to another partial electrode 32A, and a profile of the irregular shape corresponds to a function of the power of m of the sine, pattern density of the upper electrode 36 or the partial electrode 36A preferably corresponds to a function of the power of m of the sine in the section $S_1$ from α to β in the figure.

In the modification, when the lower electrode 32 includes a plurality of partial electrodes 32A each having an irregular shape 32B on an edge thereof, and the upper electrode 36 or each partial electrode 36A is patterned such that pattern density thereof is increased with increase in distance from the light source 20 for each of portions opposed to the partial electrodes 32A, scattering intensity corresponding to FIG. 30A corresponds to a value obtained by multiplexing a duty ratio by pattern density of the upper electrode 36 or the partial electrode 36A. It is therefore preferable to satisfy the following expression in order that scattering intensity increases monotonically with increase in distance from the light source 20 in a region of the lower electrode 32 corresponding to the irregular shape 32B (section $S_2$ or $S_3$) as shown in FIG. 30A. It is to be noted that D1 denotes pattern density at a position of α in the figure, and D2 denotes pattern density at a position of β in the figure. D1/D2 is a ratio of occupancy per unit area between two irregular portions 32B adjacent to each other.

1<D1/D2<(duty ratio of voltage applied to β-side partial electrode 32A (for example, 50% in the figure))/(duty ratio of voltage applied to α-side partial electrode 32A (for example, 25% in the figure))

It is to be noted that since a gap (zigzag etching line) actually exists between irregular portions 32B adjacent to each other, pattern density of the upper electrode 36 or the partial electrode 36A is preferably designed in consideration of the gap in order to smoothly change scattering intensity according to the distance from light source 20. A difference in level of the duty ratio is formed at a point corresponding to the gap, for example, as illustrated in FIG. 31B. Accordingly, a difference in level of pattern density is preferably provided in the upper electrode 36 or the partial electrode 36A such that a difference in level of scattering intensity is reduced to the utmost. Specifically, pattern density preferably has a difference in level in correspondence to a portion where the duty ratio has the difference in level, as illustrated in FIG. 31C. At this time, pattern density is preferably increased at the difference in level by about (D*2/P)*100 [%]. It is to be noted that D denotes a width of the gap, and P denotes a pitch of zigzag of the gap. In addition, the difference in level of pattern density is preferably gentle as illustrated in a line A of FIG. 32. Furthermore, magnitude of pattern density is preferably generally reduced as illustrated in a line B of FIG. 32. For example, magnitude of pattern density may be generally reduced by increasing the diameter of each opening 36B. Consequently, when each partial electrode 32A and the upper electrode 36 or the partial electrode 36A are configured of ITO, absorption of visible light by the electrodes may be reduced.

Third Modification

Figure 33A:
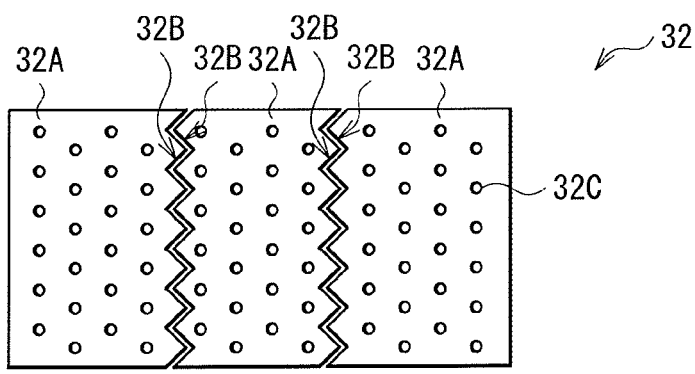
FIGS. 33A and 33B are plan views illustrating a fourth modification of the configuration of the lower electrode in FIGS. 1A and 1B or FIGS. 16A and 16B.
Figure 33B:
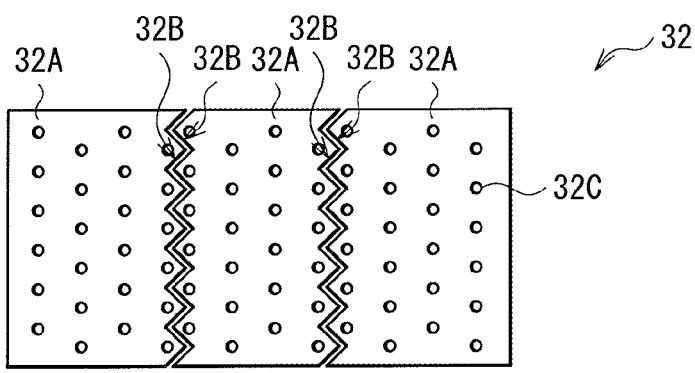

In each of the embodiments, each of the partial electrodes 32A may have an irregular shape (irregular portion 32B) on an edge thereof adjacent to another partial electrode 32A, and furthermore may be patterned. Each partial electrode 32A may have a plurality of openings 32C, for example, as illustrated in FIGS. 33A and 33B. Here, the openings 32C may be formed only in a portion of the partial electrode 32A other than the irregular portion 32B, for example, as illustrated in FIG. 33A, or may be formed in the whole area of the partial electrode 32A including the irregular portion 32B, for example, as illustrated in FIG. 33B. In either case, density of the openings 32C and a slit portion in a region of the lower electrode 32 including the irregular portion 32B is preferably equal to density of the openings 32C in a region of the partial electrode 32A other than the irregular portion 32B.

Figure 34A:
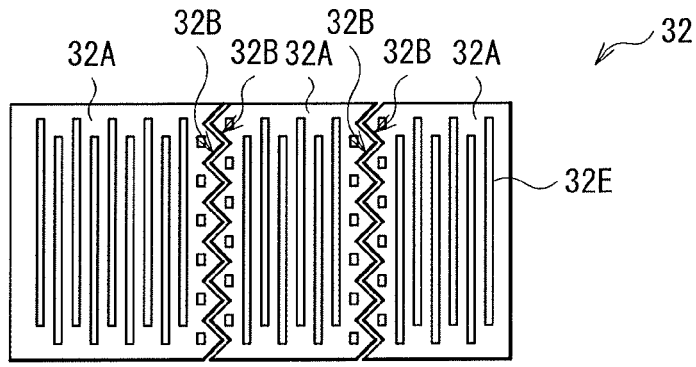
FIGS. 34A and 34B are plan views illustrating a fifth modification of the configuration of the lower electrode in FIGS. 1A and 1B or FIGS. 16A and 16B.
Figure 34B:
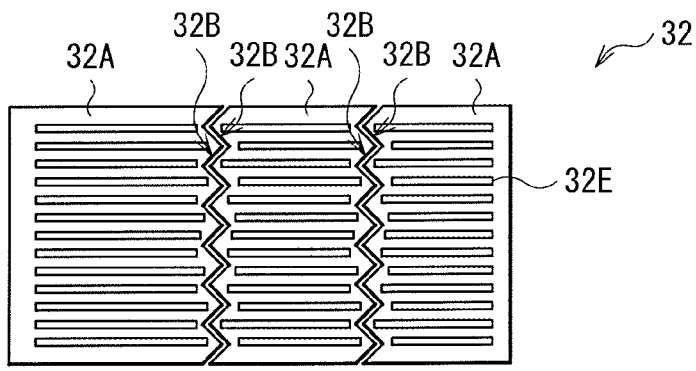

In addition, a plurality of belt-like openings 32E extending in an extending direction of the partial electrodes 32A may be provided, for example, as illustrated in FIG. 34A, or a plurality of belt-like openings 32E extending in a direction crossing (or orthogonal to) the extending direction of the partial electrodes 32A may be provided, for example, as illustrated in FIG. 34B. Even in such cases, density of the openings 32E and a slit portion in a region of the lower electrode 32 including the irregular portion 32B (hereinafter, called "density A" for convenience) is preferably equal to density of the openings 32E in a region of the partial electrode 32A other than the irregular portion 32B (hereinafter, called "density B" for convenience).

For example, in the case that while the density A is smaller than the density B, when no voltage is applied between the lower and upper electrodes 32 and 36, a light modulation cell 30-1 is in a transparent state, and when a voltage is applied between the lower and upper electrodes 32 and 36, the light modulation cell 30-1 is in a scattering state, a region corresponding to the irregular portion 32B is darkened in the full lighting state. In addition, for example, in the case that while the density A is smaller than the density B, when no voltage is applied between the lower and upper electrodes 32 and 36, a light modulation cell 30-1 is in the scattering state, and when a voltage is applied between the lower and upper electrodes 32 and 36, the light modulation cell 30-1 is in the transparent state, a region corresponding to the irregular portion 32B is lightened in the full lighting state.

It is to be noted that when each partial electrode 32A is patterned, so that areas of each partial electrode 32A is reduced, in the case that when no voltage is applied between the lower and upper electrodes 32 and 36, a light modulation cell 30-1 is in the transparent state, and when a voltage is applied between the lower and upper electrodes 32 and 36, the light modulation cell 30-1 is in the scattering state, scattering area is reduced, leading to reduction in light extraction capability. This makes it difficult to obtain an effect of improving luminance by reducing ITO area and thus reducing the amount of light absorption. Accordingly, when each partial electrode 32A is patterned to reduce area of the electrode, scattering intensity per unit area of the light modulation layer 34 is preferably increased. A method to increase scattering intensity conceivably includes increase in drive voltage, increase in thickness of the optical modulation layer, and change of a composition ratio of a bulk to fine particles. In addition, when ITO having a small light absorptance is used, even if reduced area of ITO is not large, light extraction efficiency (illuminance) may be increased. Even if ITO having a small light absorptance is used, scattering intensity per unit area of the light modulation layer 34 is preferably increased.

FIG. 35 illustrates an example of a relationship between reduction in ITO area and relative illuminance. A line A in FIG. 35 shows a result in the case that only ITO area is reduced without changing scattering intensity per unit area of the light modulation layer 34 (without increasing the scattering intensity). Lines B and C in FIG. 35 show a result in the case that scattering intensity per unit area of the light modulation layer 34 is increased such that even if scattering area is reduced, light extraction capability is kept constant. The lines A and B in FIG. 35 show a result in the case that light absorptance of ITO at 550 nm (absorptance of light at an incident angle of 5 degrees from a vertical direction) is 0.9%, and the line C in FIG. 35 shows a result in the case that light absorptance of ITO at 550 nm (absorptance of light at an incident angle of 5 degrees from a vertical direction) is 0.3%.

It is to be noted that the vertical axis of FIG. 35 shows a relative illuminance value when illuminance on ITO is assumed as 100% assuming that ITO absorbs no light, and the horizontal axis shows reduction in ITO area. The result of FIG. 35 is obtained by numerical computation under the following condition.

Light guide plate: n=1.49, thickness 5 mm
Transparent substrate: n=1.53, thickness 0.1 mm
Electrode (ITO): n=2.0
The optical modulation layer: scattering with Haze value of 33% (measurement value) to light perpendicularly incident to a plane
Configuration: light modulation element and reflection sheet on the back of light guide plate, diffusion sheet and prism sheet on top of light guide plate
Backlight size: 40 inches The line A in FIG. 35 reveals that when scattering intensity per unit area of the light modulation layer 34 is not high, even if ITO area is reduced to decrease the amount of light absorption, an effect of improving luminance may not be sufficiently obtained. The line B in FIG. 35 reveals that when ITO area is reduced while scattering intensity per unit area of the light modulation layer 34 is increased, an effect of improving luminance may be sufficiently obtained. The line C in FIG. 35 reveals that when ITO having a small light absorptance is used, even if reduction in ITO area is not large, light extraction efficiency (illuminance) may be increased. Furthermore, the line C in FIG. 35 reveals that even if ITO having a small light absorptance is used, when scattering intensity per unit area of the light modulation layer 34 is increased, an effect of increasing luminance may be further sufficiently obtained.

When the partial electrode 32A has a plurality of openings 32E, metal lines 32G extending in a direction crossing (or orthogonal to) the openings 32E may be provided for each of the partial electrodes 32A, for example, as illustrated in FIG. 36A. This makes it possible to suppress increase in resistance value caused by the plurality of openings 32E provided in the partial electrode 32A. The metal lines 32G preferably hardly cause unevenness in illumination light, and therefore, for example, when thickness of the light guide plate 10 is 5 mm, the light modulation element 30 is disposed on the back of the light guide plate 10, and a diffuser sheet, a prism sheet, and a polarization separation sheet are provided on the light guide plate 10, a width of each metal line 32G is preferably 200 µm or less.

When metal lines 32G extending in the direction crossing (or orthogonal to) the openings 32E are provided by one for each of the partial electrodes 32A, a plurality of belt-like gaps 32F extending in a direction crossing (or orthogonal to) an extending direction of partial electrodes 32A may be provided, for example, as illustrated in FIG. 36B. In consideration of ease in patterning, the gaps 32F are advantageously provided in the partial electrode 32A instead of the openings 32E.

When moire of the openings 32C or the gaps 32F with another periodical structure (the convex portions 11 or the openings 36B) needs to be avoided, the openings 32C or the gaps 32F are desirably disposed randomly. When the openings 32C or the gaps 32F are periodically arranged, a pitch of the openings 32C or the gaps 32F is preferably adjusted to be inverse integer multiple (excluding ½) of or inverse integer submultiple (excluding ½) of a pitch of another periodical structure (for example, a pitch of the convex portions 11 or the openings 36B). However, since the openings 32C or the gaps 32F may be aligned with a periodical structure (zigzag structure of the irregular portion 32B) in the same member, a pitch of the openings 32C or the gaps 32F is preferably adjusted to be integer multiple or integer submultiple of a pitch of the periodical structure in the same member.

Fourth Modification

In each of the embodiments, the openings 32C and 36B may be formed in each partial electrode 32A and the upper electrode 36 or each partial electrode 36A, respectively. This makes it possible to reduce absorption of visible light by the electrodes when the partial electrode 32A and the upper electrode 36 or the partial electrode 36A include ITO each.

In this case, each opening 32C formed in the partial electrode 32A and each opening 36B formed in the upper electrode 36 or the partial electrode 36A are preferably opposed to each other at least partially, and more preferably, correspondingly opposed to each other (or face each other), for example, as illustrated in FIG. 37. It is to be noted that a position of the opening 36B needs to correspond to a position of the opening 32C as viewed from a normal direction of the light modulation element 30 to allow the opening 32C and the opening 36B to be correspondingly opposed to each other (or face each other) as illustrated in FIG. 37. At this time, the opening 32C and the opening 36B preferably have the same shape and the same area.

Here, in the case that when no voltage is applied between the partial electrode 32A and the upper electrode 36 or the partial electrode 36A, a light modulation cell 30-1 is in a transparent state, and when a voltage is applied between the electrode 32A and the electrode 36 or 36A, the light modulation cell 30-1 is in a scattering state, the light modulation layer 34 is in the scattering state only in a portion where the partial electrode 32A and the upper electrode 36 or the partial electrode 36A are opposed to each other. As a result, even if voltage is applied to a portion of the partial electrode 32A, which is not opposed to the upper electrode 36 or the partial electrode 36A, or a portion of the upper electrode 36 or the partial electrode 36A, which is not opposed to the partial electrode 32A, switching between transparency and scattering is hardly achieved. It is therefore preferable that when the light modulation element 30 is viewed from the normal direction of the element 30, the opening 32C is superimposed on the opening 36B in order to secure scattering intensity to the utmost while reducing an area of each partial electrode 32A and of upper electrode 36 or partial electrode 36A.

Fifth Modification

While the light modulation element 30 or 60 has been adherently attached to the back (bottom) of the light guide plate 10 with no air layer in between in the embodiments and the like, the element may be adherently attached to a top of the light guide plate 10 with no air layer in between, for example, as illustrated in FIG. 38. Alternatively, the light modulation element 30 or 60 may be provided within the light guide plate 10, for example, as illustrated in FIG. 39. However, even in this case, the light modulation element 30 or 60 need to be adherently attached to the light guide plate 10 with no air layer in between.

Sixth Modification

While no component has been provided on the light guide plate 10 in the embodiments and the like, an optical sheet 70 (for example, a diffuser plate, a diffuser sheet, a lens film, or a polarization separation sheet) may be provided thereon, for example, as illustrated in FIG. 40. In such a case, since part of light emitted in an oblique direction from the light guide plate 10 rises in a front direction, a modulation ratio may be effectively improved.

4. Example

Next, Example of the backlight 1 or 2 of each of the embodiments is described in contrast to a comparative example.

Figure 41:
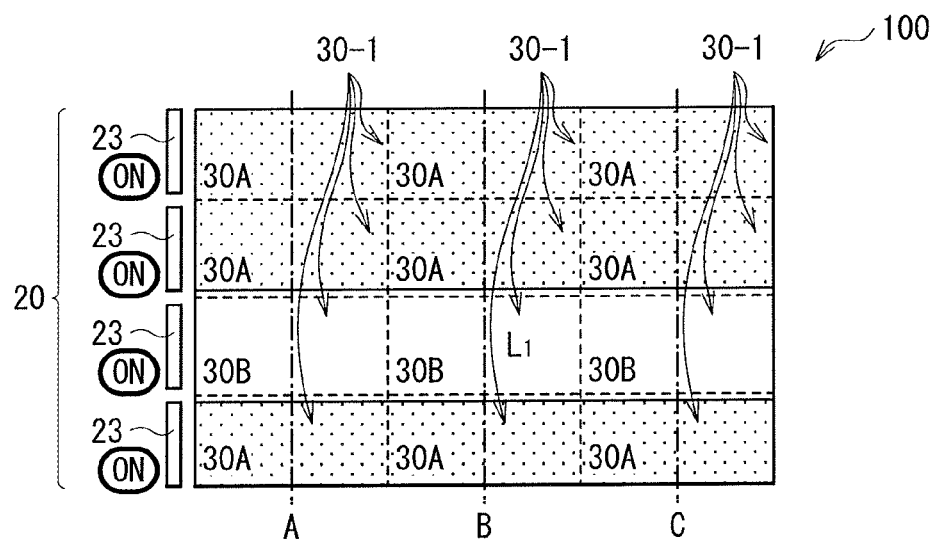
FIG. 41 is a schematic diagram for explaining a first example of operation of a backlight according to a comparative example.
Figure 42:
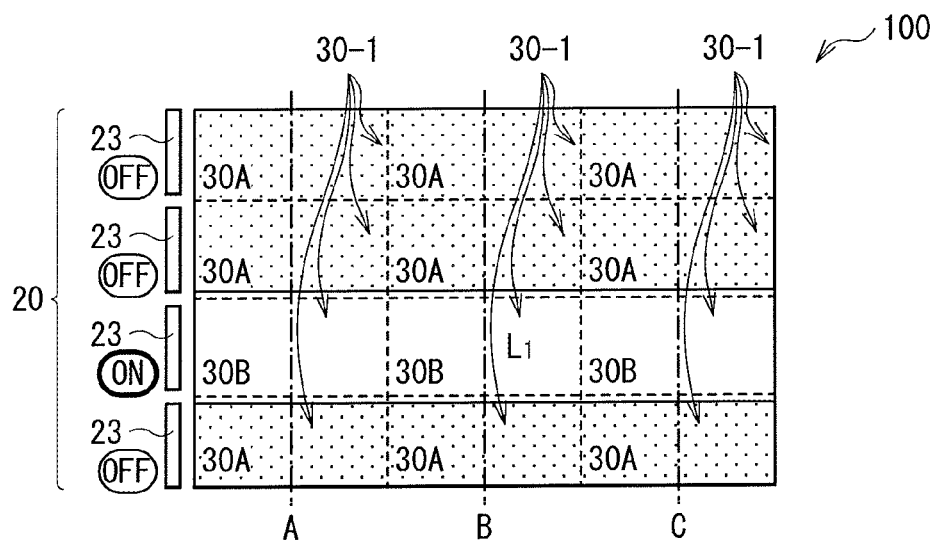
FIG. 42 is a schematic diagram for explaining a second example of the operation of the backlight according to the comparative example.
Figure 43:
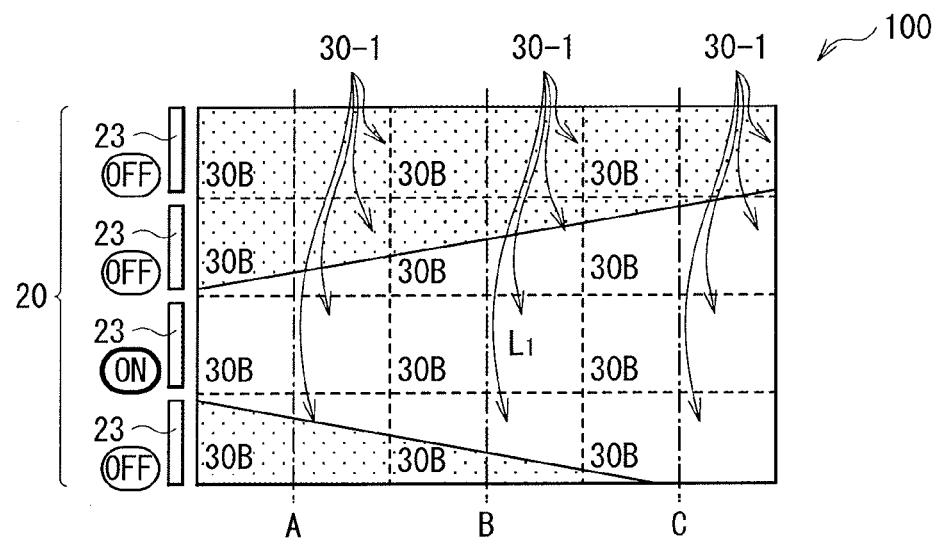
FIG. 43 is a schematic diagram for explaining a third example of the operation of the backlight according to the comparative example.
Figure 44:
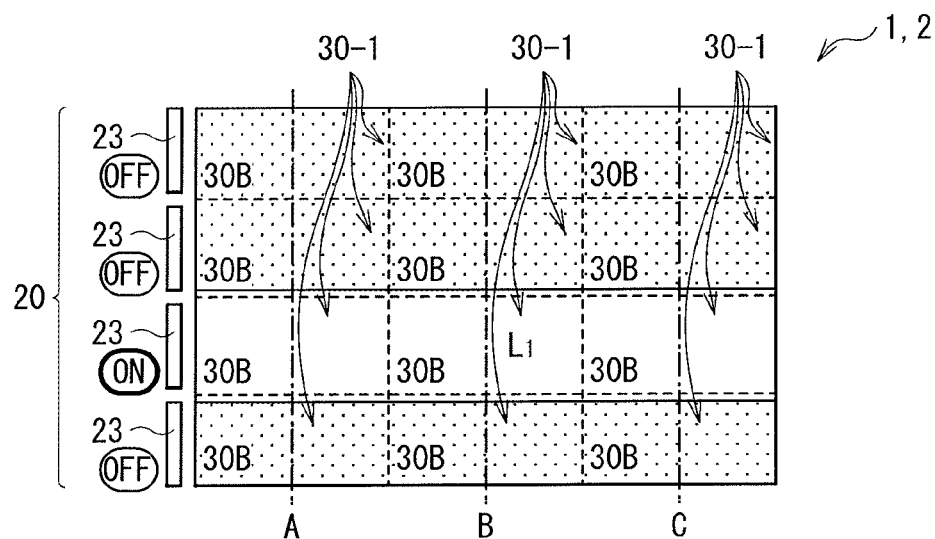
FIG. 44 is a schematic diagram for explaining a first example of operation of the backlight of FIGS. 1A and 1B or FIGS. 16A and 16B.

FIGS. 41 to 43 schematically illustrate an aspect where a backlight 100 according to the comparative example outputs light. FIG. 44 schematically illustrates an aspect where a backlight 1 or 2 according to the Example outputs light. The backlight 100 according to the comparative example used a light guide plate having a flat surface as a top. The backlight 1 or 2 according to the Example used a light guide plate having a plurality of convex portions 11 provided on a top thereof. Each convex portion 11 had a shape, of which the height lowered as approaching the light source 20, and specifically, had a trapezoidal shape with a section profile, at a maximum height portion, having an upper side of 293 μm, a lower side of 327 μm, a slope gradient of 86.7 degrees, and height of 300 μm, where a pitch of the convex portions 11 was 400 μm, as illustrated in FIG. 45A. Height of the convex portion 11 changed approximately linearly in a region where a distance from the light incidence surface 10A was larger than 30 mm and smaller than 130 mm, and was approximately zero in a region where the distance was 0 mm or more and 30 mm or less, and was fixed to a maximum value in a region where the distance was 130 mm or more, as illustrated in FIG. 45B. It is to be noted that a section profile of each convex portion 11 may have a cylindrical shape, for example, as illustrated in FIG. 46. In this case, since a transfer characteristic is improved in molding of the convex portions 11, the convex portions 11 may be easily produced by a melting extrusion method and the like. A configuration common to the backlight 100 according to the comparative example and the backlight 1 or 2 according to the Example is shown in the following.

Light guide plate: Thickness of 5 mm, size of 300*250 mm
Lower electrode: ITO film, 83 mm in width, three columns
Upper electrode: ITO film, 75 mm in width, four rows
Voltage: 100 Hz, pulse voltage of 140 Vpp
Light source: White LED In FIG. 41, all light source blocks 23 were turned on. In FIGS. 42 to 44, only a light source block 23 in the third row was turned on. In FIGS. 41 and 42, only light modulation cells 30-1 in the third row were adjusted into the scattering region 30B, and other light modulation cells 30-1 were adjusted into the transmission region 30A. In FIGS. 43 and 44, all light modulation cells 30-1 were adjusted into the scattering region 30B.

Figure 47:
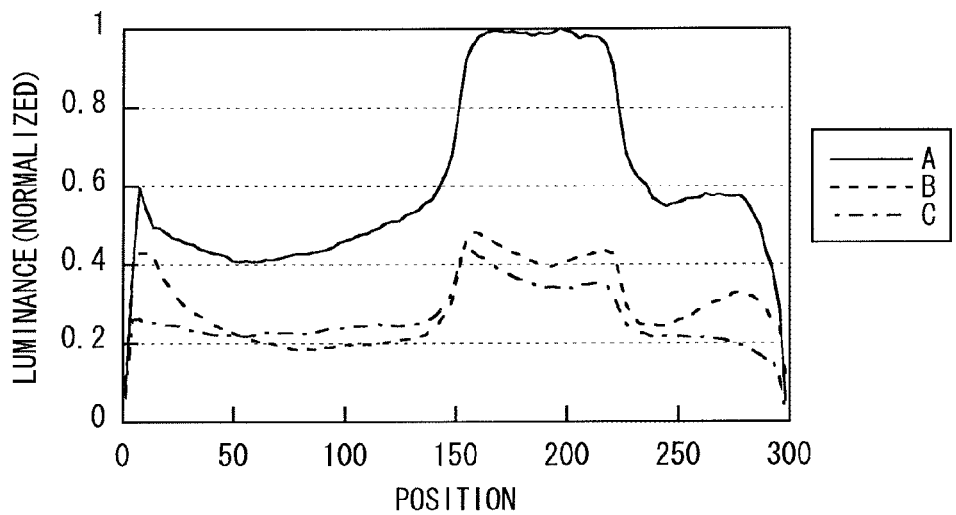
FIG. 47 is a characteristic graph illustrating an example of luminance distribution of the backlight of FIG. 41.
Figure 48:
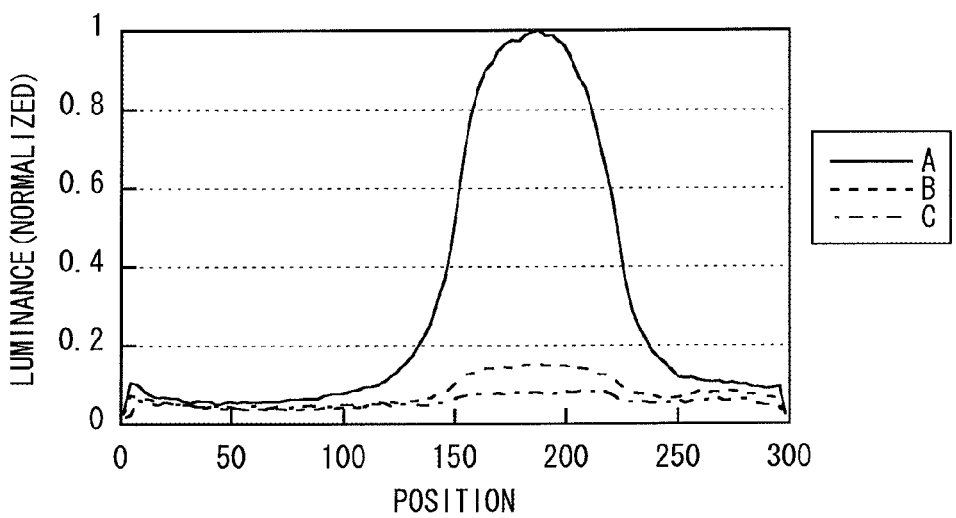
FIG. 48 is a characteristic graph illustrating an example of luminance distribution of the backlight of FIG. 42.
Figure 49:
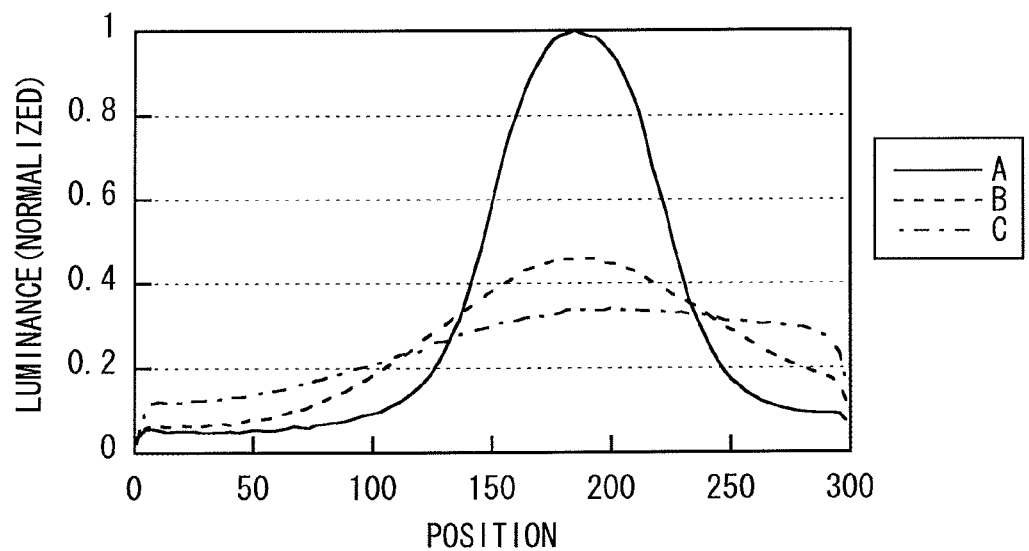
FIG. 49 is a characteristic graph illustrating an example of luminance distribution of the backlight of FIG. 43.
Figure 50:
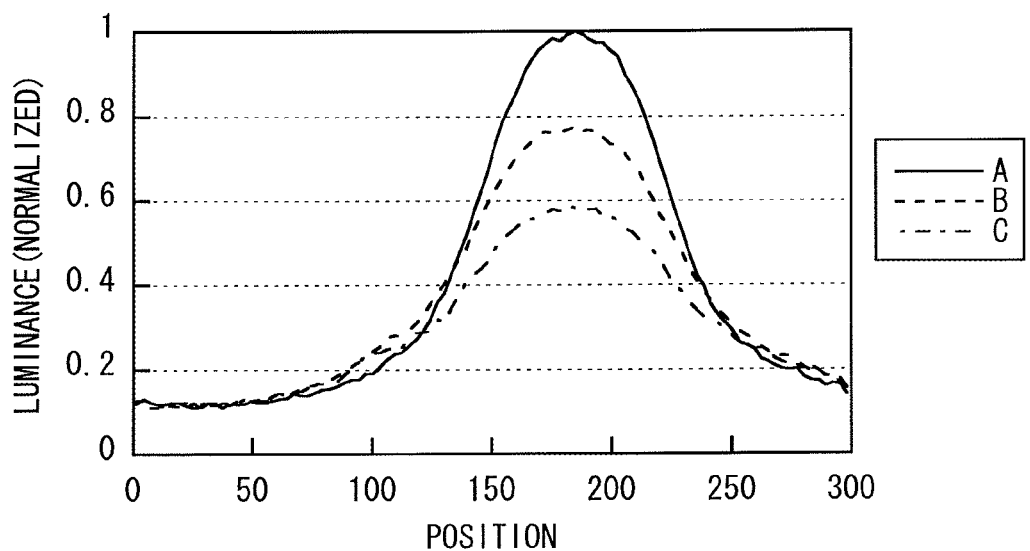
FIG. 50 is a characteristic graph illustrating an example of luminance distribution of the backlight of FIG. 44.

In FIGS. 41, 42, and 44, light L1 was output from the light modulation cells 30-1 in the third row. In FIG. 43, light L1 was output from a portion of each light modulation cell 30-1, through which light output from the light source block 23 in the third row passed. FIG. 47 illustrates luminance distribution of illumination light in respective portions corresponding to lines A, B, and C in FIG. 41, FIG. 48 illustrates luminance distribution of illumination light in respective portions corresponding to lines A, B, and C in FIG. 42, FIG. 49 illustrates luminance distribution of illumination light in respective portions corresponding to lines A, B, and C in FIG. 43, and FIG. 50 illustrates luminance distribution of illumination light at respective portions corresponding to lines A, B, and C in FIG. 44. In addition, each of FIGS. 47 to 50, since the lines A, B, and C show results of measurement with the same backlight, values of a vertical axis are normalized with a maximum value of A.

In FIGS. 41 and 47, luminance steeply changed at a boundary, so that the boundary might be visually confirmed. Furthermore, in FIGS. 41 and 47, since all the light sources 20 were turned on, luminance was high. However, since a top of the light guide plate was a flat surface, light was widely spread in a direction parallel to the light incidence surface 10A with increase in distance from the light source 20, so that luminance was high even in an undriven portion. In FIGS. 42 and 48, luminance also steeply changed at a boundary, so that the boundary might be visually confirmed. Furthermore, in FIGS. 42 and 48, luminance was increasingly reduced with increase in distance from the light source 20. In FIGS. 43 and 49, luminance distribution became flatter with increase in distance from the light source 20, so that partial lighting (partial drive) was hardly achieved. In contrast, in FIGS. 44 and 50, a smooth boundary was provided while contrast was improved, and partial lighting (partial drive) might be thus achieved with a light-and-dark boundary of illumination light being blurred.

Figure 51:
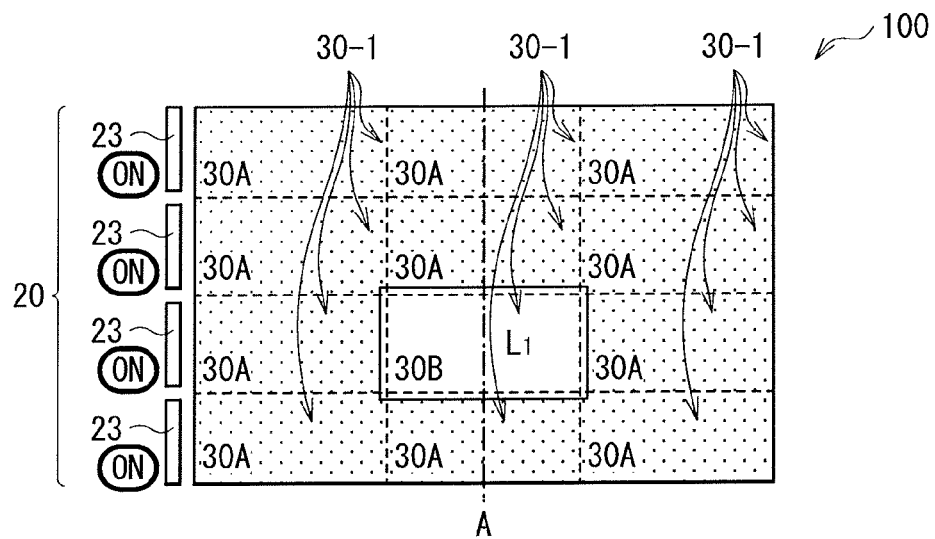
FIG. 51 is a schematic diagram for explaining a fourth example of the operation of the backlight according to the comparative example.
Figure 52:
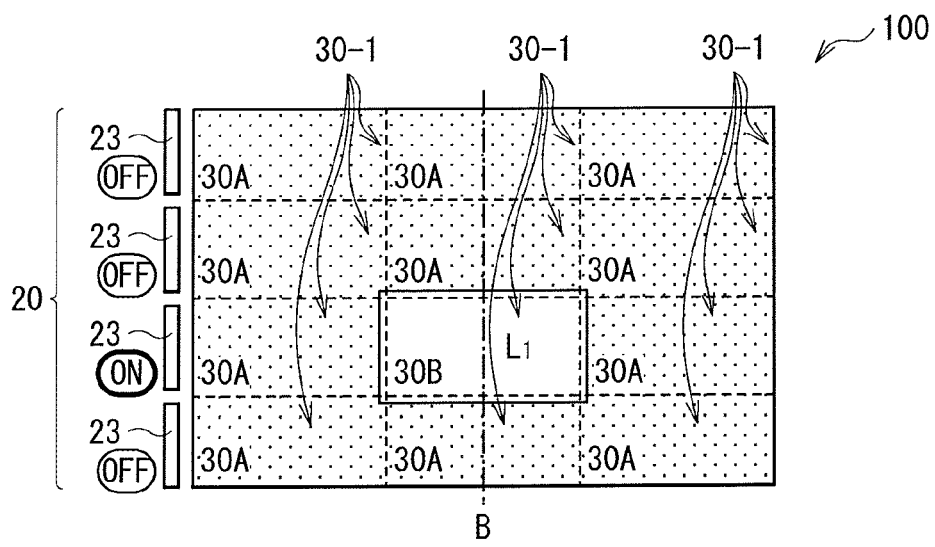
FIG. 52 is a schematic diagram for explaining a fifth example of the operation of the backlight according to the comparative example.
Figure 53:
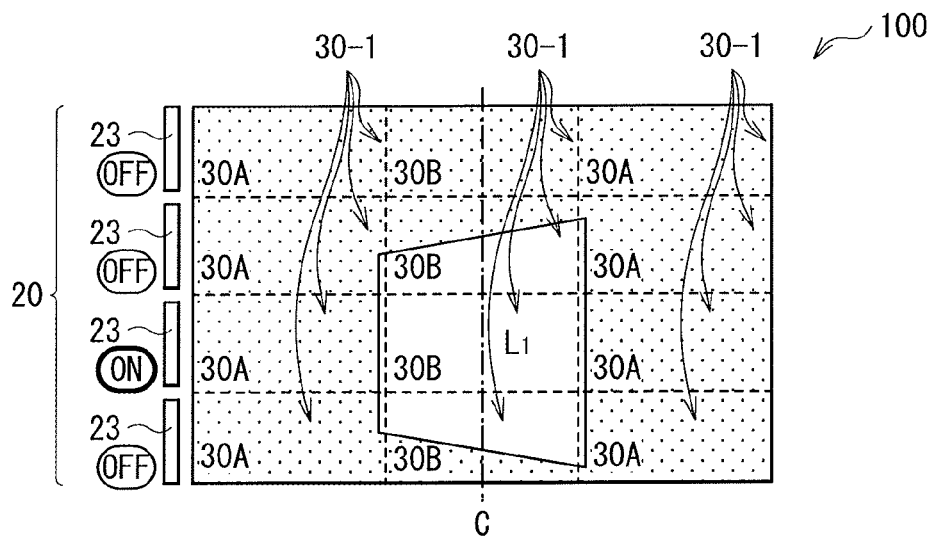
FIG. 53 is a schematic diagram for explaining a sixth example of the operation of the backlight according to the comparative example.
Figure 54:
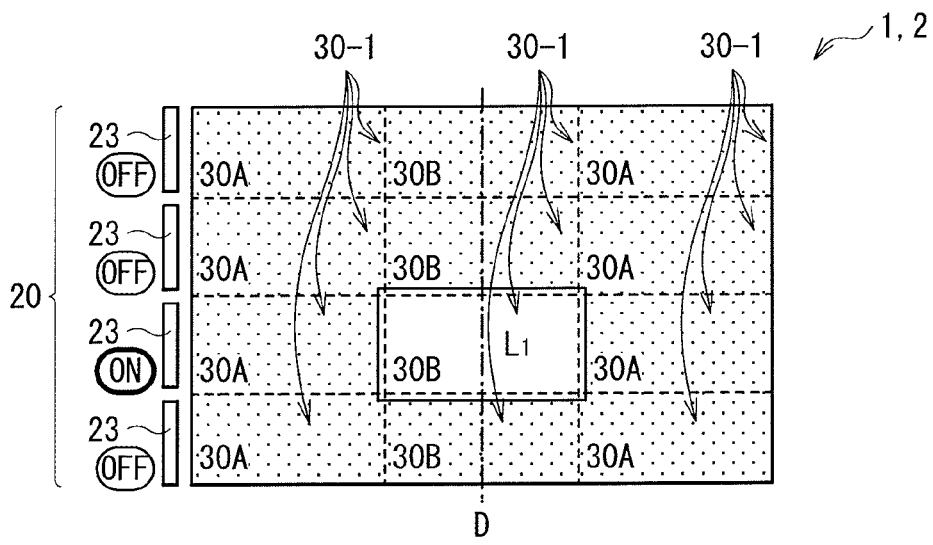
FIG. 54 is a schematic diagram for explaining a second example of the operation of the backlight of FIGS. 1A and 1B or FIGS. 16A and 16B.

Each of FIGS. 51 to 53 schematically illustrates an aspect where the backlight 100 according to the comparative example outputs light. FIG. 54 schematically illustrates an aspect where the backlight 1 or 2 according to the Example outputs light. The backlight 100 according to the comparative example used a light guide plate having a flat surface as a top. The backlight 1 or 2 according to the Example used a light guide plate with a top having a plurality of convex portions 11. It is to be noted that a configuration common to the backlight 100 according to the comparative example and the backlight 1 or 2 according to the Example was the same as that mentioned above.

In FIG. 51, all light source blocks 23 were turned on. In FIGS. 52 to 54, only a light source block 23 in the third row was turned on. In FIGS. 51 and 52, only light modulation cells 30-1 corresponding to portions of 2 columns by 3 rows were each adjusted into a scattering region 30B, and other light modulation cells 30-1 were each adjusted into a transmission region 30A. In FIGS. 53 and 54, only light modulation cells 30-1 in the second column were each adjusted into a scattering region 30B, and other light modulation cells 30-1 were each adjusted into a transmission region 30A.

Figure 55:
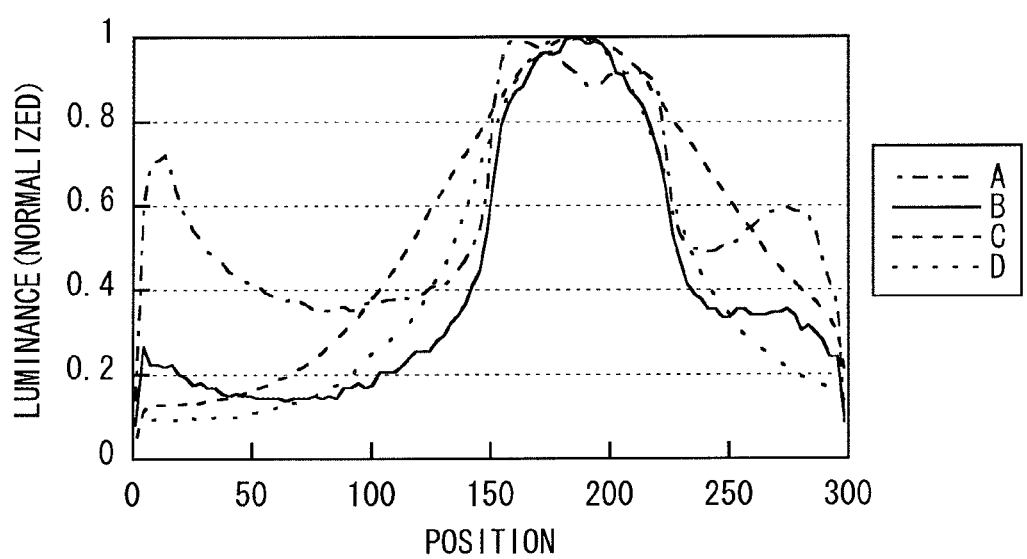
FIG. 55 is a characteristic graph illustrating an example of luminance distribution of the backlight of each of FIGS. 51 to 54.

In FIGS. 51, 52, and 54, light L1 was output from the light modulation cells 30-1 corresponding to a portion in the second column and in the third row. In FIG. 53, light L1 was output from a portion of each of the light modulation cells 30-1 in the second column, through which light output from the light source block 23 in the third row passed. FIG. 55 illustrates luminance distribution of illumination light at respective portions corresponding to lines A, B, C, and D in FIGS. 51 to 54. It is to be noted that in FIG. 55, since the lines A, B, C, and D show results of measurement with different backlights, a maximum value of a vertical axis is normalized to 1 for each of the lines A, B, C, and D.

As for the line A in FIGS. 51 and 55, luminance steeply changed at a boundary, so that the boundary might be visually confirmed. Furthermore, as for the line A in FIGS. 51 and 55, since a top of the light guide plate was a flat surface, light was widely spread in a direction parallel to the light incidence surface 10A with increase in distance from the light source 20, so that luminance was high even in an undriven portion. As for the line B in FIGS. 52 and 55, luminance also steeply changed at a boundary, so that the boundary might be visually confirmed. As for the line C in FIGS. 53 and 55, light was widely spread in the direction parallel to the light incidence surface 10A, so that partial lighting (partial drive) was hardly achieved. In contrast, as for the line D in FIGS. 54 and 55, a smooth boundary was provided while contrast was improved, and partial lighting (partial drive) might be thus achieved with a light-and-dark boundary of illumination light being blurred.

FIGS. 56A and 56B illustrate an example of measurement values of in-plane luminance of the backlight 1 or 2 according to the Example when the optical modulation layer 30 or 60 was wholly adjusted into the scattering state, and all dot-like light sources 21 provided on one side face were turned on. It is to be noted that FIGS. 56A and 56B show in-plane luminance in an area of 90*120 mm near the light source 20. In each of FIGS. 56A and 56B, a light guide plate, having a thickness of 5 mm and a size of 300*250 mm and having a plurality of convex portions 11 on a top thereof, was used as the light guide plate 10. In FIG. 56A, a light guide plate 10 was used, in which height of each convex portion 11 changed as illustrated in FIG. 45B, and each convex portion 11 had a section profile as illustrated in FIG. 45A. In FIG. 56B, a light guide plate 10 was used, in which height of each convex portion 11 was fixed to 300 μm, and each convex portion 11 had a section profile as illustrated in FIG. 45A.

FIGS. 56A and 56B reveal that when height of each convex portion 11 did not change, bright regions near the dot-like light source 21 extended long compared with a case where height of each convex portion 11 changed, and furthermore, dark regions between the bright regions also extended long. This teaches that when height of each convex portion 11 did not change, a region having a strong contrast of light and dark extended over a wide area, leading to degradation of image quality.

FIG. 57 illustrates an example of measurement values of luminance at a screen center in each of the backlight 1 or 2 according to the Example and the backlight 100 according to the comparative example when the optical modulation layer 30 or 60 is wholly adjusted into the scattering state, and all the dot-like light sources 21 provided on one side face are turned on. In the Example, a light guide plate, having a thickness of 4 mm and a size of 32 inches and having a plurality of convex portions 11 on a top thereof, was used as the light guide plate 10. In the Example, a light guide plate was used as the light guide plate 10, in which each convex portion 11 had a triangular prism shape with a vertex angle of 90 degrees, and a pitch of the convex portions 11 was 50 μm. On the other hand, in the comparative example, a light guide plate, having a thickness of 4 mm and having a flat top, was used as the light guide plate 10. In both the Example and the comparative example, the dot-like light sources 21 were provided on two sides of the light guide plate, and furthermore white LED was used for each dot-like light source 21.

FIG. 57 reveals that when the light guide plate 10, in which each convex portion 11 had a triangular prism shape with a vertex angle of 90 degrees, was used, luminance was improved by approximately 11% compared with a case that the light guide plate having a flat top was used.

Figure 58:
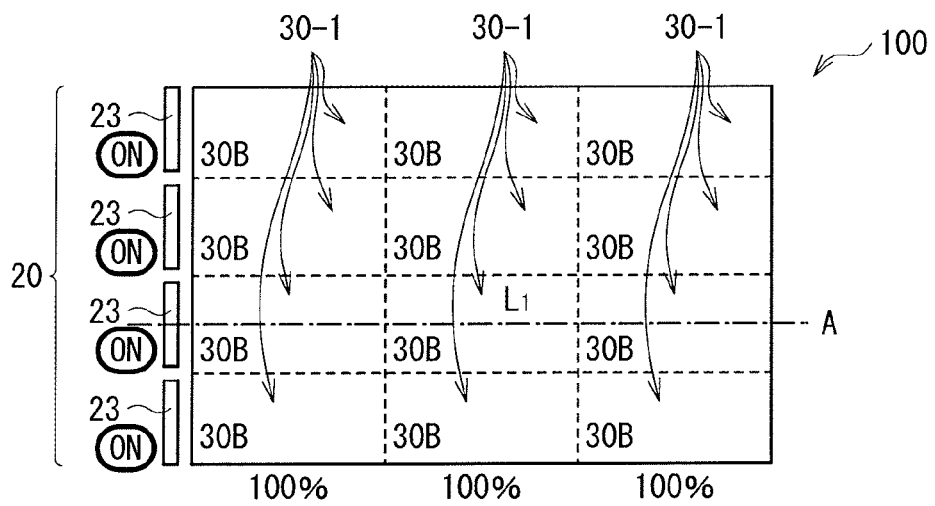
FIG. 58 is a schematic diagram for explaining a seventh example of the operation of the backlight according to the comparative example.
Figure 59:
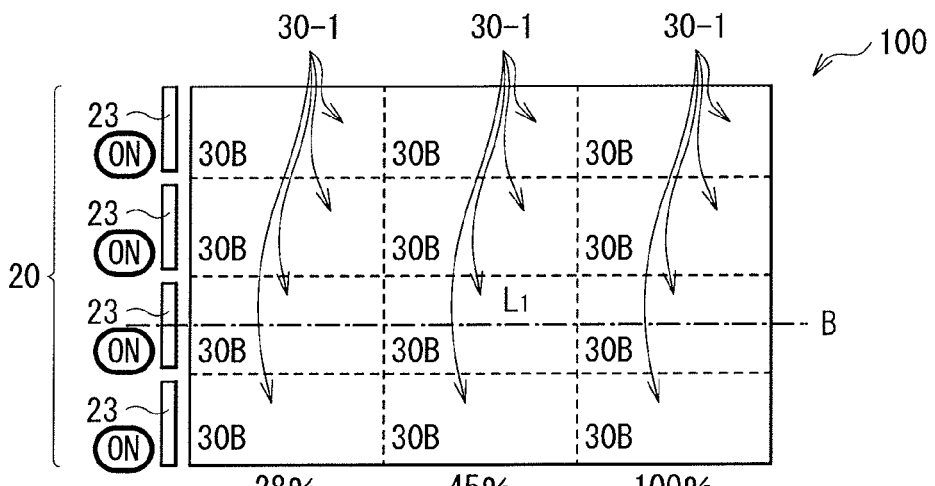
FIG. 59 is a schematic diagram for explaining an eighth example of the operation of the backlight according to the comparative example.
Figure 60:
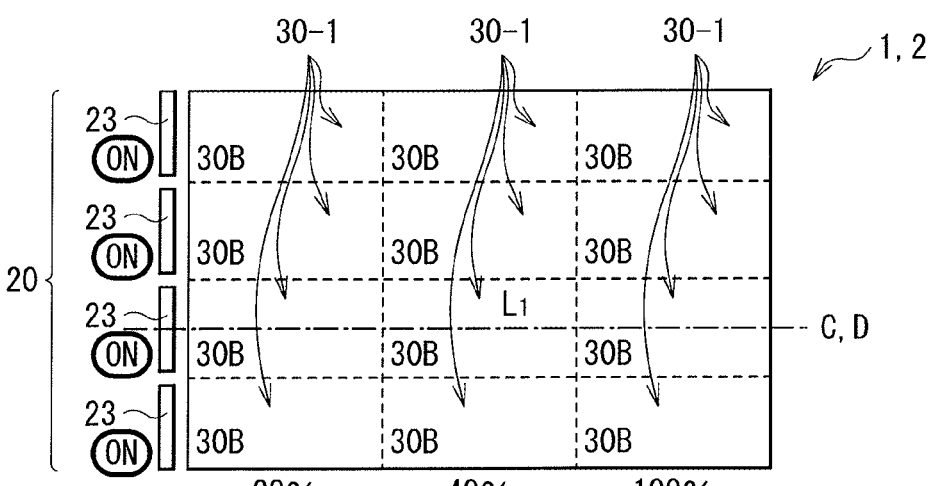
FIG. 60 is a schematic diagram for explaining a first example of operation of a backlight having electrodes of FIGS. 25A and 25B or FIGS. 26A and 26B, or electrodes of FIGS. 27A and 27B or FIGS. 28A and 28B.
Figure 61:
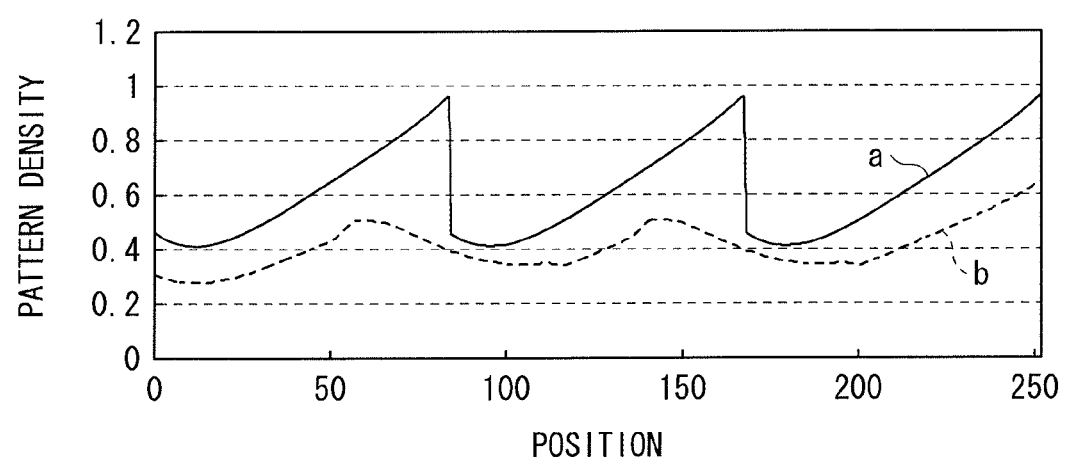
FIG. 61 is a chart illustrating a specific example of pattern density of an upper electrode in the backlight of FIG. 60.

FIGS. 58 and 59 schematically illustrate an aspect where the backlight 100 according to the comparative example outputs light. FIG. 60 schematically illustrates an aspect where the backlight 1 or 2 according to the Example outputs light. The backlight 100 according to the comparative example and the backlight 1 or 2 according to the Example were configured under the following conditions.

(Backlight 100)
Light guide plate: Thickness of 5 mm, size of 300*250 mm, flat top
Lower electrode: ITO film, 83 mm in width, three columns
Upper electrode: ITO film, 75 mm in width, four rows, no opening
Voltage: 100 Hz, pulse voltage of 140 Vpp
Light source: White LED (Backlight 1 or 2)
Light guide plate: Thickness of 5 mm, size of 300*250 mm, convex portions 11 on top
Lower electrode: ITO film, 83 mm in width, three columns
Upper electrode: ITO film, 75 mm in width, four rows
A plurality of openings, each having a size within a range of 100 to 700 μm, was provided.
The number of openings per unit area was constant.
Diameter of each opening was reduced with increase in distance from light source for each of portions opposed to the lower electrodes.
Pattern density was as shown in a line a in FIG. 61.
Voltage: 100 Hz, pulse voltage of 140 Vpp
Light source: White LED In FIGS. 58 to 60, all the light source blocks 23 were turned on, and furthermore, all the light modulation cells 30-1 were adjusted into the scattering region 30B. In FIG. 58, a voltage was applied to all partial electrodes 32A with a duty ratio of 100%. In FIG. 59, a voltage was applied to a partial electrode 32A in the first column with a duty ratio of 28%, a voltage was applied to a partial electrode 32A in the second column with a duty ratio of 45%, and a voltage was applied to a partial electrode 32A in the third column with a duty ratio of 100%. In FIG. 60, a voltage was applied to a partial electrode 32A in the first column with a duty ratio of 22%, a voltage was applied to a partial electrode 32A in the second column with a duty ratio of 40%, and a voltage was applied to a partial electrode 32A in the third column with a duty ratio of 100%.

Figure 62:
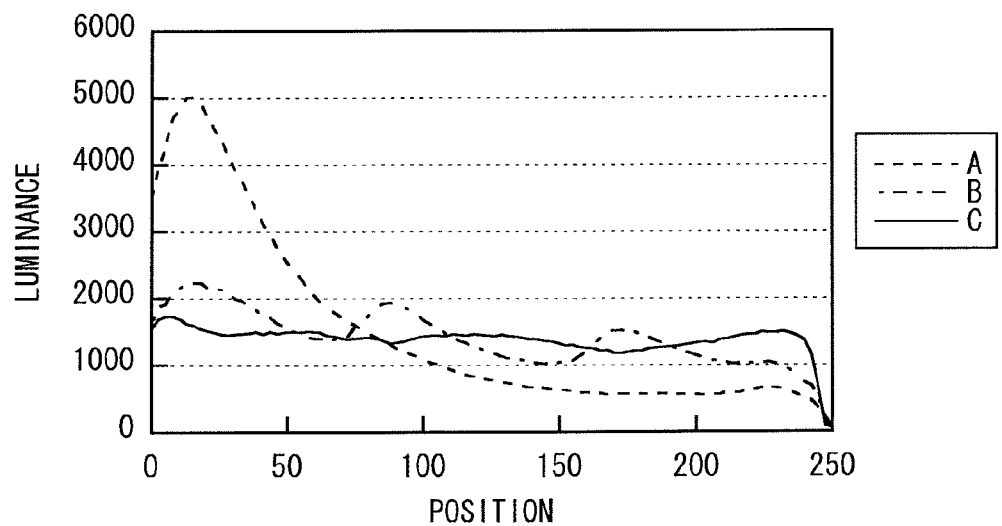
FIG. 62 is a characteristic graph illustrating an example of luminance distribution of the backlight of each of FIGS. 58 to 60.
Figure 63:
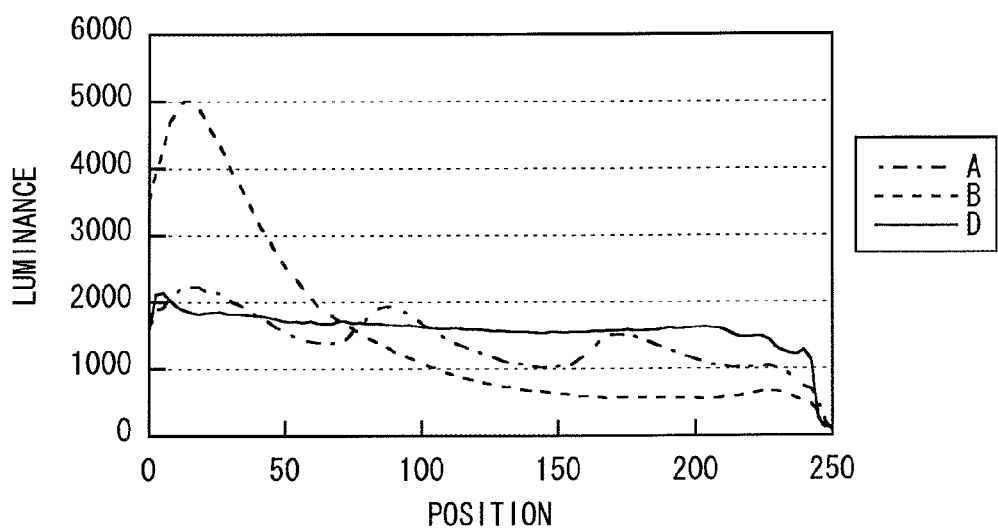
FIG. 63 is a characteristic graph illustrating another example of luminance distribution of the backlight of each of FIGS. 58 to 60.

In FIGS. 58 to 60, light L1 was output from all the light modulation cells 30-1. FIG. 62 illustrates luminance distribution of illumination light in respective portions corresponding to lines A, B, and C in FIGS. 58 to 60. FIG. 63 illustrates luminance distribution of illumination light in a portion corresponding to a line D in FIG. 60 in the case that an irregular shape having the following feature was formed on each edge of the lower electrode, and furthermore, a change of pattern density of the upper electrode was made gentle as shown by a line b in FIG. 61, and illustrates luminance distribution of illumination light in respective portions corresponding to lines A and B in FIGS. 58 and 59. In addition, to allow a change of pattern density to be gentle as shown by the line b, a change of pattern density in a portion of the upper electrode corresponding to a zigzag, irregular shape was made gentle, and pattern density of the upper electrode was corrected in consideration of a gap formed between irregular shapes adjacent to each other. Furthermore, diameter of each of the openings provided in the upper electrode was increased, so that pattern density of the upper electrode was reduced to about two-thirds compared with a case of the line a in FIG. 61. At this time, D1 was 0.507, and D2 is 0.337. Accordingly, D1/D2 was 1.50, larger than 1, and was smaller than 100%/40%, and still smaller than 40%/22%.

(Irregular Shape on Edge of Lower Electrode)
Profile: Sine-squared function
Width of gap formed between irregular shapes adjacent to each other: 0.1 mm
Width of each of convex portions included in irregular shape: 60 mm Pitch of each of convex portions included in irregular shape: 1.9 mm As for the line A in FIGS. 58 and 62, a duty ratio was constant, and scattering intensity was even over all the light modulation cells 30-1, and therefore a large quantity of light was extracted from a column near the light source 20, leading to nonuniform brightness. As for the line B in FIGS. 59 and 62, a duty ratio was set to be larger with increase in distance from the light source 20, and therefore uniformity of the brightness was improved compared with the case of the line A in FIGS. 58 and 62. However, as for the line B in FIGS. 59 and 62, since openings for making luminance uniform were not provided in the upper electrode, brightness was high in a region near the light source 20 in a column, leading to nonuniform brightness. In contrast, as for the line C in FIGS. 60 and 62, a duty ratio was set to be larger with increase in distance from the light source 20, and furthermore openings for making luminance uniform were provided in the upper electrode, leading to uniform brightness. Furthermore, as for the line D in FIG. 63, a zigzag irregular shape with a sine-squared profile was formed on an edge of the lower electrode, leading to further uniform brightness.

FIGS. 64 and 65 schematically illustrate an aspect where the backlight 100 according to the comparative example outputs light. FIG. 66 schematically illustrates an aspect where the backlight 1 or 2 according to the Example outputs light. Each of the backlight 100 according to the comparative example and the backlight 1 or 2 according to the Example was configured under the following conditions.

(Backlight 100)

Light guide plate: Thickness of 5 mm, size of 300*250 mm, flat top

Lower electrode: ITO film, 83 mm in width, three columns

Upper electrode: ITO film, 75 mm in width, four rows, no opening

Voltage: 100 Hz, pulse voltage of 140 Vpp

Light source: White LED (Backlight 1 or 2)

Light guide plate: Thickness of 5 mm, size of 300*250 mm, convex portions on top Lower electrode: ITO film, 83 mm in width, three columns Upper electrode: ITO film, 75 mm in width, four rows A plurality of openings, each having a size within a range of 100 to 700 µm, was provided.

The number of openings per unit area was constant.

Diameter of each opening was reduced with increase in distance from light source for each of portions opposed to the lower electrodes.

Voltage: 100 Hz, pulse voltage of 140 Vpp

Light source: White LED

In FIG. 64, all light source blocks 23 were turned on. In FIGS. 65 and 66, only a light source block 23 in the third row was turned on, and other light source blocks 23 were turned off. In FIGS. 64 to 66, only light modulation cells 30-1 in the third row were adjusted into the scattering region 30B, and other light modulation cells 30-1 were adjusted into the transmission region 30A. In FIGS. 64 to 66, a voltage was applied to all partial electrodes 32A with a duty ratio of 100%.

Figure 67:
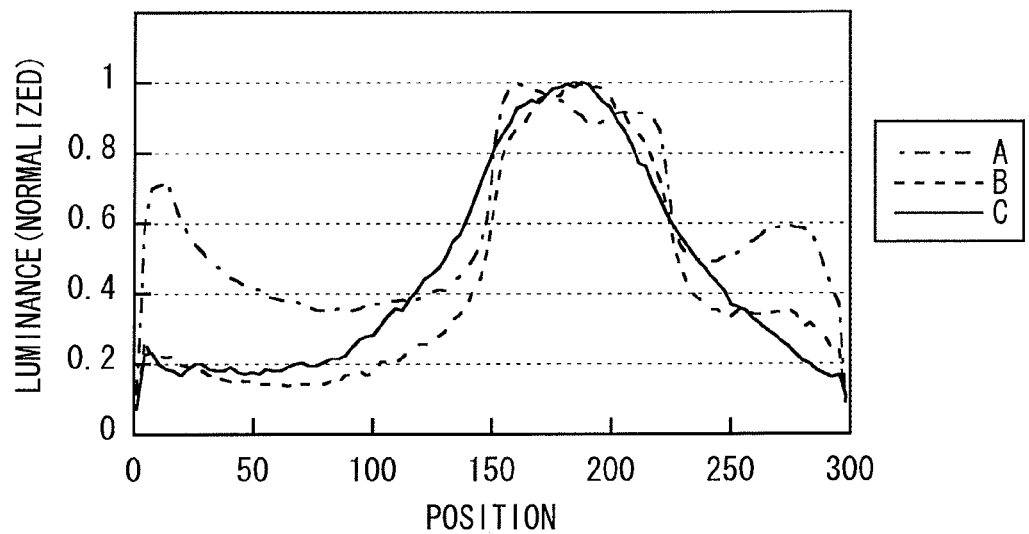
FIG. 67 is a characteristic graph illustrating an example of luminance distribution of the backlight of each of FIGS. 64 to 66.
Figure 68:
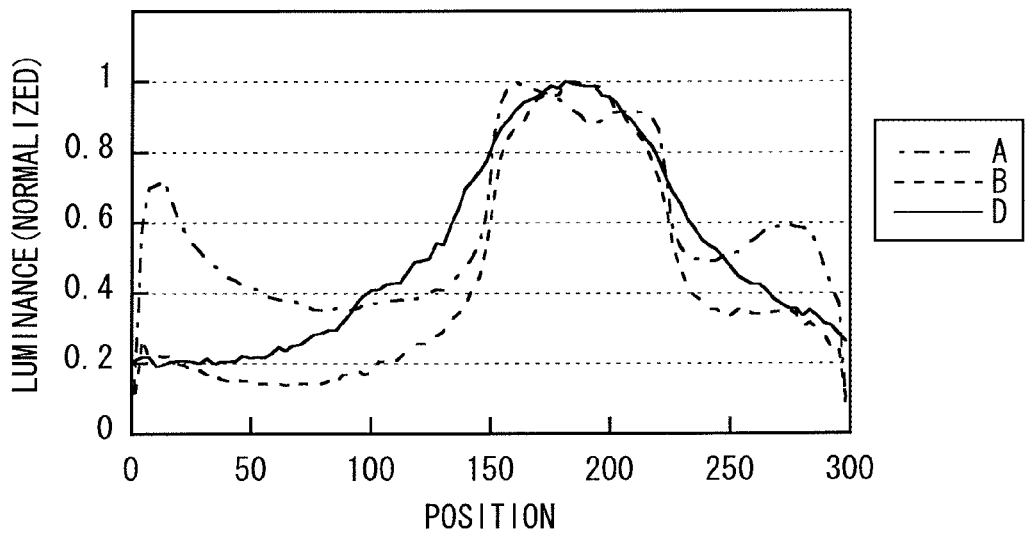
FIG. 68 is a characteristic graph illustrating another example of luminance distribution of the backlight of each of FIGS. 64 to 66.

In FIGS. 64 to 66, light L1 was output from the light modulation cells 30-1 in the third row. FIG. 67 illustrates luminance distribution of illumination light in respective portions corresponding to lines A, B, and C in FIGS. 64 to 66. FIG. 68 illustrates luminance distribution of illumination light in a portion corresponding to a line D in FIG. 66 in the case that a zigzag irregular shape with a sine-squared profile was formed on an edge of the lower electrode, and furthermore, a change of pattern density of a portion of the lower electrode corresponding to the zigzag irregular shape was made gentle as shown by FIG. 30A, and illustrates luminance distribution of illumination light in a portion corresponding to each of lines A and B in FIGS. 64 and 65. In addition, in FIG. 67, since the lines A, B, and C show results of measurement with different backlights, a maximum value of a vertical axis is normalized to 1 for each of the lines A, B, and C. In addition, in FIG. 68, since the lines A, B, and D show results of measurement with different backlights, a maximum value of a vertical axis is normalized to 1 for each of the lines A, B, and D.

As for the line A in FIGS. 64 and 67, luminance steeply changed at a boundary, so that the boundary might be visually confirmed. Furthermore, as for the line A in FIGS. 64 and 67, since a top of the light guide plate was a flat surface, light was widely spread in a direction parallel to the light incidence surface 10A with increase in distance from the light source 20, so that luminance was high in an undriven portion. As for the line B in FIGS. 65 and 67, luminance also steeply changed at a boundary, so that the boundary might be visually confirmed. In contrast, as for the line C in FIGS. 66 and 67, a smooth boundary was provided while contrast was improved, and partial lighting (partial drive) might be thus achieved with a light-and-dark boundary of illumination light being blurred. Furthermore, as for the line D in FIG. 68, a smooth boundary was also provided while contrast was improved, and partial lighting (partial drive) might be thus achieved with a light-and-dark boundary of illumination light being blurred.

Figure 69:
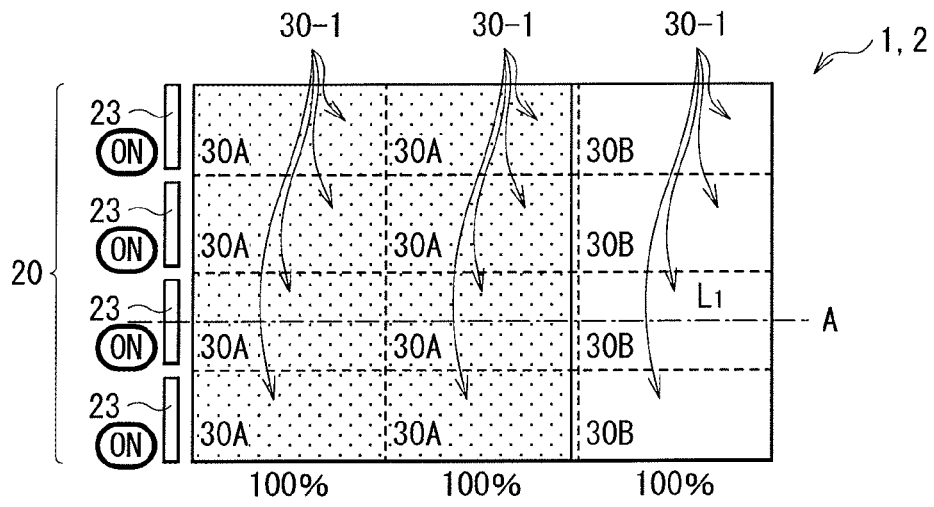
FIG. 69 is a schematic diagram for explaining a third example of the operation of the backlight having the electrodes of FIGS. 26A and 26B or FIGS. 27A and 27B.
Figure 70:
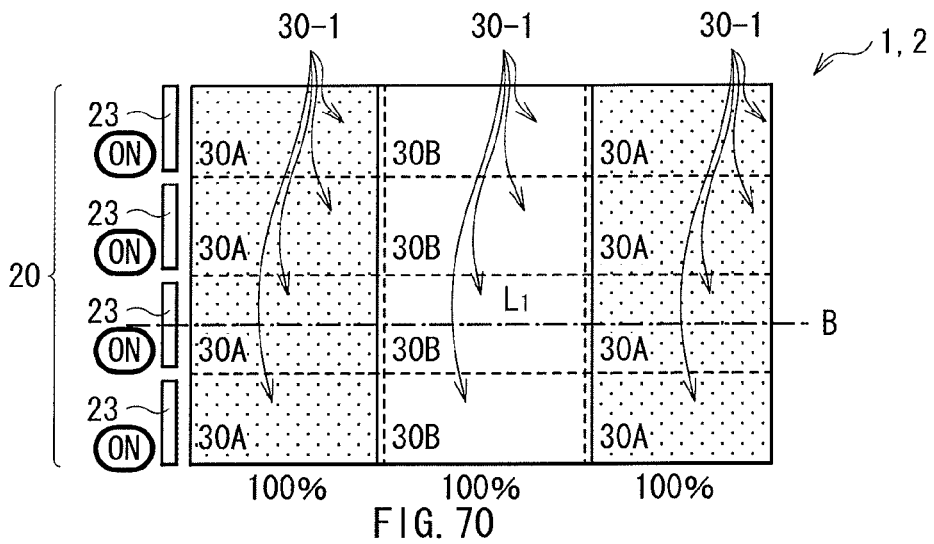
FIG. 70 is a schematic diagram for explaining a fourth example of the operation of the backlight having the electrodes of FIGS. 27A and 27B or FIGS. 28A and 28B.
Figure 71:
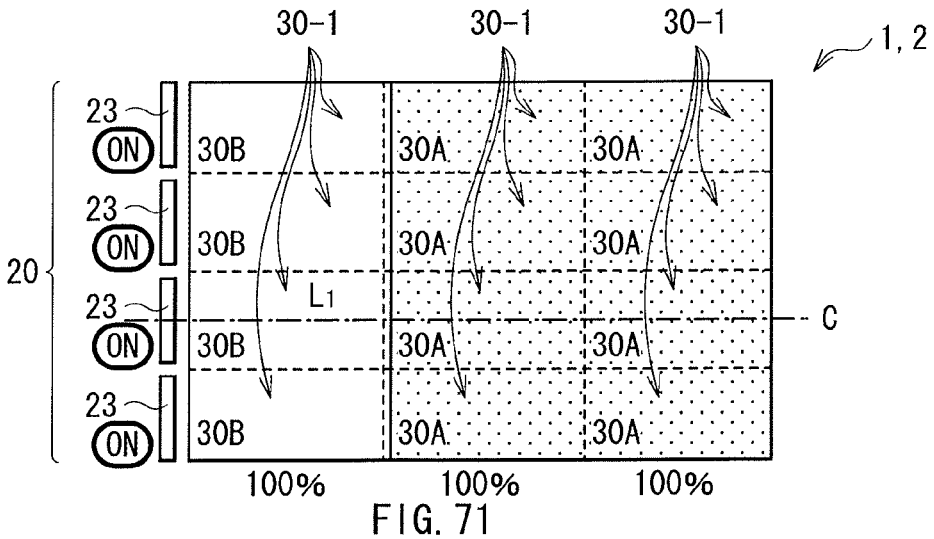
FIG. 71 is a schematic diagram for explaining a fifth example of the operation of the backlight having the electrodes of FIGS. 27A and 27B or FIGS. 28A and 28B.

FIGS. 69 to 71 schematically illustrate an aspect where the backlight 1 or 2 according to the Example outputs light. The backlight 1 or 2 according to the Example was configured under the following conditions.

Light guide plate: Thickness of 5 mm, size of 300*250 mm, convex portions on top Lower electrode: ITO film, 83 mm in width, three columns A zigzag irregular shape with a sine-squared profile was provided.

Upper electrode: ITO film, 75 mm in width, four rows

A plurality of openings, each having a size within a range of 100 to 700 µm, was provided.

The number of openings per unit area was constant.

Diameter of each opening was reduced with increase in distance from the light source for each of portions opposed to the lower electrodes.

Voltage: 100 Hz, pulse voltage of 140 Vpp

Light source: White LED

In FIGS. 69 to 71, all light source blocks 23 were turned on. In FIG. 69, only light modulation cells 30-1 in the third column were adjusted into the scattering region 30B, and other light modulation cells 30-1 were adjusted into the transmission region 30A. In FIG. 70, only light modulation cells 30-1 in the second column were adjusted into the scattering region 30B, and other light modulation cells 30-1 were adjusted into the transmission region 30A. In FIG. 71, only light modulation cells 30-1 in the first column were adjusted into the scattering region 30B, and other light modulation cells 30-1 were adjusted into the transmission region 30A. In FIGS. 69 to 71, a voltage was applied to all partial electrodes 32A with a duty ratio of 100%.

Figure 72:
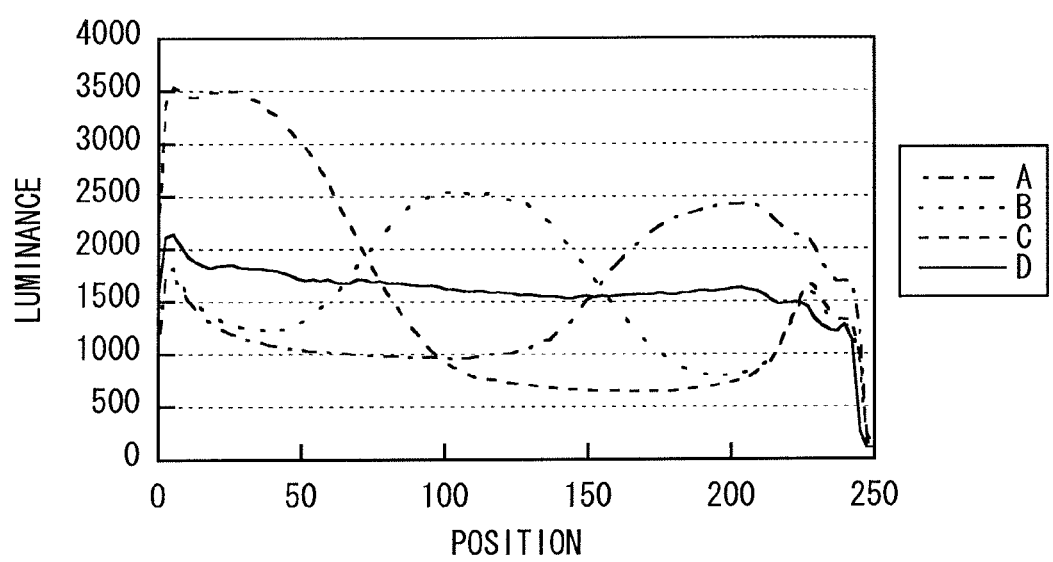
FIG. 72 is a characteristic graph illustrating an example of luminance distribution of the backlight of each of FIGS. 69 to 71.

In FIG. 69, light L1 was output from the light modulation cells 30-1 corresponding to the third column. In FIG. 70, light L1 was output from the light modulation cells 30-1 corresponding to the second column. In FIG. 71, light L1 was output from the light modulation cells 30-1 corresponding to the first column. FIG. 72 illustrates luminance distribution of illumination light in respective portions corresponding to lines A, B, and C in FIGS. 69 to 71, and luminance distribution of the line D in FIG. 63.

As for each of the lines A to C in FIGS. 69 to 71 and FIG. 72, a smooth boundary was provided, and partial lighting (partial drive) might be thus achieved with a light-and-dark boundary of illumination light being blurred. Furthermore, luminance of the line A in FIG. 72 was 1.5 times as high as that of the line D in FIG. 72, luminance of the line B in FIG. 72 was 1.6 times as high as that of the line D in FIG. 72, and luminance of the line C in FIG. 72 was 2.2 times as high as that of the line D in FIG. 72, showing increase in luminance.

FIG. 73 schematically illustrates an aspect where the backlight 100 according to the comparative example outputs light. The backlight 100 according to the comparative example was configured under the following conditions.

Light guide plate: Thickness of 5 mm, size of 300*250 mm, flat top

Lower electrode: ITO film, 83 mm in width, three columns

Upper electrode: ITO film, 75 mm in width, four rows, no opening

Voltage: 100 Hz, pulse voltage of 140 Vpp

Light source: White LED

In FIG. 73, all light source blocks 23 were turned on. Furthermore, light modulation cells 30-1 in the second column were adjusted into the scattering region 30B, and other light modulation cells 30-1 were adjusted into the transmission region 30A. In FIG. 73, a voltage was applied to all partial electrodes 32A with a duty ratio of 100%.

In FIG. 73, light L1 was output from the light modulation cells 30-1 corresponding to the second column. FIG. 74 illustrates luminance distribution of illumination light in a portion corresponding to a line A in FIG. 73, and luminance distribution of the line B in FIG. 62.

As for the line A in FIGS. 73 and 74, luminance steeply changed at a boundary compared with the line B in FIG. 74, so that the boundary might be visually confirmed.

Hereinafter, description is made on image quality in the case that D1/D2 does not satisfy the above-mentioned relational expression, for reference. It is to be noted that a configuration of each of lower and upper electrodes and a duty ratio of a voltage were as follows.

(Lower Electrode)

Three columns

A zigzag irregular shape with a sine-squared profile was provided.

Width of gap formed between irregular shapes adjacent to each other: 0.1 mm

Width of each of convex portions included in irregular shape: 30 mm

Pitch of each of convex portions included in irregular shape: 1.9 mm

D1: 0.862

D2: 0.414

D1/D2: 2.08

Upper electrode

Four rows

Figure 75:
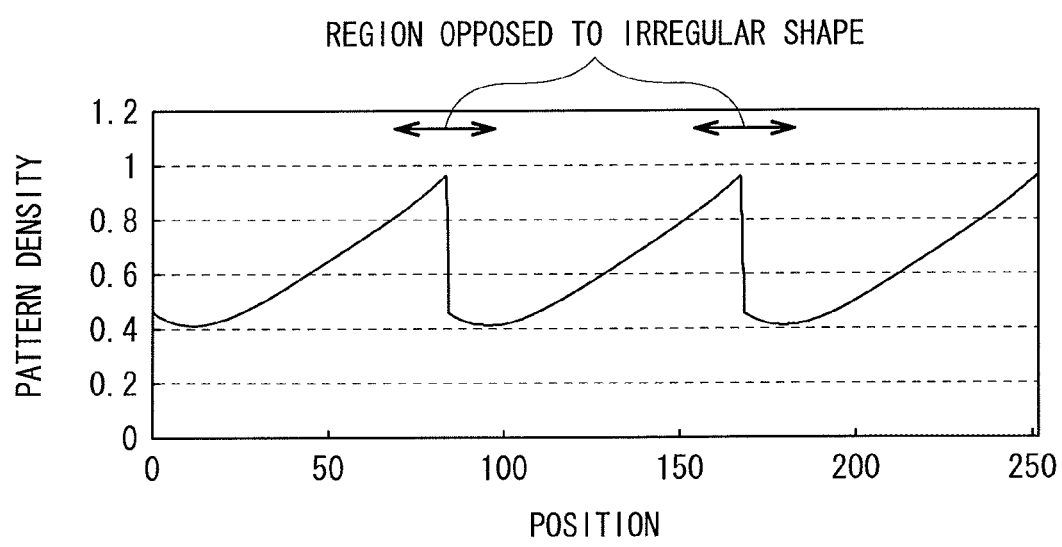
FIG. 75 is a chart illustrating a specific example of pattern density when pattern density of the upper electrode in the backlight is out of a desired range.

Pattern density was as shown in FIG. 75.

(A portion where pattern density increases with increase in distance from the light source was intentionally provided by approximately 5 mm in a region opposed to the irregular shape.)

(Duty Ratio of Voltage)

Partial electrode near light source: 22%

Partial electrode in the center: 40%

Partial electrode most away from light source: 100%

In the above conditions, D1/D2 was larger than 40%/22%, which did not satisfy the above-mentioned relational expression. It is to be noted that while a line was smooth in FIG. 75, pattern density of the upper electrode was actually corrected in consideration of a gap formed between irregular shapes adjacent to each other, and consequently the pattern density had a difference in level. When the whole screen was turned on under the above conditions, a dark line might be visualized at a place corresponding to the portion where pattern density increased with increase in distance from the light source in a region opposed to the irregular shape, revealing that image quality was somewhat degraded. The dark line hardly disappeared even if a duty ratio of a voltage or magnitude of the voltage was finely adjusted for each of partial electrodes of the lower electrode. It is to be noted that such degradation of image quality might be allowed depending on specifications of image quality, and it can be said that the degradation of the image quality under the above conditions was within a range without obstructing practical use of the backlight.

Application Example

Next, an application example of the backlight 1 or 2 of each of the embodiments is described.

Figure 76:
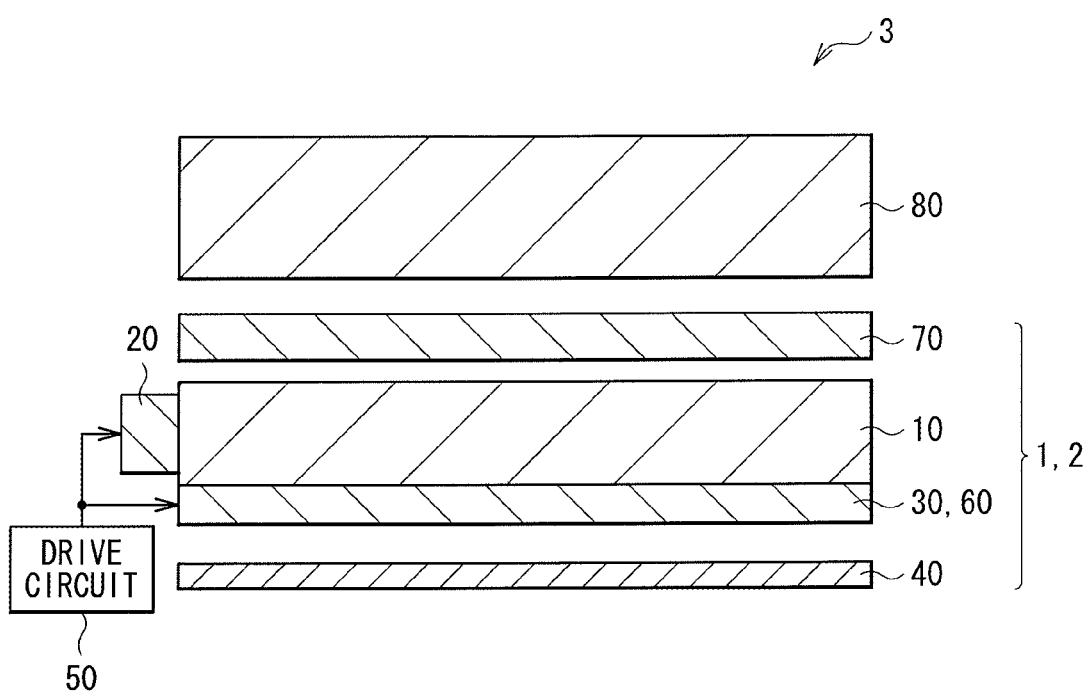
FIG. 76 is a section view illustrating an example of a display device according to an application example.

FIG. 76 illustrates an example of a schematic configuration of a display device 3 according to the application example. The display device 3 includes a display panel 80 and a backlight 1 or 2 disposed in the back of the display panel 80.

The display panel 80 displays video images. The display panel 80 includes a plurality of pixels arranged in a matrix, and may display video images by driving the plurality of pixels based on a video signal. The display panel 80 is, for example, a transmissive liquid crystal display panel, and is structured such that a liquid crystal layer is sandwiched by a pair of transparent substrates. For example, while not shown, the display panel 80 includes a polarizer, a transparent substrate, pixel electrodes, an alignment film, a liquid crystal layer, an alignment film, a common electrode, a color filter, a transparent substrate, and a polarizer in this order from a backlight 1 or 2 side.

The transparent substrate is configured of a substrate transparent to visible light, for example, sheet glass. It is to be noted that the transparent substrate on the backlight 1 side has a not-shown active drive circuit formed thereon, the circuit including TFTs (Thin Film Transistors) electrically connected to the pixel electrodes, and including wiring lines. The pixel electrodes and the common electrode include, for example, ITO. The pixel electrodes are lattice-arranged or delta-arranged on the transparent substrate, and serve as electrodes for each of pixels. On the other hand, the common electrode is formed over the whole surface of the color filter, and serves as a common electrode opposed to the respective pixel electrodes. The alignment film includes a polymer material such as polyimide to perform alignment treatment of a liquid crystal. The liquid crystal layer includes a liquid crystal of a VA (Vertical Alignment) mode, a TN (Twisted Nematic) mode, or a STN (Super Twisted Nematic) mode, and has a function of changing, for each pixel, a direction of a polarization axis of light emitted from the backlight 1 or 2 by a voltage applied from the drive circuit (not shown). It is to be noted that arrangement of the liquid crystal is changed in a multistep manner, and therefore a direction of a transmission axis is adjusted in a multistep manner for each of pixels. The color filter includes color filters, arranged in correspondence to arrangement of the pixel electrodes, for color separation of light transmitted through the liquid crystal layer into, for example, three primary colors of red (R), green (G) and blue (B) or four colors of R, G, B and white (W). Filter arrangement (pixel arrangement) typically includes stripe arrangement, diagonal arrangement, delta arrangement, and rectangle arrangement.

Each polarizer is a kind of optical shutter, and transmits only light (polarized light) oscillating in a certain direction. It is to be noted that while the polarizer may be an absorption-type polarization element that absorbs light (polarized light) oscillating in directions other than a transmission axis direction, the polarizer is preferably a reflection-type polarization element, which reflects the light to the backlight 1 or 2 side, from the viewpoint of increase in luminance. The polarizers are disposed such that respective polarization axes are different by 90 degrees so that light emitted from the backlight 1 or 2 is transmitted through or blocked by the liquid crystal layer.

For example, the drive circuit 50 controls magnitude of voltage applied to the partial electrodes 32A' and 32B' of each light modulation cell 30-1 such that the light axis AX2 or AX4 of the fine particle 34B or 64B is parallel to the light axis AX1 or AX3 of the bulk 34A or 64A in a cell corresponding to a pixel position of black display among a plurality of light modulation cells 30-1, and the light axis AX2 or AX4 crosses the light axis AX1 or AX3 in a cell corresponding to a pixel position of white display among the plurality of light modulation cells 30-1.

For example, the drive circuit 50 applies to each partial electrode 32A a voltage modulated with one or more of a crest value, a duty ratio, and frequency depending on a distance from the light source 20 to the partial electrode 32A. For example, a voltage is modulated in such a manner that a scattering property of the light modulation cell 30-1 is intensified with increase in distance from the light source 20. Furthermore, for example, the drive circuit 50 may apply to the partial electrode 32A a voltage modulated with one or more of a crest value, a duty ratio, and frequency not only depending on the distance from the light source 20 to the partial electrode 32A but also in consideration of a video signal input from the outside. In addition, for example, the drive circuit 50 may apply a fixed voltage to each partial electrode 32A.

Moreover, for example, the drive circuit 50 applies, to each light source block 23, a voltage modulated with one or more of a crest value, a duty ratio, and frequency depending on the distance from the light source 20 to a partial electrode 32A as a voltage application object (or a light modulation cell 30-1 as an emission object), and based on a video signal input from the outside. In addition, for example, the drive circuit 50 may apply a fixed voltage to each light source block 23.

In the application example, the backlight 1 or 2 of the embodiments is used as a light source for lighting the display panel 80. This may increase display luminance while light leakage is reduced or substantially eliminated over a wide view-angle range. As a result, a modulation ratio may be increased in a front direction. Moreover, luminance enhancement may be achieved without increasing input power to the backlight 1 or 2.

Moreover, in the application example, the backlight 1 or 2 modulates intensity of light partially entering the display panel 80 according to a display image. However, if drastic change of brightness occurs at a pattern edge portion of the partial electrode 32A' or 32B' included in the light modulation element 30 or 60, such a brightness boundary may be observed even on a display image. Thus, the backlight is demanded to have a characteristic of changing brightness monotonically to the utmost at an electrode boundary, which is called blurring characteristic. A diffuser plate having high diffusibility is effectively used to enhance the blurring characteristic. However, if diffusibility is high, total transmittance is reduced, and therefore brightness tends to be reduced. Consequently, when a diffuser plate is used for the optical sheet 70 in the application example, total transmittance of the diffuser plate is preferably 50 to 85%, and more preferably 60 to 80%. The blurring characteristic is improved with increase in spatial distance between the light guide plate 10 and the diffuser plate in the backlight 1 or 2.

In addition, the blurring characteristic is improved in the case that while a light guide plate having a plurality of convex portions 11 on a top thereof is used as the light guide plate 10, a plurality of partial electrode pairs 32C are used as the electrode 32, and a plurality of light source blocks 23 that may be independently driven are used as the light source 20, only part of the light source blocks 23 are turned on, and a voltage is applied to a part of the partial electrode pairs 32C. In addition, the number of the partial electrode pairs 32C included in the light modulation element 30 is increased, and a voltage applied to each partial electrode pair 32C is adjusted such that light and dark changes monotonically as much as possible, which also improves the blurring characteristic.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

What is claimed is:

1. An illumination device comprising:
   a light guide plate;
   a light source disposed on a side face of the light guide plate; and
   a light modulation element disposed on a surface or in an inside of the light guide plate and adhered to the light guide plate,
   wherein the light guide plate has a plurality of convex portions extending in a direction parallel to a normal to a face opposed to the light source among side faces of the light guide plate,
   the light source is configured of a plurality of light source blocks capable of being independently driven, and
   the light modulation element includes:
      a pair of transparent substrates disposed separately and oppositely to each other,
      a plurality of first electrodes provided on a surface of one of the pair of transparent substrates, and extending in a direction crossing an extending direction of the convex portions,
      a second electrode provided on a surface of another of the pair of transparent substrates, and
      a light modulation layer provided in a gap between the pair of transparent substrates, and exhibiting a scattering property or a transparent property to light from the light source depending on magnitude of an electric field,
   wherein each of the first electrodes has an irregular shape on an edge thereof adjacent to another first electrode,
   wherein the second electrode is configured of a single sheet-like electrode or a plurality of belt-like electrodes,
   wherein the second electrode is patterned, where pattern density is different depending on a distance from the light source for each of parts opposed to the first electrodes, and
   wherein in the second electrode, a boundary between a region of thin pattern density and a region of dense pattern density is disposed within a region of the relevant second electrode opposed to the irregular shape of each of the first electrodes.

2. The illumination device according to claim 1, wherein a cross section of each of the convex portions in a direction orthogonal to an extending direction of the relevant convex portion has a rectangular shape, a trapezoidal shape, or a triangle shape.

3. The illumination device according to claim 1, wherein the second electrode is configured of a plurality of belt-like electrodes, and
each of the belt-like electrodes is patterned, where pattern density is different depending on a distance from the light source for each of the belt-like electrodes.

4. The illumination device according to claim 1, wherein the second electrode is configured of a single sheet-like electrode or a plurality of belt-like electrodes, and
the second electrode is patterned, where pattern density is different depending on a distance from the light source for each of sections opposed to the first electrodes.

5. The illumination device according to claim 1, further comprising a drive circuit applying a voltage to the light modulation element,
wherein the drive circuit applies, to each of the first electrodes of the light modulation element, a voltage modulated depending on a distance from the light source to the first electrode.

6. The illumination device according to claim 1, wherein the light modulation layer exhibits a transparent property when no voltage is applied to the electrodes, and exhibits a scattering property when a voltage is applied to the electrodes.

7. The illumination device according to claim 1, wherein the second electrode is configured of a single sheet-like electrode, and
the sheet-like electrode is patterned, where pattern density is different depending on a distance from the light source.

8. The illumination device according to claim 7, wherein the second electrode has a plurality of openings, and
one or both of diameter and density of each of the openings is different depending on a distance from the light source.

9. The illumination device according to claim 1, wherein the height of each of the convex portions is relatively low at a point near the light source, and relatively high at a point away from the light source.

10. The illumination device according to claim 9, wherein the height of each of the convex portions is zero at a point proximate to the light source.

11. The illumination device according to claim 1, wherein each of the first electrodes has an irregular shape on an edge thereof adjacent to another first electrode.

12. The illumination device according to claim 11, wherein each of the first electrodes has a plurality of openings.

13. The illumination device according to claim 12, wherein each of the first electrodes has the plurality of openings in any portion excluding the edge having the irregular shape.

14. The illumination device according to claim 12, wherein each of the first electrodes has metal lines electrically connected to the portion excluding the edge having the irregular shape.

15. The illumination device according to claim 11, wherein the irregular shape corresponds to a zigzag shape, a wave shape, a trapezoidal shape, a ramp shape, or a random shape.

16. The illumination device according to claim 15, wherein the irregular shape is configured of a plurality of convex portions arranged along an edge, and
a respective plurality of convex portions formed on edges of the first electrodes adjacent to each other are alternately disposed.

17. An illumination device comprising:
a light guide plate;
a light source disposed on a side face of the light guide plate; and
a light modulation element disposed on a surface or in an inside of the light guide plate and adhered to the light guide plate,
wherein the light guide plate has a plurality of convex portions extending in a direction parallel to a normal to a face opposed to the light source among side faces of the light guide plate,
the light source is configured of a plurality of light source blocks capable of being independently driven, and
the light modulation element includes:
a pair of transparent substrates disposed separately and oppositely to each other,
a plurality of first electrodes provided on a surface of one of the pair of transparent substrates, and extending in a direction crossing an extending direction of the convex portions,
a second electrode provided on a surface of another of the pair of transparent substrates, and
a light modulation layer provided in a gap between the pair of transparent substrates, and exhibiting a scattering property or a transparent property to light from the light source depending on magnitude of an electric field,
wherein each of the first electrodes has an irregular shape on an edge thereof adjacent to another first electrode, and
wherein the irregular shape corresponds to a zigzag shape with a plurality of protruding portions being arranged, each protruding portion having an acute end, and
wherein one or more of profiles of each of the protruding portions corresponds to a function of the power of m of the sine with an end as an origin, wherein m is an even number.

18. An illumination device comprising:
a light guide plate;
a light source disposed on a side face of the light guide plate; and
a light modulation element disposed on a surface or in an inside of the light guide plate and adhered to the light guide plate,
wherein the light guide plate has a plurality of convex portions extending in a direction parallel to a normal to a face opposed to the light source among side faces of the light guide plate,
the light source is configured of a plurality of light source blocks capable of being independently driven, and
the light modulation element includes:
a pair of transparent substrates disposed separately and oppositely to each other,
a plurality of first electrodes provided on a surface of one of the pair of transparent substrates, and extending in a direction crossing an extending direction of the convex portions,
a second electrode provided on a surface of another of the pair of transparent substrates, and
a light modulation layer provided in a gap between the pair of transparent substrates, and exhibiting a scattering property or a transparent property to light from the light source depending on magnitude of an electric field, wherein each of the first electrodes has an irregular shape on an edge thereof adjacent to another first electrode, wherein the second electrode is configured of a single sheet-like electrode or a plurality of belt-like electrodes, wherein the second electrode is patterned, where pattern density is different depending on a distance from the light source for each of parts opposed to the first electrodes, and wherein in the second electrode, a section from a point, at which pattern density starts to decrease, to a point, at which pattern density starts to increase, is within a range opposed to a section enclosed by bottoms of concave portions included in two irregular shapes adjacent to each other in the first electrodes.

19. The illumination device according to claim 18, wherein the second electrode is configured of a plurality of belt-like electrodes, and when pattern density of the second electrode is D1 at the point, at which pattern density starts to decrease, and pattern density of the second electrode is D2 at the point, at which pattern density starts to increase, D1 and D2 satisfy the following relational expression:

$1 < D1/D2 <$ (duty ratio of voltage applied to a belt-like electrode relatively near the light source between two belt-like electrodes adjacent to each other)/(duty ratio of voltage applied to a belt-like electrode relatively away from the light source between the two belt-like electrodes adjacent to each other).

* * * * *